(12) United States Patent
Takahashi

(10) Patent No.: US 11,727,833 B2
(45) Date of Patent: Aug. 15, 2023

(54) INFORMATION PROCESSING APPARATUS AND INFORMATION PROCESSING METHOD FOR SUPPRESSING CROSSTALK WHILE SUPPRESSING DEGRADATION IN IMAGE QUALITY

(71) Applicant: SONY GROUP CORPORATION, Tokyo (JP)

(72) Inventor: Hiroaki Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/786,887

(22) PCT Filed: Dec. 23, 2020

(86) PCT No.: PCT/JP2020/048080
§ 371 (c)(1),
(2) Date: Jun. 17, 2022

(87) PCT Pub. No.: WO2021/132298
PCT Pub. Date: Jul. 1, 2021

(65) Prior Publication Data
US 2023/0030931 A1 Feb. 2, 2023

(30) Foreign Application Priority Data

Dec. 27, 2019 (JP) ................. 2019-239566
Dec. 21, 2020 (JP) ................. 2020-211412

(51) Int. Cl.
*G09G 3/00* (2006.01)

(52) U.S. Cl.
CPC ..... *G09G 3/003* (2013.01); *G09G 2320/0209* (2013.01); *G09G 2340/0464* (2013.01); *G09G 2354/00* (2013.01)

(58) Field of Classification Search
CPC .................................................. G09G 3/003
See application file for complete search history.

(56) References Cited

U.S. PATENT DOCUMENTS

2015/0130914 A1  5/2015  Hyodo et al.
2015/0229901 A1  8/2015  Doba et al.

FOREIGN PATENT DOCUMENTS

JP  2015-095779 A  5/2015
JP  2015-154091 A  8/2015
JP  2015-162718 A  9/2015

OTHER PUBLICATIONS

International Search Report and Written Opinion of PCT Application No. PCT/JP2020/048080, dated Mar. 16, 2021, 10 pages of ISRWO.

*Primary Examiner* — Gustavo Polo
(74) *Attorney, Agent, or Firm* — Chip Law Group

(57) ABSTRACT

An information processing apparatus (30) includes: an estimation unit (33B) that estimates the crosstalk amount based on a relative positional relationship between a viewing position of a viewer of a display device (10) and a pixel a screen of the display device (10); and a generation unit (33C) that generates an image to be displayed on the display device (10) by correcting a value of each of a plurality of pixels of the screen based on the crosstalk amount.

12 Claims, 39 Drawing Sheets

INFORMATION PROCESSING APPARATUS AND INFORMATION PROCESSING METHOD FOR SUPPRESSING CROSSTALK WHILE SUPPRESSING DEGRADATION IN IMAGE QUALITY

CROSS REFERENCE TO RELATED APPLICATIONS

This application is a U.S. National Phase of International Patent Application No. PCT/JP2020/048080 filed on Dec. 23, 2020, which claims priority benefit of Japanese Patent Application No. JP 2019-239566 filed in the Japan Patent Office on Dec. 27, 2019 and also claims priority benefit of Japanese Patent Application No. JP 2020-211412 filed in the Japan Patent Office on Dec. 21, 2020. Each of the above-referenced applications is hereby incorporated herein by reference in its entirety.

FIELD

The present disclosure relates to an information processing apparatus, an information processing method, and a program.

BACKGROUND

Some conventional display devices achieve stereoscopic image display. Patent Literature 1 discloses a technique of calculating a parallax corresponding to a predetermined threshold set in a crosstalk degradation amount in a relationship obtained for each pixel between the crosstalk degradation amount and a parallax transition.

CITATION LIST

Patent Literature

Patent Literature 1: 2015-162718 A

SUMMARY

Technical Problem

The above-described conventional technique discloses an example of a method of suppressing crosstalk as a method of darkening an image in a light beam direction that has little influence on both eyes. With the conventional method, however, a darkened screen region is visually recognized as a black stripe pattern.

In view of this, the present disclosure proposes an information processing apparatus, an information processing method, and a program capable of suppressing crosstalk while suppressing degradation in image quality of a display device.

Solution to Problem

To solve the problems described above, an information processing apparatus according to an embodiment of the present disclosure includes: an estimation unit that estimates a crosstalk amount based on a relative positional relationship between a viewing position of a viewer of a display device and a pixel on a screen of the display device; and a generation unit that generates an image to be displayed on the display device by correcting a value of each of a plurality of the pixels of the screen based on the crosstalk amount.

Moreover, an information processing method performed by a computer according to an embodiment of the present disclosure includes: estimating a crosstalk amount based on a relative positional relationship between a viewing position of a viewer of a display device and a pixel on a screen of the display device; and generating an image to be displayed on the display device by correcting a value of each of a plurality of the pixels of the screen based on the crosstalk amount.

Moreover, an information processing program according to an embodiment of the present disclosure causes a computer to execute: estimating a crosstalk amount based on a relative positional relationship between a viewing position of a viewer of a display device and a pixel on a screen of the display device; and generating an image to be displayed on the display device by correcting a value of each of a plurality of the pixels of the screen based on the crosstalk amount.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

In the case of a stereoscopically viewable display device that displays viewpoint images obtained from two or more viewpoints, crosstalk is a phenomenon by which light leaks to each viewpoint image from a neighboring viewpoint image due to optical characteristics of the display. When crosstalk occurs on the display device, an image that should not be displayed is displayed as binocular stereoscopic images, leading to degradation in image quality. For example, it is known that crosstalk occurring on the display device causes occurrence of a blurred image or a double image. The present embodiment provides a technique of suppressing crosstalk while suppressing image quality degradation.

EMBODIMENTS

[Outline of Display System According to Embodiment]

Figure 1:
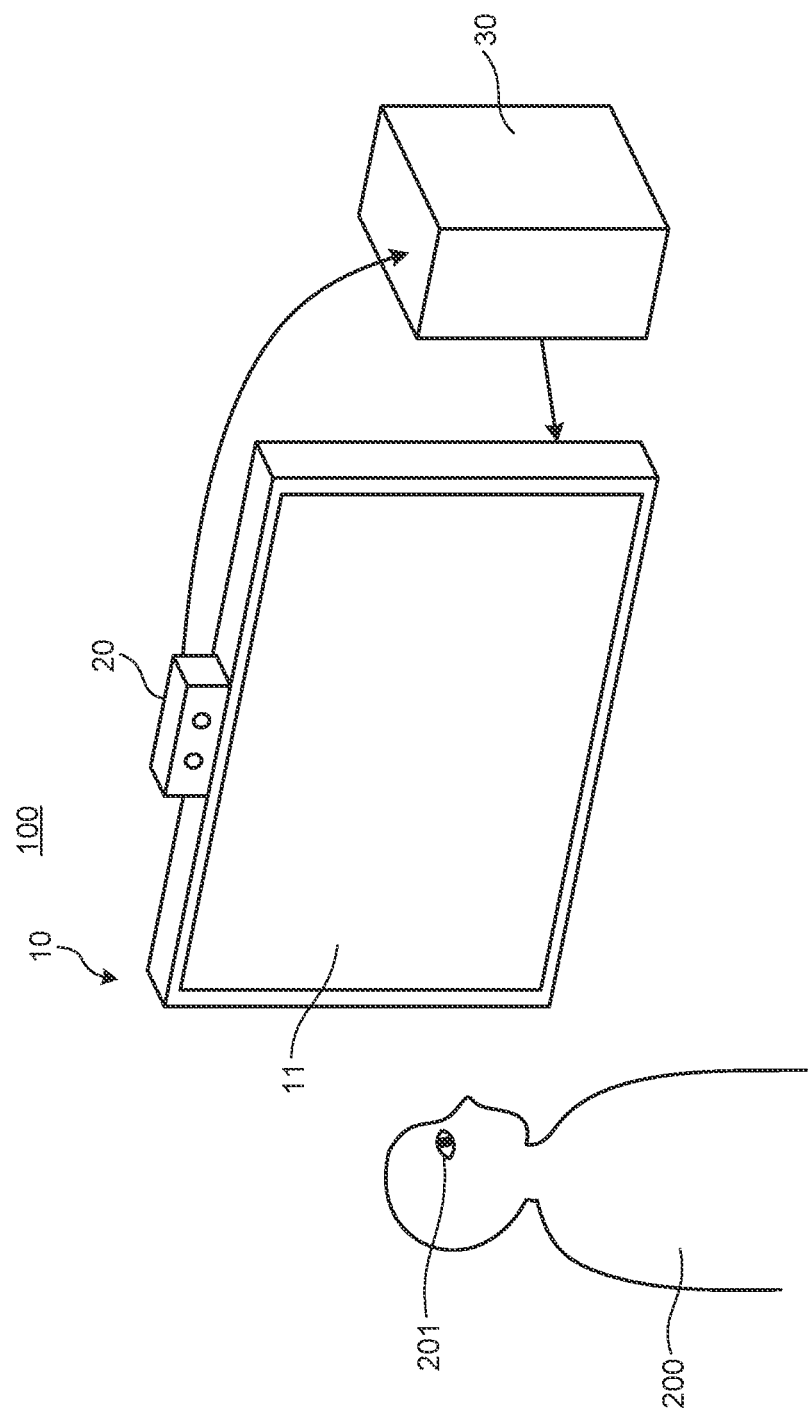
FIG. 1 is a diagram illustrating a schematic configuration of a display system including an information processing apparatus according to an embodiment.

FIG. 1 is a diagram illustrating a schematic configuration of a display system including an information processing apparatus according to an embodiment. A display system 100 illustrated in FIG. 1 allows a viewer 200 to visually recognize a stereoscopic image by a group of light beams emitted from a display device 10. The display system 100 includes the display device 10, a measurement device 20, and an information processing apparatus 30. The information processing apparatus 30 is communicable with the display device 10 and the measurement device 20.

The display device 10 is a display panel that displays a three-dimensional image (parallax image) using binocular parallax of the viewer 200. The display panel includes pixels being arranged in a two-dimensional matrix. The display panel includes devices using a parallax barrier, a lens array system, a panel stacking system, a projector array system, and the like. Under the control of the information processing apparatus 30, the display device 10 displays images corresponding to two viewpoints, multiple viewpoints, and the like. In the following description, an example in which the display device 10 is a parallax barrier type display device will be described.

The display device 10 alternately arranges two (or more) parallax images. The display device 10 arranges a barrier in front of the image. When viewing the image of the display device 10 from a certain distance, the viewer 200 visually recognizes different images separately for the left and right eyes, thereby stereoscopically viewing the image due to occurrence of binocular parallax.

The measurement device 20 is provided at top of the display device 10 so as to be able to measure the position and the like of eyes 201 of the viewer 200 observing the display device 10. Examples of the applicable measurement device 20 include an RGB camera, an IR camera, a depth camera, an ultrasonic sensor, and the like, used alone or in combination. The measurement device 20 may perform measurement constantly or periodically. The measurement device 20 transmits measurement information indicating a measurement result to the information processing apparatus 30 by wireless communication or wired communication. The measurement result includes, for example, position information by which it is possible to identify the positions of the head, the left and right eyes 201, *glabella* being the center of the left and right eyes 201, or the like, the line-of-sight direction, the distance, and the like of the viewer 200 in the space where a screen 11 of the display device 10 can be visually recognized.

[Configuration of Information Processing Apparatus According to Embodiment]

Figure 2:
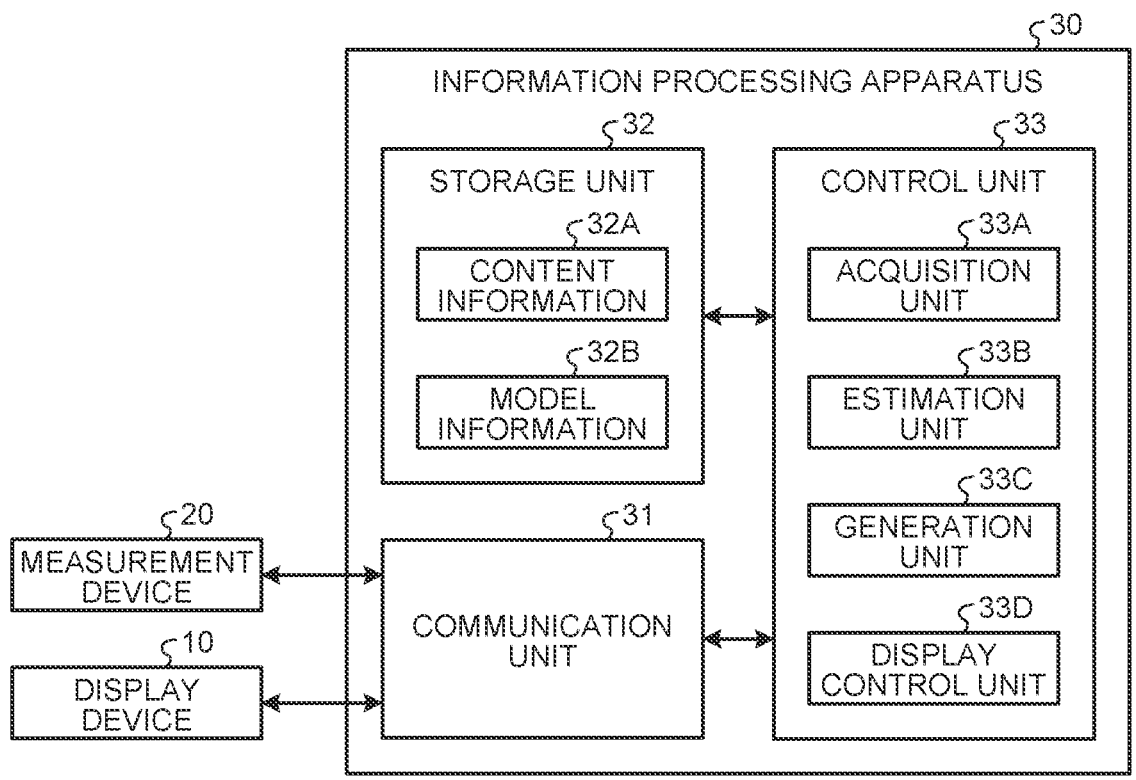
FIG. 2 is a diagram illustrating a configuration example of the information processing apparatus according to the embodiment.

FIG. 2 is a diagram illustrating a configuration example of the information processing apparatus 30 according to the embodiment. The information processing apparatus 30 in FIG. 2 is a dedicated or general-purpose computer, for example. The information processing apparatus 30 includes a communication unit 31, a storage unit 32, and a control unit 33. The information processing apparatus 30 is provided outside the display device 10, for example, but is not limited thereto. For example, the information processing apparatus 30 may be incorporated in the display device 10. The control unit 33 of the information processing apparatus 30 is electrically connected to the communication unit 31 and the storage unit 32.

The communication unit 31 has a function of communicating with the display device 10 and the measurement device 20 directly or via a network. The communication unit 31 is, for example, a communication device capable of wired communication or wireless communication. The communication unit 31 outputs information received from the display device 10 and the measurement device 20 to the control unit 33. The communication unit 31 transmits information, signals, and the like input from the control unit 33 to the display device 10, the measurement device 20, and the like. Note that the communication unit 31 may include, for example, a connector to which a cable or the like is connected.

The storage unit 32 stores various data and programs. The storage unit 32 is implemented by semiconductor memory elements such as RAM and flash memory, or storage devices such as a hard disk or an optical disk. The storage unit 32 stores the measurement result of the measurement device 20 in time series. The storage unit 32 stores various types of information such as content information 32A and model information 32B. The content information 32A includes information related to content to be displayed on the display device 10. The content information 32A is, for example, information acquired from the outside of the information processing apparatus 30. The content information 32A is used to generate an image to be displayed on the display device 10, for example. The image includes images corresponding to viewpoint positions of different angles, for example. The model information 32B includes information related to a crosstalk model used for estimation of crosstalk. The crosstalk model will be described below.

The control unit 33 controls the information processing apparatus 30. The control unit 33 includes processing units such as an acquisition unit 33A, an estimation unit 33B, a generation unit 33C, and a display control unit 33D. In the present embodiment, each of the functional units of the control unit 33, namely, the acquisition unit 33A, the estimation unit 33B, the generation unit 33C, and the display control unit 33D, is implemented by execution of programs stored in the information processing apparatus 30 by a central processing unit (CPU), a micro control unit (MCU), or the like, using random access memory (RAM) or the like as a working area. In addition, each of the processing units may be implemented by an integrated circuit such as an application specific integrated circuit (ASIC) or a field-programmable gate array (FPGA).

The acquisition unit 33A acquires a viewpoint position of the viewer 200 viewing the display device 10 based on the measurement information obtained by the measurement device 20. The acquisition unit 33A may specify the viewpoint position using various known methods. For example, the acquisition unit 33A specifies information such as the position of the eyes 201 of the viewer 200 and the distance from the measurement device 20 from the measurement result of the measurement device 20, and specifies the viewpoint positions of the left eye and the right eye of the viewer 200 based on the specified information. Here, although the viewpoint position is a position in a viewpoint coordinate system set for the viewer 200, the arrangement of the coordinate system is not limited thereto, and may be arranged based on the measurement device 20 and the display device 10. Furthermore, the acquisition unit 33A may specify the gazing direction of the right eye based on the captured image of the eyeball of the right eye of the viewer 200 and based on a positional relationship with the right eye, for example. Similarly, a specifying unit 331 may specify the gazing direction of the left eye based on the captured image of the eyeball of the left eye of the user and the positional relationship with the left eye.

The acquisition unit 33A may estimate which position of the screen 11 of the display device 10 is visually recognized based on the position of the eyes 201 of the viewer 200. The acquisition unit 33A may include the specifying accuracy of the viewpoint position of the viewer 200 in a specifying result. For example, in a case where the positions of the eyes 201 of the viewer 200 cannot be grasped from the image or the like, and the viewpoint position is estimated from the position, shape, or the like of the head of the viewer 200, the acquisition unit 33A may include information indicating that the specifying accuracy is low in the specifying result. For example, in a case where there is uncertainty in the accuracy of the measurement device 20 and there is a probability distribution to some extent, the acquisition unit 33A may estimate a position, a range, and the like at which a viewpoint is likely to be present by using the probability as a weight. Subsequently, the acquisition unit 33A stores the specified viewpoint position of the viewer 200 in the storage unit 32 and supplies the viewpoint position to the estimation unit 33B.

Based on the viewing position of the viewer 200 and the device information regarding the display device 10, the estimation unit 33B estimates the influence of the signal for each pixel on the viewing position on the screen 11. The estimation unit 33B estimates an attenuation rate of the strength of the signal. The estimation unit 33B estimates the crosstalk amount based on the viewing position of the viewer 200 and the model information 32B. The estimation unit 33B stores the estimated estimation result in the storage unit 32 and supplies the estimation result to the generation unit 33C.

The generation unit 33C generates an image corresponding to the viewing position of the viewer 200 based on the content information 32A. For example, the generation unit 33C generates an image corresponding to each of the viewing positions such as the front, right, and left of the viewer 200 with respect to the display device 10. The generation unit 33C has a function of generating an image that has undergone a countermeasure based on the crosstalk amount estimated by the estimation unit 33B. The generation unit 33C stores the generated image in the storage unit 32 and supplies the generated image to the display control unit 33D.

The display control unit 33D controls the display device 10 so as to display the image generated by the generation unit 33C. For example, the display control unit 33D controls the display device 10 to display the image generated by the generation unit 33C via the communication unit 31.

The configuration example of the information processing apparatus 30 according to the embodiment has been described as above. Note that the above configuration described with reference to FIG. 2 is merely an example, and the configuration of the information processing apparatus 30 according to the present embodiment is not limited to such an example. The functional configuration of the information processing apparatus 30 according to the present embodiment can be flexibly modified in accordance with specifications and applications.

[Functional Configuration Examples of Estimation Unit and Generation Unit According to Embodiment]

Figure 3:
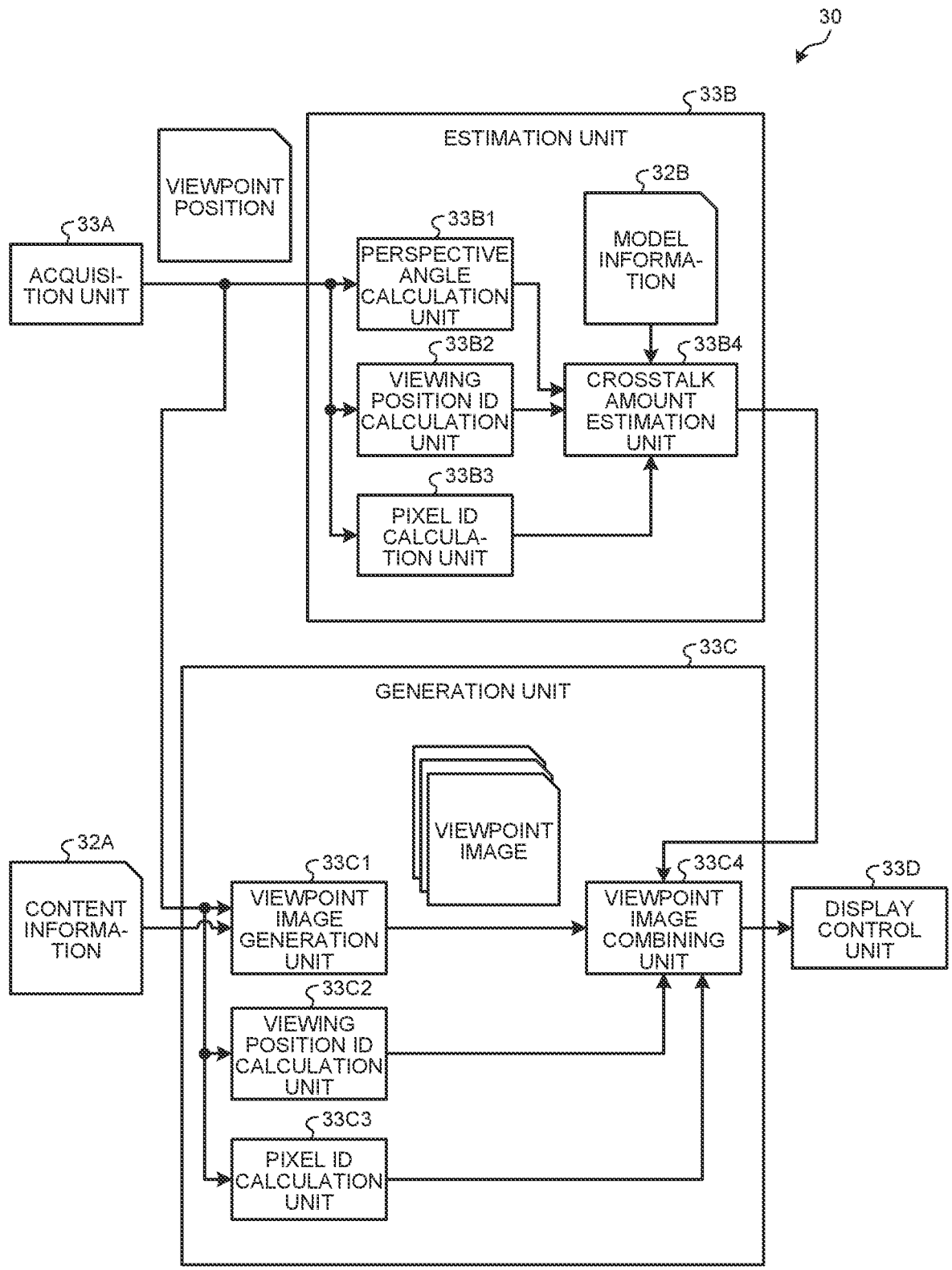
FIG. 3 is a diagram illustrating an example of functional configurations of an estimation unit and a generation unit according to the embodiment.
Figure 4:
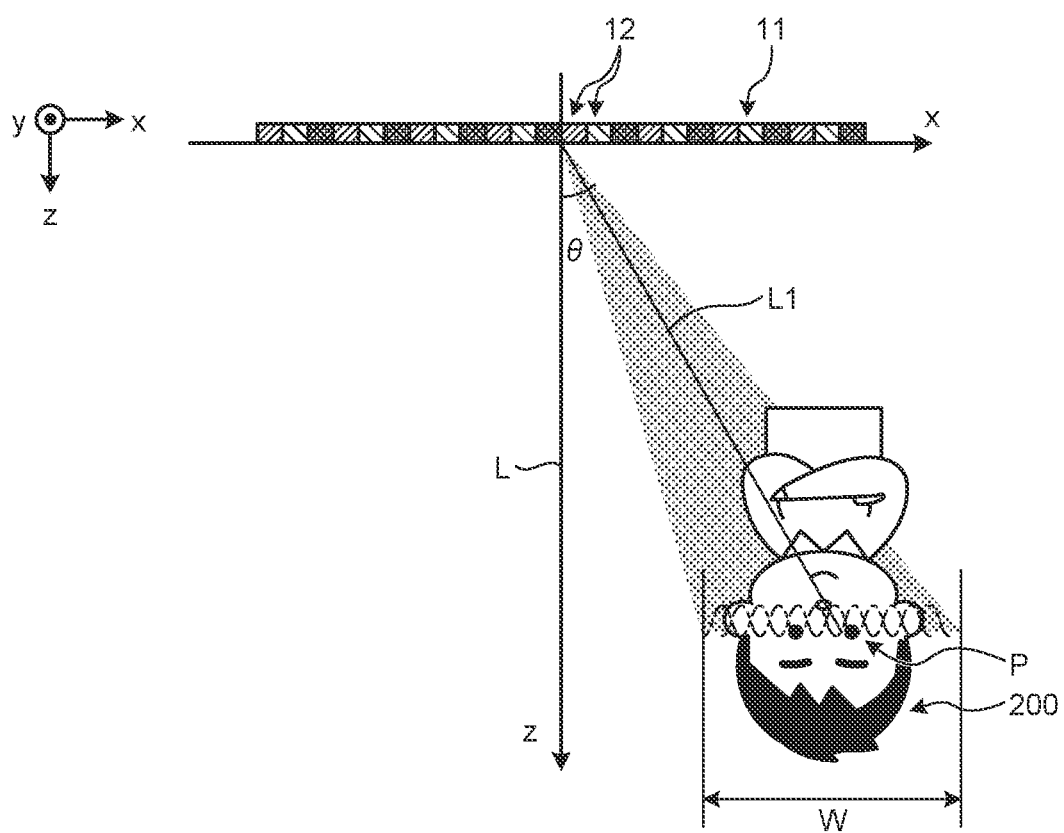
FIG. 4 is a diagram illustrating an example of a positional relationship between a display device and a viewer.
Figure 5:
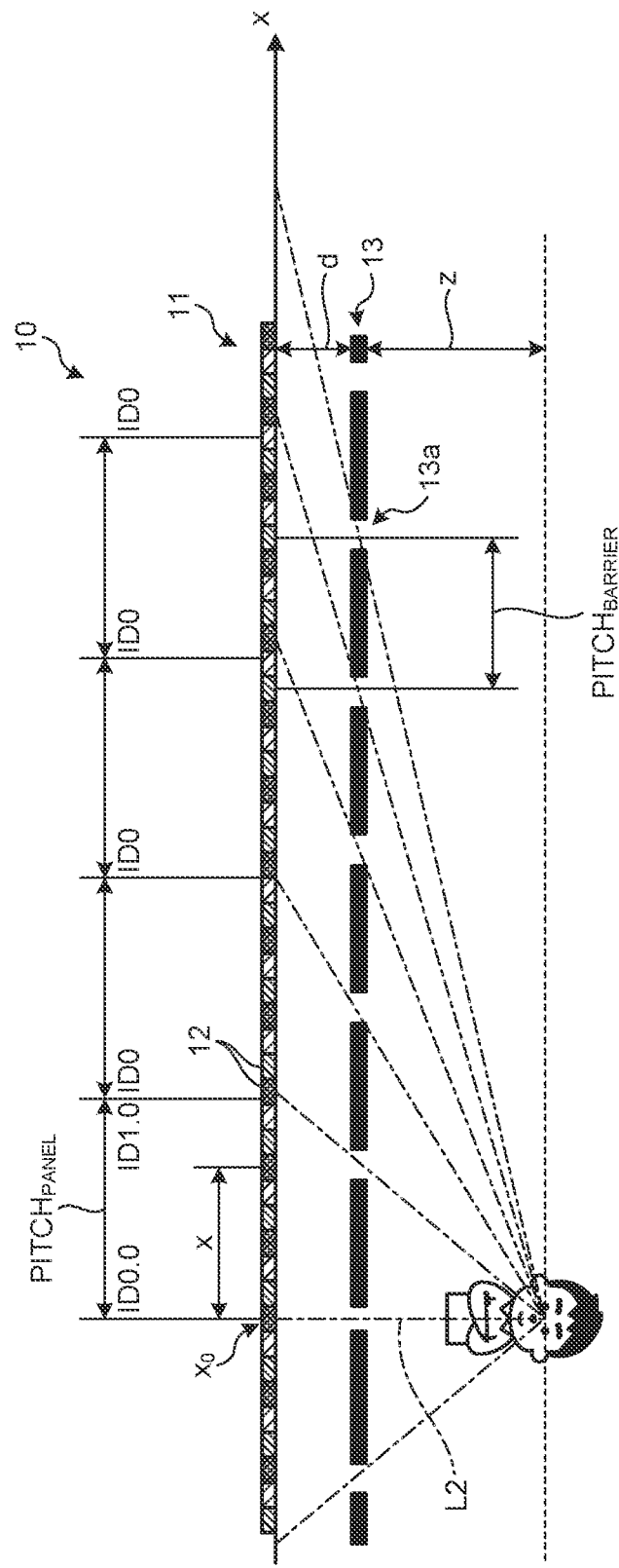
FIG. 5 is a diagram illustrating an example of a positional relationship between pixels of the display device and the viewer.

FIG. 3 is a diagram illustrating an example of a functional configuration of the estimation unit 33B and the generation unit 33C according to the embodiment. FIG. 4 is a diagram illustrating an example of a positional relationship between the display device 10 and the viewer 200. FIG. 5 is a diagram illustrating an example of a positional relationship between pixels of the display device 10 and the viewer 200.

As illustrated in FIG. 3, the estimation unit 33B includes an perspective angle calculation unit 33B1, a viewing position ID calculation unit 33B2, a pixel ID calculation unit 33B3, and a crosstalk amount estimation unit 33B4.

The perspective angle calculation unit 33B1 calculates the viewing position and a perspective angle θ of each of the plurality of pixels. As illustrated in FIG. 4, the perspective angle θ is an angle formed by a straight line L1 passing through a viewing position P of the viewer 200 and the pixel 12 and by a normal L of the pixel. An xy coordinate system illustrated in FIG. 4 defines plane coordinates on the surface of the screen 11 of the display device 10. The xy coordinate system is an example of a coordinate system of the display device 10. The xy coordinate system has an x-axis in the horizontal direction along the long side of the screen 11 of the display device 10 and a y-axis in the vertical direction along the short side of the screen 11. An xyz coordinate system includes the xy coordinate system of the screen 11 of the display device 10 and a z-axis in a direction orthogonal to the xy coordinate system.

In FIG. 4, the three-dimensional coordinates of the viewing position P are defined as $(x_0, y_0, z_0)$, and the coordinates of the pixel on the screen 11 are defined as $(x, y, 0)$. In this case, the perspective angle calculation unit 33B1 calculates the perspective angle θ by using the following Formula (1). The perspective angle calculation unit 33B1 stores the calculated perspective angle θ in the storage unit 32 in association with the pixel.

$$\theta = a\tan((x_0-x)/z_0)  \quad \text{Formula (1)}$$

The viewing position ID calculation unit 33B2 obtains ID corresponding to both eyes at the viewing position P based on the viewpoint position of the viewer 200 specified by the acquisition unit 33A. The ID corresponds to a horizontal coordinate normalized by a main lobe width W at the viewing position P. The ID indicates, for example, coordinates normalized by the main lobe width W with the *glabella* (the midpoint between the left eye and the right eye) as the origin. The main lobe width W is obtained by evaluating, at the viewing position P, an interval between pixels visually recognizable from the viewing position. Therefore, on the screen 11 (panel), the coordinates of each pixel can be expressed as coordinates normalized by the interval of the pixels on the screen 11 visually recognizable from a certain viewing position P. In the following description, the ID of the viewing position is also referred to as a viewing ID.

The pixel ID calculation unit 33B3 obtains an ID corresponding to a position ahead of each pixel 12 on the screen 11 spreading through the optical element. In the following description, the ID of the pixel 12 is also referred to as a pixel ID.

For example, as illustrated in FIG. 5, the parallax barrier type display device 10 includes: the screen 11 in which a plurality of pixels 12 are arranged; and a barrier 13. The screen 11 includes pixels 12 for displaying a left-eye image and pixels 12 for displaying a right-eye image, which are alternately arranged in the x-axis direction (horizontal direction). On the front side of the plurality of pixels 12, the barrier 13 has an opening 13a which has a slit-like shape and is provided for separating the light flux of the left-eye image and the light flux of the right-eye image.

In the example illustrated in FIG. 5, the pixel ID calculation unit 33B3 determines an origin $x_0$ in the horizontal direction (x-axis direction) on the screen 11. The origin $x_0$ can be defined as a certain point. The certain point includes, for example, any one of the left end, the center, and the right end of the screen 11, immediately below the specific barrier 13, coordinates of a point that can be seen when the viewer 200 looks into a certain opening 13a, and the like. The pixel ID calculation unit 33B3 defines, as the origin, an intersection of a straight line L2 passing through the *glabella* position of the viewer 200 and the center of the opening 13a of the barrier 13, and the screen 11.

In FIG. 5, a distance between the center of each pixel 12 and the origin is defined as a distance x. The unit of the distance x may be a physical distance or a distance normalized by the size of the pixel 12. The physical distance includes mm and nm, for example. The distance normalized by the size of the pixel 12 includes pix and subpix, for example. pix represents a distance in units of pixels, for example. subpix represents a counting method using each of RGB in the pixel 12 as a unit, for example.

The pixel ID calculation unit 33B3 obtains $\text{PITCH}_{PANEL}$ on the screen 11 by using the following Formula (2) in consideration of a viewing distance z. The distance d is a distance from a pixel group to the barrier 13. $\text{PITCH}_{BARRIER}$ is a distance between the adjacent openings 13$a$ of the barrier 13. The value of $\text{PITCH}_{BARRIER}$ can be determined as a design value or a value obtained by calibration in advance, for example.

$$\text{PITCH}_{PANEL} = ((z+d)/z) \cdot \text{PITCH}_{BARRIER} \quad \text{Formula (2)}$$

By calculating the distance x between the center and the origin of each pixel 12 by the following Formula (3), the pixel ID calculation unit 33B3 calculates the pixel ID of the pixel 12. Here, the fmod function is a function of calculating division of a floating point. The fmod function is defined as a function that, when an integer part of a result of dividing the first argument by the second argument is a quotient and a fractional part thereof is a remainder, returns the remainder as a return value. That is, here, the fractional part obtained by dividing x by the length $\text{PITCH}_{PANEL}$ of the second argument is stored as $ID(x)$.

$$ID(x) = f \bmod (x, \text{PITCH}_{PANEL}) \quad \text{Formula (3)}$$

Figure 6:
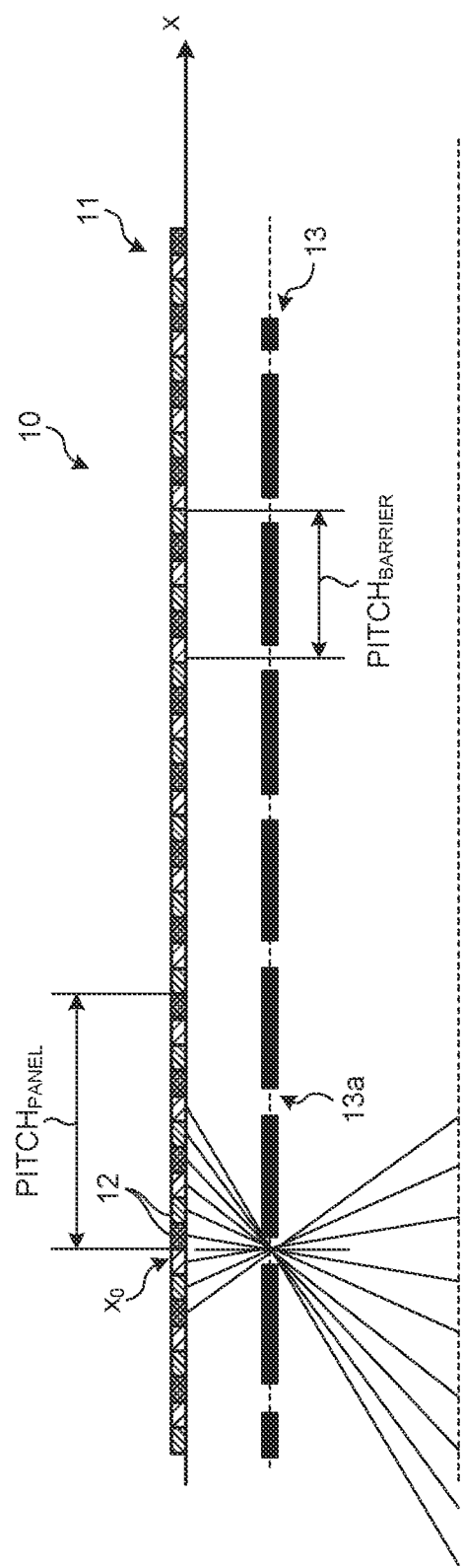
FIG. 6 is a diagram for describing spread of light through an optical system of the display device.
Figure 7:
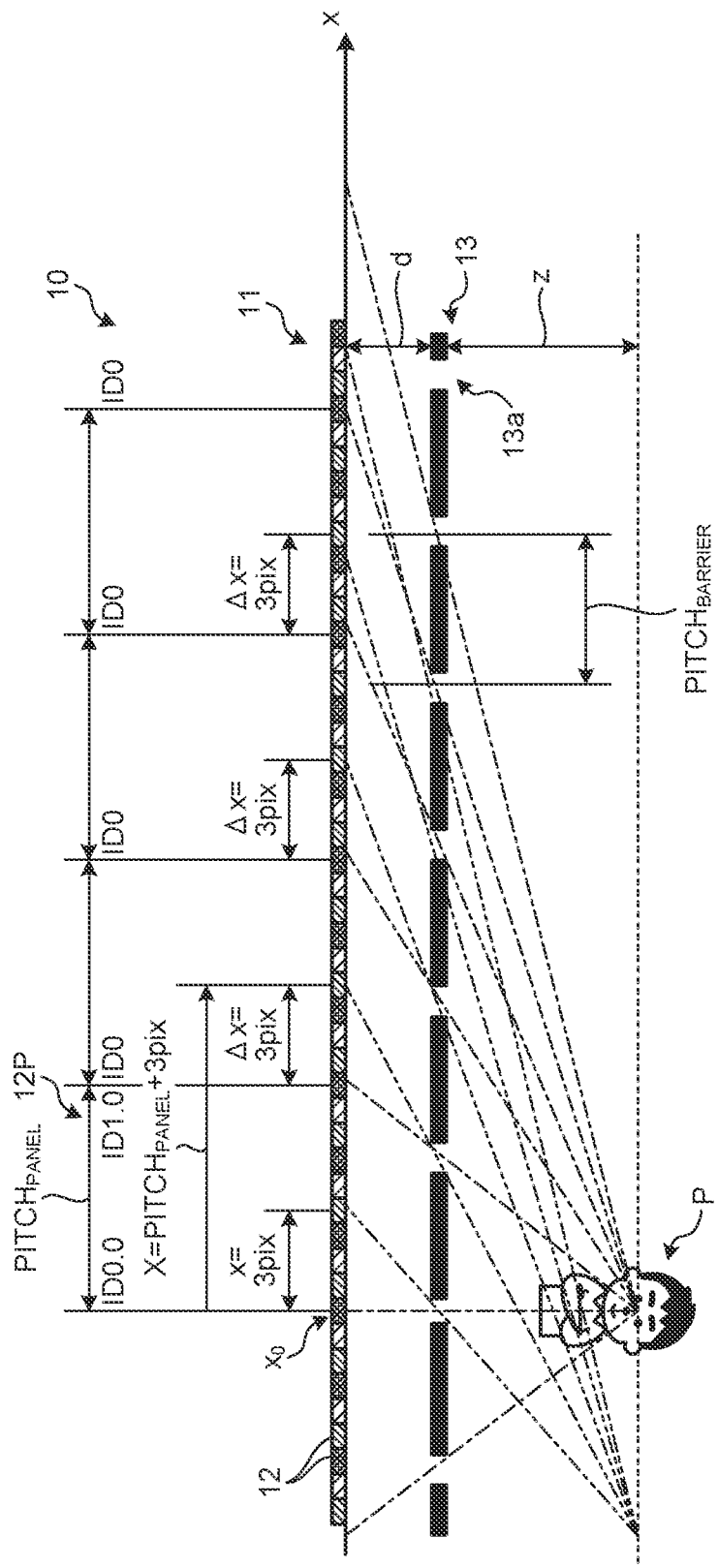
FIG. 7 is a diagram for describing a relationship between light of a plurality of pixels of the display device and a viewing position.
Figure 8:
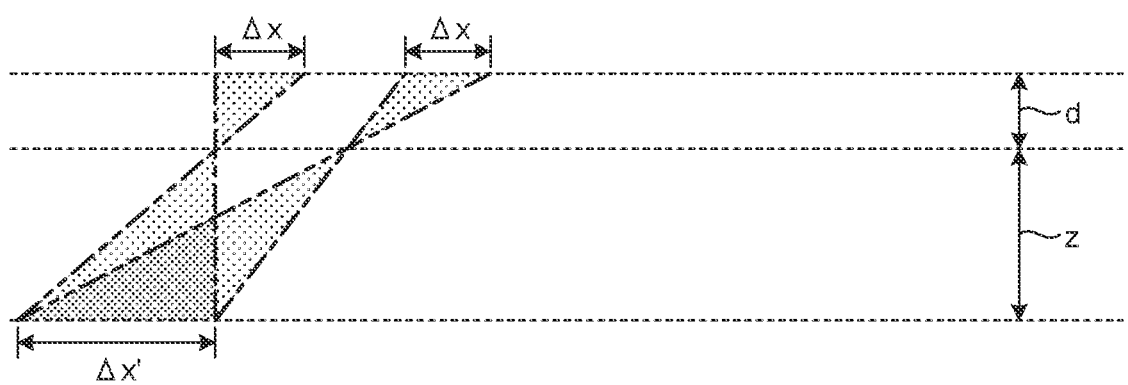
FIG. 8 is a diagram for describing a relationship between the plurality of pixels of the display device and light beams.

The fact that the proximity of light can be expressed by Formula (3) will be described. FIG. 6 is a diagram for describing spread of light through an optical system of the display device 10. FIG. 7 is a diagram for describing a relationship between light of a plurality of pixels 12 of the display device 10 and the viewing position P. FIG. 8 is a diagram for describing a relationship between a plurality of pixels 12 of the display device 10 and light beams.

As illustrated in FIG. 6, in the optical system of display device 10, the light beam of each pixel 12 spreads in a plurality of directions through different openings 13$a$. As illustrated in FIG. 7, in a case where the display device 10 is viewed from the viewing position P, the pixels 12 visible from the viewing position P are positioned at equal intervals at intervals of $\text{PITCH}_{PANEL}$. A set of such pixels 12 is referred to as a pixel group 12P. In the example illustrated in FIG. 7, by normalizing the distance x with the length $\text{PITCH}_{PANEL}$, any number in the range 0.0 to 1.0 is assigned as the ID of each $\text{PITCH}_{PANEL}$.

As illustrated in FIG. 8, when a pixel group located at a position shifted by $\Delta x'$ from each position of the pixel group 12P is defined as a pixel group 12P', each point of the pixel group 12P' can be viewed from a viewpoint shifted by $\Delta x' = -(z/d) \cdot \Delta x$ from the viewing position P. That is, the light beam from the pixel group 12P' can be regarded as a light beam equidistant from the viewing position P.

When generalized, the coordinates of the pixel group 12P' can be calculated by Formula (4). In Formula (4), k is an integer.

$$x = k \cdot \text{PITCH}_{PANEL} + \Delta X \quad \text{Formula (4)}$$

Therefore, by substituting Formula (4) into Formula (3), $ID = \text{fmod}(x, \text{PITCH}_{PANEL}) = \text{fmod}(k \cdot \text{PITCH}_{PANEL} + \Delta x, \text{PITCH}_{PANEL}) = \Delta x$ is obtained. Therefore, by calculating the ID, the pixel ID calculation unit 33B3 can calculate the distance of the light spreading from the viewing position P and each pixel 12.

Figure 9:
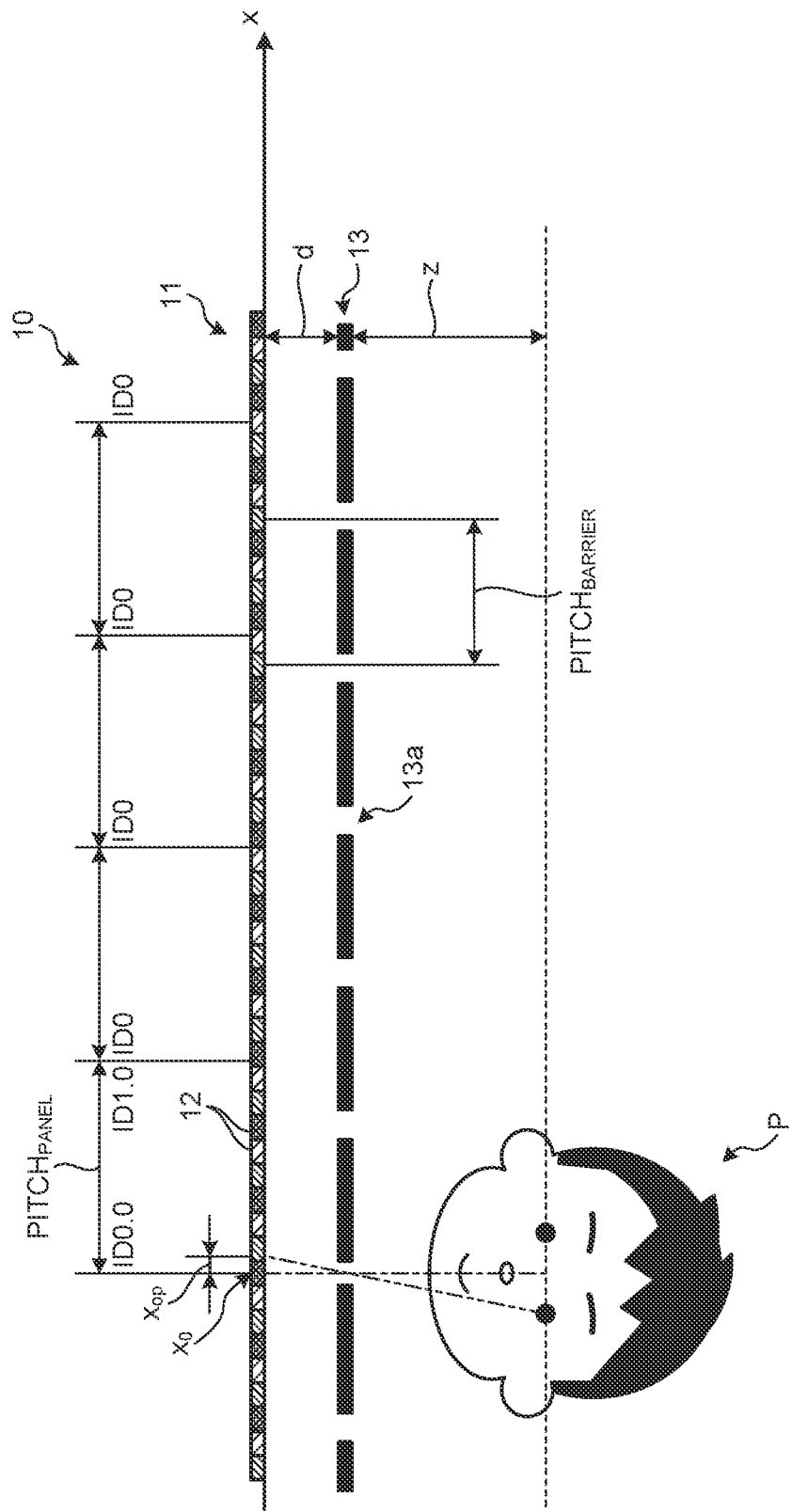
FIG. 9 is a diagram illustrating an example of calculating a viewing ID from a relationship between the light of the plurality of pixels of the display device and the viewing position.

Similarly, an example of calculating the viewing ID will be described. FIG. 9 is a diagram illustrating an example of calculating the viewing ID from a relationship between light of a plurality of pixels 12 of the display device 10 and the viewing position P. As illustrated in FIG. 9, the viewing position ID calculation unit 33B2 obtains a distance $x_{OP}$ of the pixel position visible from the viewing position P. As a method of accurately obtaining the distance $x_{OP}$, it is allowable to draw a straight line passing through the center of the viewing position P and any opening 13$a$ of the barrier 13, and set the x coordinate of the intersection of the straight line and the screen 11 as the distance $x_{OP}$. By calculating the distance $x_{OP}$ using the following Formula (5), the viewing position ID calculation unit 33B2 calculates the viewing ID.

$$ID_{OP}(x) = f \bmod (x_{Op}, \text{PITCH}_{PANEL}) \quad \text{Formula (5)}$$

Returning to FIG. 4, the crosstalk amount estimation unit 33B4 estimates the crosstalk amount (attenuation amount) until the signal (light beam) from each pixel 12 reaches the viewing position P. Based on the crosstalk parameter and the model equation indicated by the model information 32B, the crosstalk amount estimation unit 33B4 estimates the attenuation amount of each pixel 12. The model equation may be represented by a normal distribution, for example.

Figure 10:
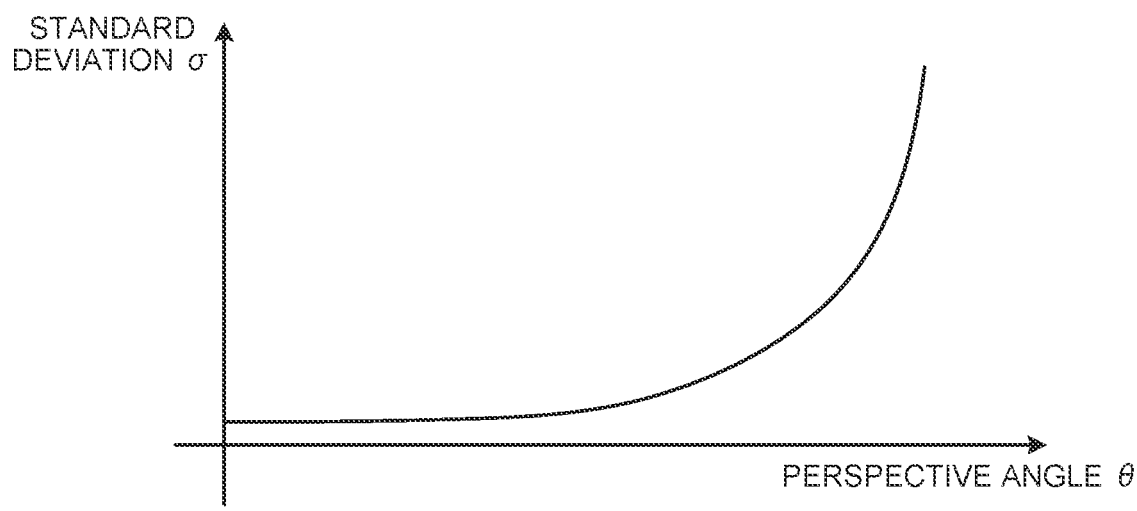
FIG. 10 is a diagram illustrating an example of a relationship between a standard deviation representing a spread amount of light from each pixel and a perspective angle according to the embodiment.

FIG. 10 is a diagram illustrating an example of a relationship between a standard deviation representing a spread amount of light from each pixel and a perspective angle $\theta$ according to the embodiment. In FIG. 10, the vertical axis represents a standard deviation $\sigma$, and the horizontal axis represents the perspective angle $\theta$. As illustrated in FIG. 10, when the standard deviation representing the light spreading amount monotonically increases with respect to the perspective angle $\theta$, this indicates that the crosstalk amount also increases with the increase in the perspective angle. With a model equation as a function of the standard deviation $\sigma$ and the perspective angle $\theta$ of the normal distribution as illustrated in FIG. 10, the crosstalk amount estimation unit 33B4 can appropriately estimate the crosstalk amount, for example.

Based on the $\Delta ID$ and the model of the crosstalk, the crosstalk amount estimation unit 33B4 estimates the crosstalk amount indicating the attenuation amount until each pixel 12 reaches the viewing position P. $\Delta ID$ is a difference between the viewing position P and each pixel ID. For example, the crosstalk amount estimation unit 33B4 obtains the proximity from the difference between the viewing position P and each pixel ID by using the following Formula (6).

$$\Delta ID = f \bmod (ID_{OP} - ID, \text{PITCH}_{PANEL}) \quad \text{Formula (6)}$$

The crosstalk amount estimation unit 33B4 obtains a crosstalk model from the perspective angle $\theta$. The crosstalk amount is, for example, an attenuation rate indicating the amount of attenuation of each pixel 12 before reaching the viewing position P. The attenuation rate may be set to 0.0 to 1.0. Basically, although it is possible to apply any function using $\Delta ID$ and the perspective angle $\theta$ as arguments, in the present embodiment, a normal distribution is assumed as one expression method.

The crosstalk amount estimation unit 33B4 obtains the standard deviation $\sigma$ of the crosstalk based on the perspective angle $\theta$. Note that the shape of the graph illustrated in FIG. 10 may be determined from actual measurement data or may be determined from a design value. Furthermore, the crosstalk amount estimation unit 33B4 may use an expression as an analytical function, or may create a lookup table for discrete perspective angles $\theta$. When using a table, it is possible to obtain the standard deviation $\sigma$ with respect to a certain perspective angle $\theta$ by applying interpolation using a method such as a polygonal line or B-spline.

In the present embodiment, since the crosstalk model is a normal component, the standard deviation $\sigma$ is estimated from the perspective angle $\theta$. However, the crosstalk model is not limited to the normal distribution. For example, the crosstalk amount may be directly estimated from the perspective angle θ and the ΔID, from ID, by a two-dimensional lookup table.

The crosstalk amount estimation unit 33B4 determines the equation of the normal distribution based on the standard deviation σ. For example, the crosstalk amount estimation unit 33B4 calculates a crosstalk amount γ by substituting the difference ΔID and the standard deviation σ into the following Formula (7).

$$\gamma = \frac{1}{\sqrt{2\pi\sigma(\theta)^2}} \exp\left(-\frac{\Delta_{ID}^2}{2\sigma(\theta)^2}\right) \qquad \text{Formula (7)}$$

Figure 11:
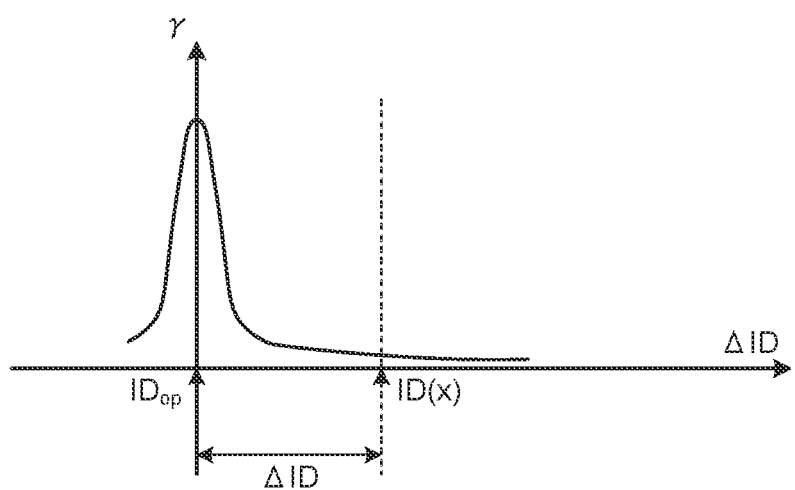
FIG. 11 is a diagram illustrating an example of a relationship between a crosstalk amount and a difference ΔID according to the embodiment.

FIG. 11 is a diagram illustrating an example of a relationship between the crosstalk amount γ and the difference ΔID according to the embodiment. In FIG. 11, the vertical axis represents the crosstalk amount γ, and the horizontal axis represents the difference ΔID. As illustrated in FIG. 11, the crosstalk amount estimation unit 33B4 calculates (estimates) the crosstalk amount γ obtained by approximating the spread of light from each pixel 12 with a normal distribution of the standard deviation σ (θ). The crosstalk amount estimation unit 33B4 stores the calculated crosstalk amount γ in the storage unit 32.

Returning to FIG. 3, the generation unit 33C includes a viewpoint image generation unit 33C1, a viewing position ID calculation unit 33C2, a pixel ID calculation unit 33C3, and a viewpoint image combining unit 33C4.

The viewpoint image generation unit 33C1 generates a two-dimensional viewpoint image that should be seen for each viewing ID based on the content information 32A. The viewpoint image generation unit 33C1 supplies the generated viewpoint image and the viewing ID to the viewpoint image combining unit 33C4 in association with each other.

The viewing position ID calculation unit 33C2 obtains the viewing ID corresponding to both eyes at the viewing position P, similarly to the viewing position ID calculation unit 33B2. The viewing position ID calculation unit 33C2 supplies the calculated viewing ID to the viewpoint image combining unit 33C4.

Similarly to the pixel ID calculation unit 33B3, the pixel ID calculation unit 33C3 calculates a pixel ID corresponding to a position ahead of each pixel 12 on the screen 11 spreading through the optical element. The pixel ID calculation unit 33C3 supplies the calculated pixel ID to the viewpoint image combining unit 33C4.

The viewpoint image combining unit 33C4 selects a pixel value according to the pixel ID. The viewpoint image combining unit 33C4 selects, from the viewpoint image, a pixel value with which each pixel 12 emits light according to the pixel ID indicating in which direction the light beam of each pixel 121 on the screen 11 is to be transmitted. The viewpoint image combining unit 33C4 executes correction processing in consideration of the crosstalk amount γ of the estimation unit 33B. The correction processing includes, for example, processing such as darkening, deconvolution processing of applying reverse correction to an input image so as to obtain a desired image output as a result of crosstalk, or processing of changing an image to be selected. When selecting the pixel value, the viewpoint image combining unit 33C4 discretizes the pixel ID according to the number of viewpoints desired to be finally output to select the display viewpoint ID.

Figure 12:
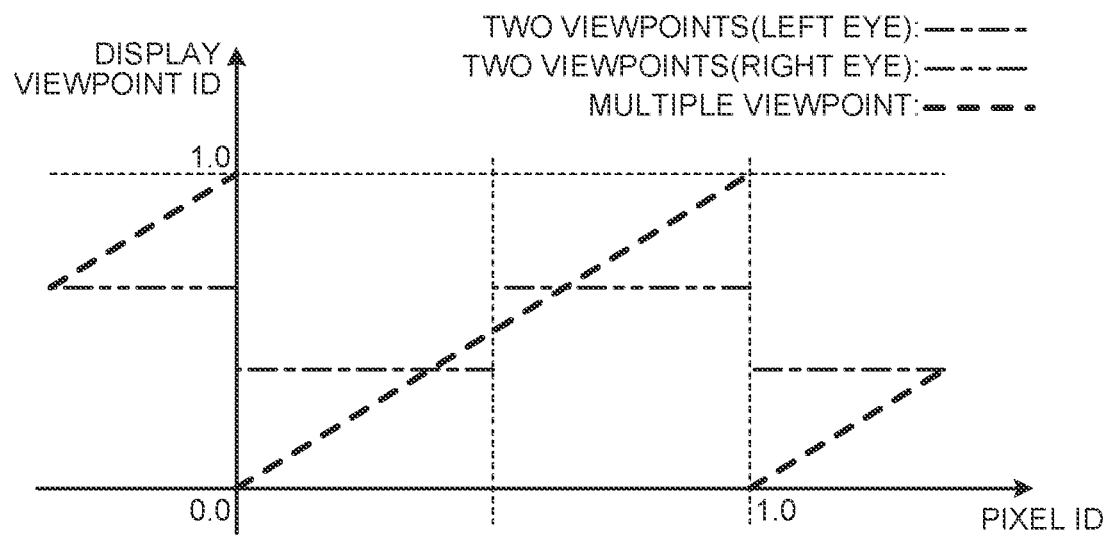
FIG. 12 is a diagram illustrating an example of a relationship between a pixel ID and a display viewpoint ID.

When the display device 10 has been operated with two viewpoints, the generation unit 33C generates images corresponding to two viewpoints of the left and right eyes. When the display device 10 has been operated in multiple viewpoints, the generation unit 33C generates images corresponding to the preset number of viewpoints. The generation unit 33C selects the display viewpoint ID according to the pixel ID based on the number of viewpoints set in the display device 10 and a correspondence relationship illustrated in FIG. 12 below. FIG. 12 is a diagram illustrating an example of a relationship between the pixel ID and the display viewpoint ID. In FIG. 12, the vertical axis represents the display viewpoint ID, and the horizontal axis represents the pixel ID. For example, in the case of two viewpoints, the generation unit 33C selects the display viewpoint IDs corresponding to the left eye and the right eye of the two viewpoints based on the pixel ID. For example, in the case of the multiple viewpoint, the generation unit 33C selects the display viewpoint ID such that the ID changes linearly in the range of 0.0 to 1.0. The generation unit 33C determines a pixel value for each pixel position from the display viewpoint ID and the image for each viewpoint. The generation unit 33C determines a luminance gain for each pixel from the crosstalk amount, and corrects the image by multiplying the luminance gain by the pixel value.

The configuration example of the information processing apparatus 30 according to the embodiment has been described as above. Note that the above configuration described with reference to FIG. 2 is merely an example, and the configuration of the information processing apparatus 30 according to the present embodiment is not limited to such an example. The functional configuration of the information processing apparatus 30 according to the present embodiment can be flexibly modified in accordance with specifications and applications.

In the above-described embodiment, for example, the light emitted from each pixel 12 appears as a repeated pattern from the opening 13a of the barrier 13. Therefore, when the proximity between IDs is quantified, ΔID can be calculated by replacing the above-described Formula (6) with the following Formula (6)'. For example, the crosstalk amount estimation unit 33B4 and the viewpoint image combining unit 33C4 described above can use Formula (6)' as ΔID. With acquisition of distances in a rightward direction and a leftward direction (a measurement method in consideration of repetition of a display image occurring due to optical characteristics of a display), the crosstalk amount estimation unit 33B4, the viewpoint image combining unit 33C4, and the like can obtain the minimum ΔID. With this operation, the crosstalk amount estimation unit 33B4, the viewpoint image combining unit 33C4, and the like can obtain more accurate proximity from the difference between the viewing position P and each pixel ID by using the following Formula (6)'.

$$\Delta ID = \min(|ID_{OP} - ID|, |ID_{OP} - ID+1|, |ID_{OP} - ID-1|) \qquad \text{Formula (6)'}$$

[Information Processing Apparatus Crosstalk Countermeasure Examples According to Embodiment]

In a region where the perspective angle θ is large with respect to the screen 11 of the display device 10, for example, crosstalk increases due to field curvature or the like. The field curvature is an aberration in which the focal plane parallel to the optical system does not correspond to a plane from a plane on the front side and the rear side of the optical system. The information processing apparatus 30 estimates the crosstalk amount γ for each pixel 12 according to the viewpoint position, and takes countermeasures against crosstalk as described below.

[Information Processing Apparatus Countermeasure (1) According to Embodiment]

The information processing apparatus 30 according to the embodiment provides Countermeasure (1) of performing light reduction in a region where the perspective angle θ of the screen 11 is influenced by crosstalk.

Figure 13:
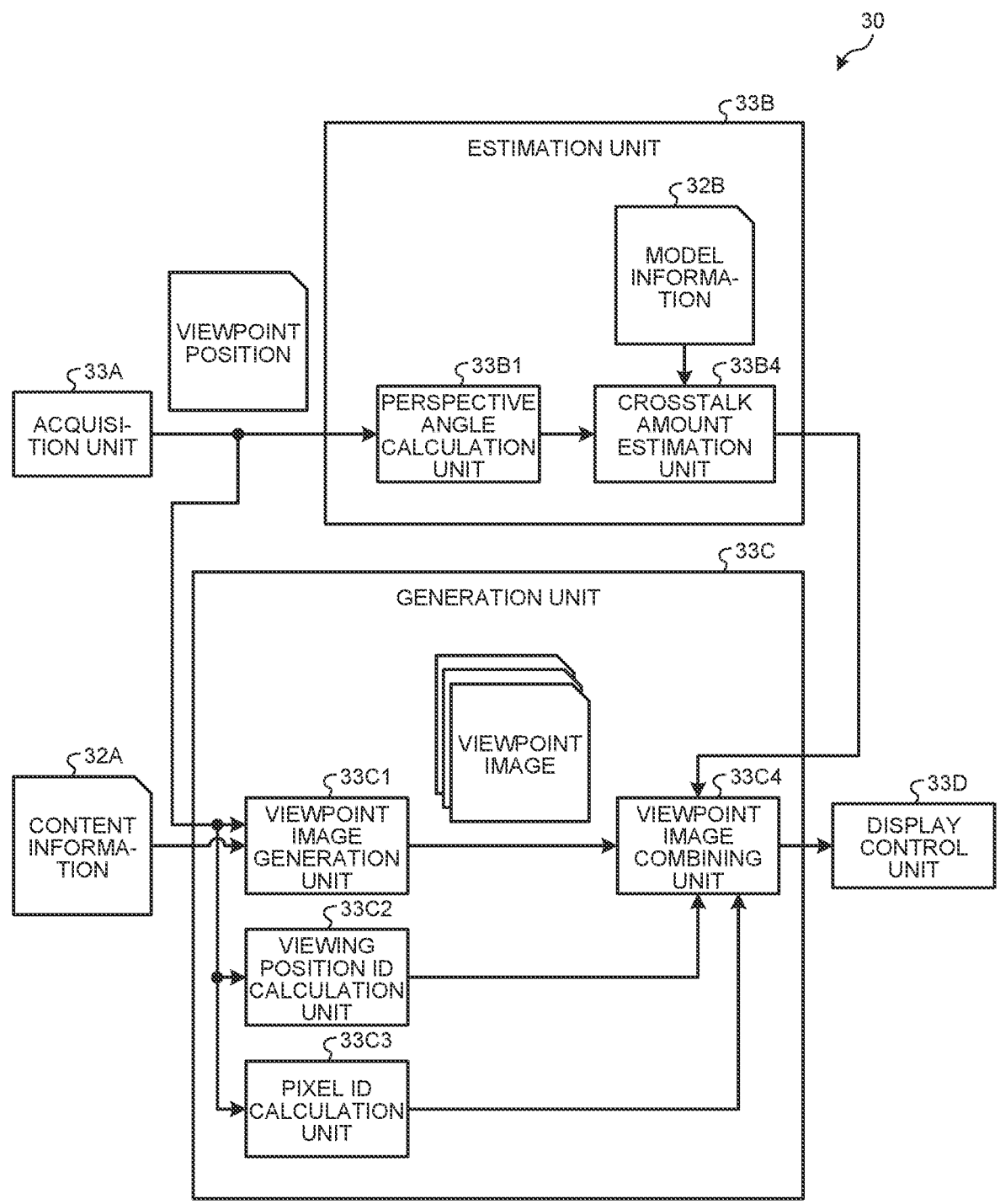
FIG. 13 is a diagram illustrating a configuration example of Countermeasure (1) of the estimation unit and the generation unit according to the embodiment.
Figure 14:
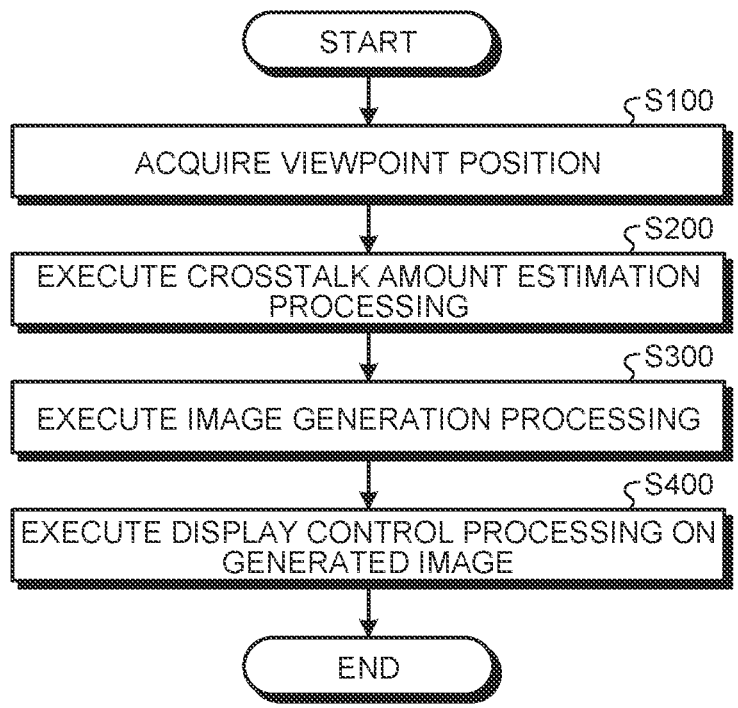
FIG. 14 is a flowchart illustrating an example of a processing procedure executed by the information processing apparatus according to the embodiment.
Figure 15:
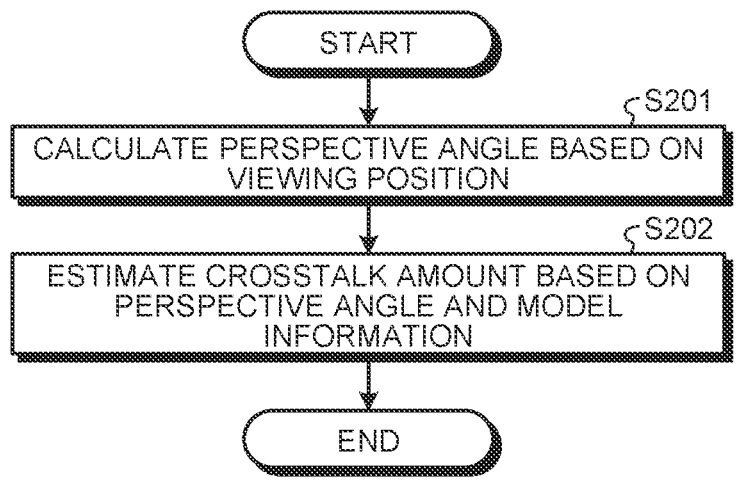
FIG. 15 is a flowchart illustrating a processing procedure according to Countermeasure (1) of the estimation unit according to the embodiment.
Figure 16:
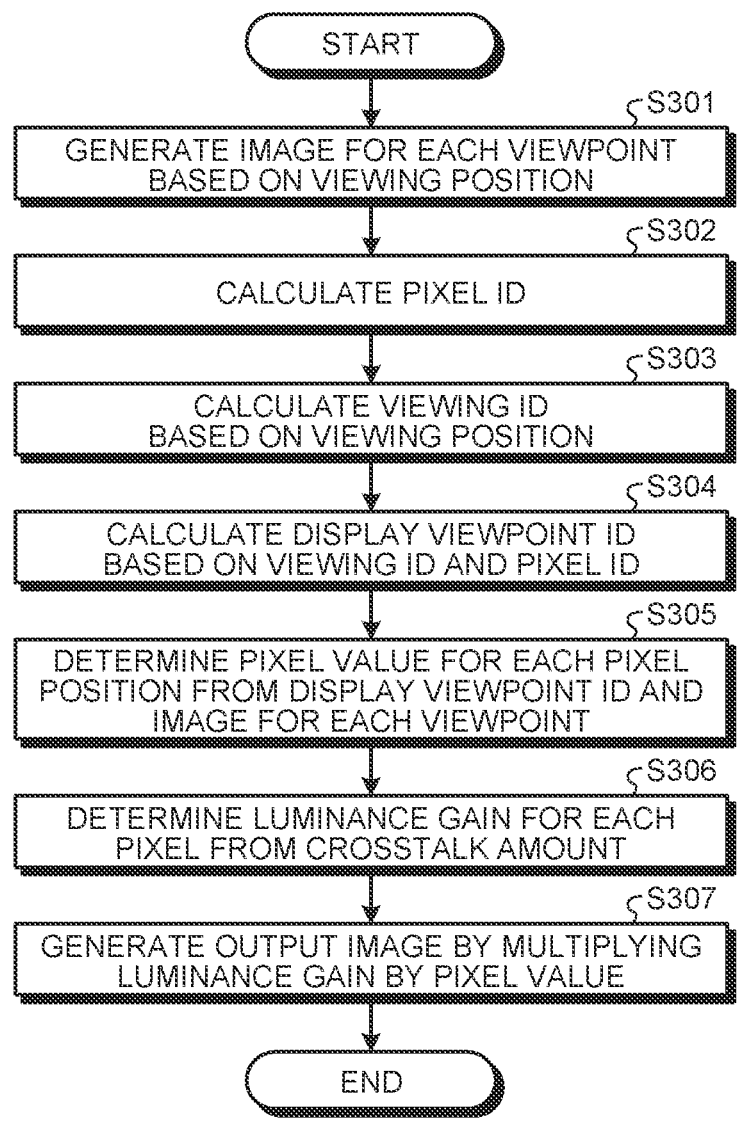
FIG. 16 is a flowchart illustrating a processing procedure according to Countermeasure (1) of the generation unit according to the embodiment.
Figure 17:
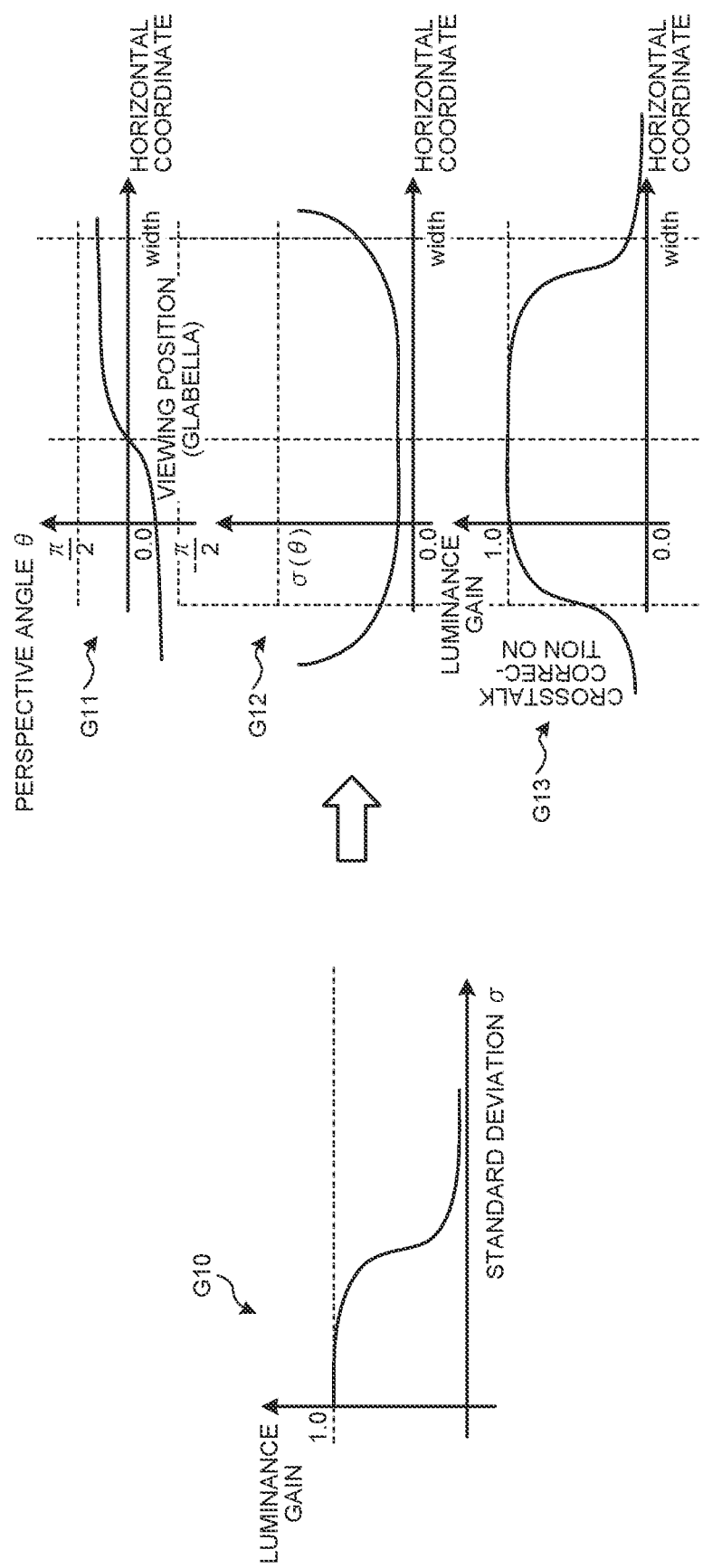
FIG. 17 is a diagram for describing a relationship among a viewing position, standard deviation σ, and a luminance gain according to Countermeasure (1) against crosstalk.

FIG. 13 is a diagram illustrating a configuration example of Countermeasure (1) of the estimation unit 33B and the generation unit 33C according to the embodiment. FIG. 14 is a flowchart illustrating an example of a processing procedure executed by the information processing apparatus 30 according to the embodiment. FIG. 15 is a flowchart illustrating a processing procedure according to Countermeasure (1) of the estimation unit 33B according to the embodiment. FIG. 16 is a flowchart illustrating a processing procedure according to Countermeasure (1) of the generation unit 33C according to the embodiment. FIG. 17 is a diagram for describing a relationship between the viewing position, the standard deviation σ, and the luminance gain according to Countermeasure (1) against crosstalk.

In the information processing apparatus 30, when Countermeasure (1) is executed, as illustrated in FIG. 13, the control unit 33 functions as the acquisition unit 33A, the estimation unit 33B, the generation unit 33C, and the display control unit 33D. The estimation unit 33B estimates the crosstalk amount γ by the functions of the perspective angle calculation unit 33B1 and the crosstalk amount estimation unit 33B4.

The processing procedure illustrated in FIG. 14 is implemented by execution of a program by the control unit 33 of the information processing apparatus 30. As illustrated in FIG. 14, the control unit 33 of the information processing apparatus 30 acquires the viewpoint position (step S100). For example, the control unit 33 acquires the viewpoint position of the viewer 200 viewing the display device 10 based on the measurement information obtained by the measurement device 20. By executing the processing of step S100, the control unit 33 functions as the acquisition unit 33A. After completion of the processing of step S100, the control unit 33 proceeds to the processing of step S200.

The control unit 33 executes crosstalk amount estimation processing (step S200). The estimation processing includes, for example, the processing procedure illustrated in FIG. 15. As illustrated in FIG. 15, the control unit 33 calculates the perspective angle θ based on the acquired viewing position (step S201). For example, the control unit 33 functions as the perspective angle calculation unit 33B1 to calculate the viewing position and the perspective angle θ of each of the plurality of pixels. The control unit 33 estimates the crosstalk amount γ based on the perspective angle θ and the model information 32B (step S202). After storing the estimated crosstalk amount γ in the storage unit 32, the control unit 33 returns the processing to step S200 illustrated in FIG. 14. By executing the processing of step S200, the control unit 33 functions as the estimation unit 33B. Returning to FIG. 14, when having completed the processing of step S200, the control unit 33 proceeds to the processing of step S300.

The control unit 33 executes image generation processing (step S300). The generation processing includes, for example, a processing procedure illustrated in FIG. 16. As illustrated in FIG. 16, the control unit 33 generates an image for each viewpoint based on the viewing position (step S301). For example, by functioning as the viewpoint image generation unit 33C1, the control unit 33 generates a two-dimensional viewpoint image that should be seen for each viewing ID based on the content information 32A. The control unit 33 calculates a pixel ID (step S302). For example, by functioning as the pixel ID calculation unit 33C3, the control unit 33 calculates pixel ID corresponding to a position ahead of each pixel 12 on the screen 11 spreading through the optical element.

The control unit 33 calculates the viewing ID based on the viewing position (step S303). For example, the control unit 33 functions as the viewing position ID calculation unit 33C2 to obtain the viewing ID corresponding to both eyes at the viewing position P. The control unit 33 calculates the display viewpoint ID based on the viewing ID and the pixel ID (step S304). For example, as illustrated in FIG. 12, based on the viewing ID, the control unit 33 calculates the display viewpoint ID according to the pixel ID. The control unit 33 determines a pixel value for each pixel position from the display viewpoint ID and the image for each viewpoint (step S305).

The control unit 33 determines a luminance gain for each pixel from the crosstalk amount γ (step S306). For example, the control unit 33 calculates a luminance gain for light reduction based on the standard deviation σ corresponding to the crosstalk amount γ from the estimation unit 33B. Any calculation method can be used as a method of calculating the luminance gain for light reduction from the standard deviation σ. For example, there is a calculation method of reducing the value of the luminance gain decreases from 1.0 to 0.0 with an increase in the standard deviation σ. In this case, the control unit 33 calculates the luminance gain using a lookup table having an outer shape as illustrated in graph G10 of FIG. 17. Furthermore, in a case where the two standard deviations σ are obtained with both eyes of the viewer 200 as the viewing position, the luminance gain can also be determined using the max function illustrated in the following Formula (8).

$$\sigma(x) = \max(\sigma_{left}(x), \sigma_{right}(x)) \quad \text{Formula (8)}$$

In addition, the control unit 33 determines the luminance gain by using parameters as illustrated in graphs G11, G12, and G13 of FIG. 17. Graphs G11, G12, and G13 illustrate the state of each parameter when viewing is performed from the right side of the screen 11 with the viewing position set to the *glabella*. Graph G11 indicates a relationship between the perspective angle θ and the horizontal coordinate with respect to the viewing position. Graph G11 indicates a relationship between the perspective angle θ and the horizontal coordinate with respect to the viewing position. Graph G12 illustrates a relationship between the standard deviation σ (σ) and the horizontal coordinate with respect to the viewing position. Graph G13 illustrates a relationship between the luminance gain and the horizontal coordinate with respect to the viewing position.

Returning to FIG. 16, the control unit 33 generates an output image by multiplying the luminance gain by the pixel value (step S307). The control unit 33 generates an image in which a region having the perspective angle θ larger than a predetermined threshold is darkened. For example, the predetermined threshold is set to a gentle threshold (soft threshold) based on the lens design value or the measured crosstalk data. The control unit 33 may generate an image darkened stepwise. After supplying the generated image to the display control unit 33D, the control unit 33 returns the processing to step S300 illustrated in FIG. 14. By executing the processing of step S300, the control unit 33 functions as the generation unit 33C. Returning to FIG. 14, when having completed the processing of step S300, the control unit 33 proceeds to the processing of step S400.

The control unit 33 executes display control processing of the generated image (step S400). For example, the control unit 33 controls the display device 10 to display the image generated by the generation unit 33C via the communication unit 31. As a result, display device 10 displays an image in which a region having a large perspective angle θ is darkened according to the viewing position of the viewer 200. By executing the processing of step S400, the control unit 33 functions as the display control unit 33D. After completion of the processing of step S400, the control unit 33 finishes the processing procedure illustrated in FIG. 14.

The crosstalk is more likely to occur at the end than at the center of the screen 11 of the display device 10. Specifically, the intensity of the crosstalk changes depending on the angle at which the viewer 200 observes the screen. The information processing apparatus 30 according to the embodiment estimates the crosstalk amount γ based on the relative positional relationship between the viewing position of the viewer 200 and the pixel 12 on the screen 11, and then generates an image in which the value of each of the plurality of pixels 12 has been corrected based on the crosstalk amount γ. The information processing apparatus 30 generates an image that becomes dark according to the perspective angle from the viewing position with respect to the pixel. This makes it possible for the information processing apparatus 30 to adjust the intensity of the crosstalk correction for each pixel based on the relative positional relationship between the viewing position and the pixel 12. As a result, the information processing apparatus 30 can suppress crosstalk while suppressing degradation in image quality of the display device 10.

The information processing apparatus 30 calculates a light reduction rate for each of the pixels 12 based on the crosstalk amount γ, and convolutes a two-dimensional image and the light reduction rate to generate an image with reduced light. This makes it possible for the information processing apparatus 30 to generate an image in which a region in which the perspective angle θ of each pixel 12 from the viewing position is larger than a predetermined threshold is darkened. As a result, the information processing apparatus 30 can darken the region where the crosstalk is large, making it possible to suppress the crosstalk while suppressing the degradation of the image quality of the display device 10.

[Information Processing Apparatus Countermeasure (2) According to Embodiment]

Figure 18:
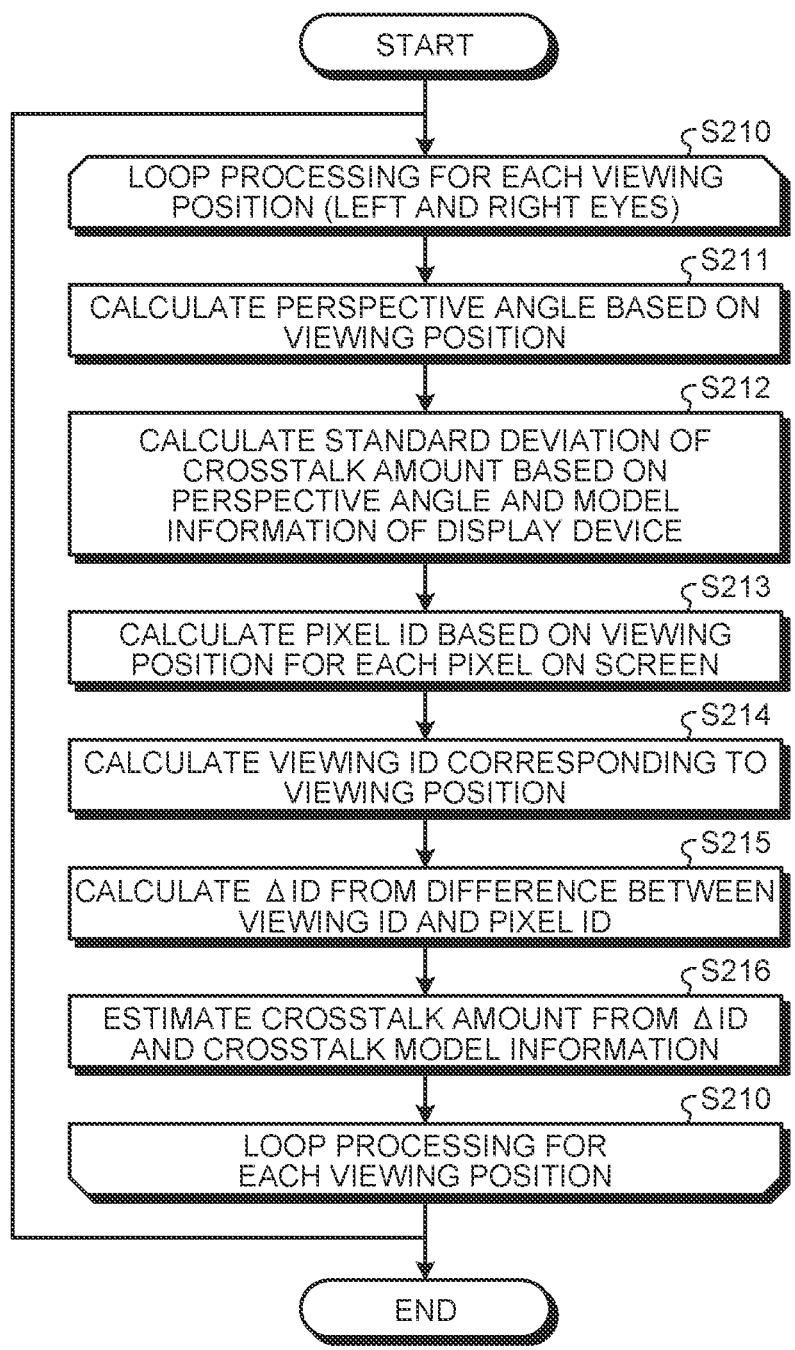
FIG. 18 is a flowchart illustrating a processing procedure according to Countermeasure (2) of the estimation unit according to the embodiment.
Figure 19:
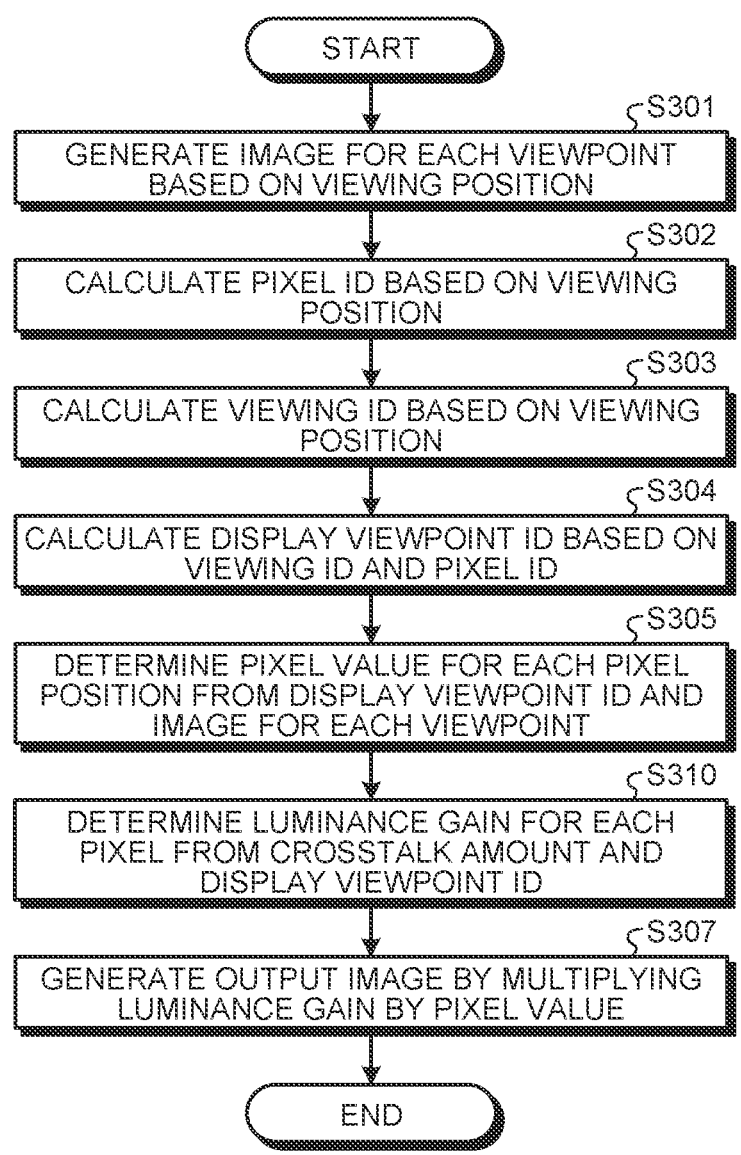
FIG. 19 is a flowchart illustrating a processing procedure according to Countermeasure (2) of the generation unit according to the embodiment.
Figure 20:
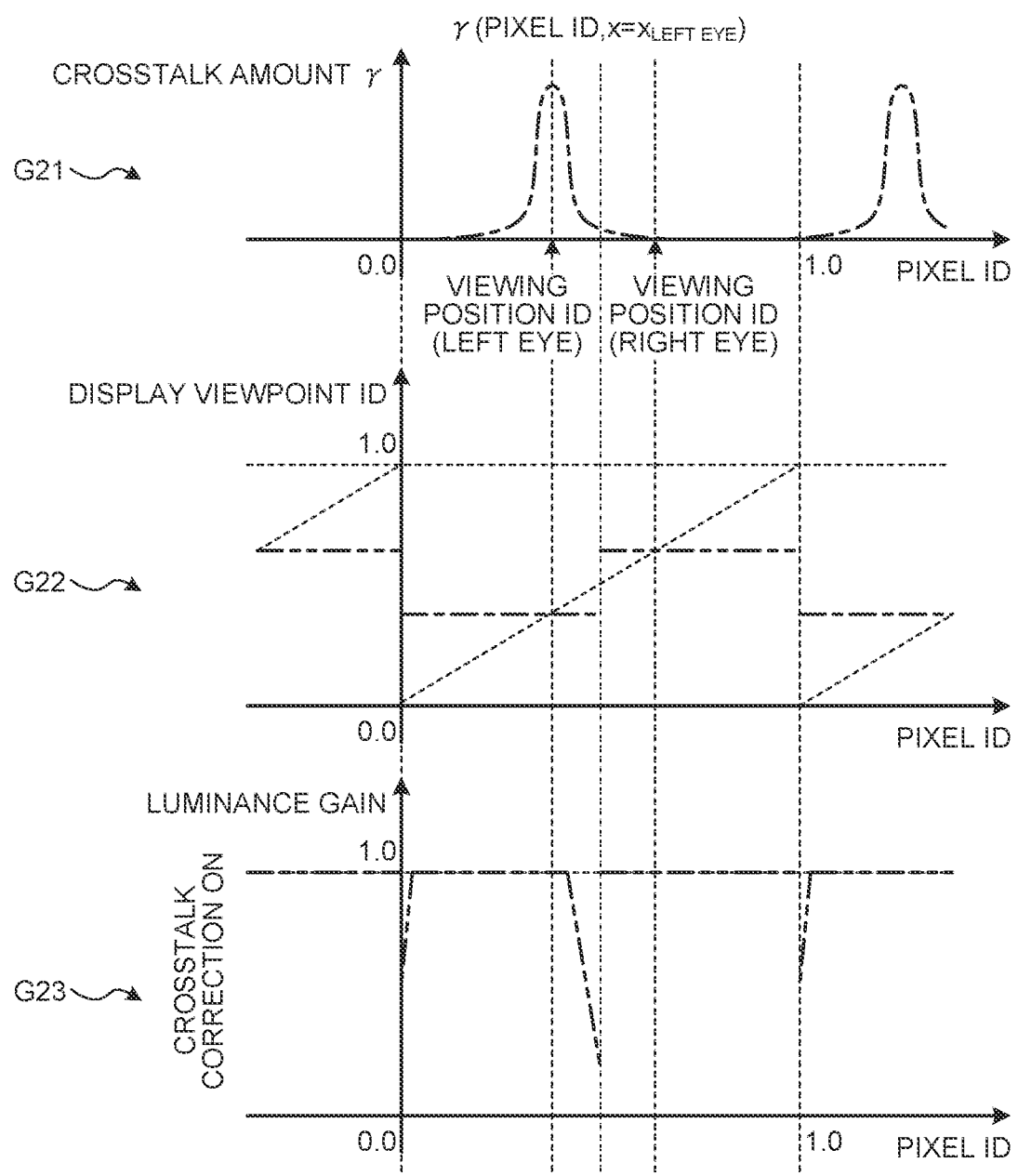
FIG. 20 is a diagram for describing a relationship between a crosstalk amount, a display viewpoint ID, a luminance gain, and a pixel ID according to Countermeasure (2) against crosstalk.
Figure 21:
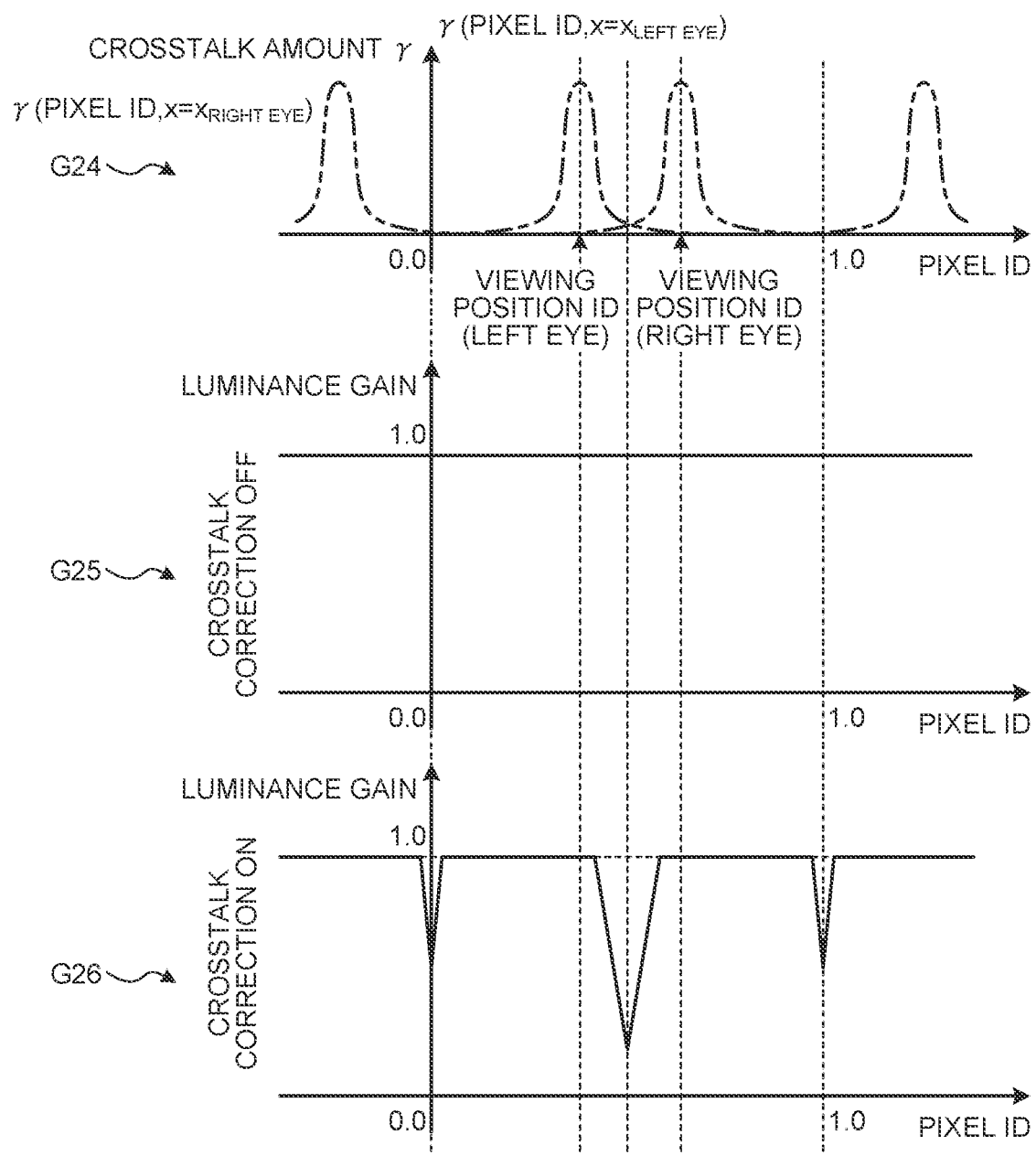
FIG. 21 is a diagram for describing a relationship between a crosstalk amount, a luminance gain, and a pixel ID according to Countermeasure (2) against crosstalk.

The information processing apparatus 30 according to the embodiment provides Countermeasure (2) of darkening the image of the boundary of viewpoints in a region where the perspective angle θ of the screen 11 is influenced by the crosstalk. FIG. 18 is a flowchart illustrating a processing procedure according to Countermeasure (2) of the estimation unit 33B according to the embodiment. FIG. 19 is a flowchart illustrating a processing procedure according to Countermeasure (2) of the generation unit 33C according to the embodiment. FIG. 20 is a diagram for describing the relationship between the crosstalk amount γ, the display viewpoint ID, the luminance gain, and the pixel ID according to Countermeasure (2) against crosstalk. FIG. 21 is a diagram for describing the relationship between the crosstalk amount γ, the luminance gain, and the pixel ID according to Countermeasure (2) against crosstalk.

The configuration of Countermeasure (2) of the estimation unit 33B and the generation unit 33C is similar to the functional configuration illustrated in FIG. 3. In the information processing apparatus 30, when Countermeasure (2) is executed, the control unit 33 functions as the acquisition unit 33A, the estimation unit 33B, the generation unit 33C, and the display control unit 33D. The information processing apparatus 30 executes the processing procedure illustrated in FIG. 14.

As illustrated in FIG. 14, the control unit 33 of the information processing apparatus 30 acquires the viewpoint position (step S100). The control unit 33 executes crosstalk amount estimation processing (step S200). In Countermeasure (2), the estimation processing includes the processing procedure illustrated in FIG. 18, for example. As illustrated in FIG. 18, the control unit 33 executes loop processing for each viewing position (left and right eyes) (step S210). The end condition of step S210 is completion of the processing for all the viewpoints. Since the example illustrated in FIG. 18 is a case having two viewpoints, the end condition is completion of the processing for the left and right eyes.

The control unit 33 calculates the perspective angle θ based on the viewing position (step S211). For example, the control unit 33 functions as the perspective angle calculation unit 33B1 to calculate the acquired viewing position and the perspective angle θ of each of the plurality of pixels. The control unit 33 calculates the standard deviation σ of the crosstalk amount γ based on the perspective angle θ and the model information 32B of the display device 10 (step S212). The control unit 33 calculates a pixel ID based on the viewing position for each pixel 12 on the screen 11 (step S213). For example, the control unit 33 calculates the pixel ID using the above Formula (3).

The control unit 33 calculates a viewing ID for the viewing position (step S214). For example, the control unit 33 calculates the viewing ID of the eyes 201 to be calculated at the viewing position P. The control unit 33 calculates ΔID from the difference between the viewing ID and the pixel ID (step S215). For example, the control unit 33 calculates a difference between the viewing position P and each pixel ID as ΔID by using the above Formula (6). The control unit 33 estimates the crosstalk amount γ from the ΔID and the model information 32B of crosstalk (step S216).

In a case where the loop processing for all the viewing positions is not ended, the control unit 33 changes the processing target and repeats the loop processing. Furthermore, in a case where the loop processing for all the viewing positions has been completed, the control unit 33 returns the processing to step S200 illustrated in FIG. 14. By executing the processing of step S200, the control unit 33 functions as the estimation unit 33B. Returning to FIG. 14, when having completed the processing of step S200, the control unit 33 proceeds to the processing of step S300.

The control unit 33 executes image generation processing (step S300). In Countermeasure (2), the generation processing includes, for example, a processing procedure illustrated in FIG. 19. As illustrated in FIG. 19, the control unit 33 generates an image for each viewpoint based on the viewing position (step S301). The control unit 33 calculates a pixel ID based on the viewpoint position (step S302). The control unit 33 calculates the viewing ID based on the viewing position (step S303). The control unit 33 calculates the display viewpoint ID based on the viewing ID and the pixel ID (step S304). The control unit 33 determines a pixel value for each pixel position from the display viewpoint ID and the image for each viewpoint (step S305). After completion of the processing of step S305, the control unit 33 proceeds to the processing of step S310.

The control unit 33 determines a luminance gain for each pixel 12 based on the crosstalk amount γ and the display viewpoint ID (step S310). For example, the control unit 33 determines the luminance gain so as to decrease in the range of 1.0 to 0.0 with respect to the increase in crosstalk amount γ. Since it is not necessary to consider the crosstalk amount γ, an image having the same ID (position) as the image observed with the left and right eyes 201 can be expressed by the following Formula (9) based on the display viewpoint ID. Formula (9) expresses the luminance gain of the left eye. $ID_{OP\_}L$ indicates the viewing ID of the left eye, and $ID(x)$ indicates the display viewpoint ID of the distance x. $\phi(\gamma)$ is a function that defines a value in a range of 0.0 to 1.0 according to the crosstalk amount γ. Note that the luminance gain of the right eye can be similarly expressed, and thus, will be omitted.

$$\text{Left-eye luminance gain}(x) = \text{if } (ID_{OP\_}L == ID(x)) 1 \text{ else } \phi(\gamma) \quad \text{Formula (9)}$$

Furthermore, when a binocular luminance gain (x) is to be obtained for the viewer 200, the luminance gain is determined using the min function expressed by the following Formula (10).

$$\text{Binocular luminance gain}(x) = \min(\text{Left-eye luminance gain}(x), \text{right-eye luminance gain}(x)) \quad \text{Formula (10)}$$

Furthermore, the control unit 33 can determine the luminance gain by using parameters as illustrated in graphs G21, G22, and G23 of FIG. 20. Graphs G21, G22, and G23 in FIG. 20 are used to determine the luminance gain for each pixel ID at the time of two-viewpoint output in consideration of crosstalk to the right eye. Graphs G21, G22, and G23 illustrate states of parameters in consideration of the viewing position of the right eye. Graph G21 illustrates a relationship between the crosstalk amount γ and the pixel ID. Graph G22 indicates a relationship between the display viewpoint ID and the pixel ID. Graph G23 illustrates a relationship between the luminance gain and the pixel ID.

Furthermore, the control unit 33 can determine the luminance gain by using parameters as illustrated in Graphs G24, G25, and G26 of FIG. 21. Graphs G24, G25, and G26 in FIG. 21 are used to determine a luminance gain for each pixel ID at the time of two-viewpoint output in consideration of crosstalk of both eyes. Graphs G24, G25, and G26 illustrate the state of each parameter with respect to the viewing position of both eyes. Graph G24 illustrates a relationship between the crosstalk amount γ and the pixel ID. Graph G25 illustrates a relationship between the luminance gain and the pixel ID in a case where the crosstalk correction is OFF. Graph G26 illustrates a relationship between the luminance gain and the pixel ID in a case where the crosstalk correction is ON.

Returning to FIG. 19, the control unit 33 generates an output image by multiplying the luminance gain by the pixel value (step S307). That is, the control unit 33 generates an image in which the display viewpoint ID having the crosstalk amount γ larger than the predetermined threshold is darkened. After supplying the generated output image to the display control unit 33D, the control unit 33 returns the processing to step S300 illustrated in FIG. 14. By executing the processing of step S300, the control unit 33 functions as the generation unit 33C. Returning to FIG. 14, when having completed the processing of step S300, the control unit 33 proceeds to the processing of step S400.

The control unit 33 executes display control processing of the generated image (step S400). For example, the control unit 33 controls the display device 10 to display the image generated by the generation unit 33C via the communication unit 31. As a result, the display device 10 displays an image in which the display viewpoint ID having the large crosstalk amount γ is darkened according to the viewing position of the viewer 200. By executing the processing of step S400, the control unit 33 functions as the display control unit 33D. After completion of the processing of step S400, the control unit 33 finishes the processing procedure illustrated in FIG. 14.

The information processing apparatus 30 according to Countermeasure (2) estimates the crosstalk amount γ based on a difference between the viewing position and the pixel position indicating the position where the light beam of the pixel 12 spreads. The information processing apparatus 30 calculates the display viewpoint position based on the relationship between the viewing position and the pixel position, calculates the light reduction rate for each pixel 12 based on the display viewpoint position and the crosstalk amount, and convolutes a two-dimensional image and the light reduction rate to generate an image with reduced light. With this operation, the information processing apparatus 30 can darken a boundary portion between adjacent images in a continuous images in the region where the perspective angle θ is larger than the surroundings. For example, in the case of two viewpoints, the information processing apparatus 30 can darken the pixels 12 near the boundary between the left-eye image and the right-eye image. As a result, the information processing apparatus 30 can partially darken the region where the crosstalk is large, making it possible to suppress the crosstalk while suppressing the degradation of the image quality of the display device 10.

[Information Processing Apparatus Countermeasure (3) According to Embodiment]

Figure 22:
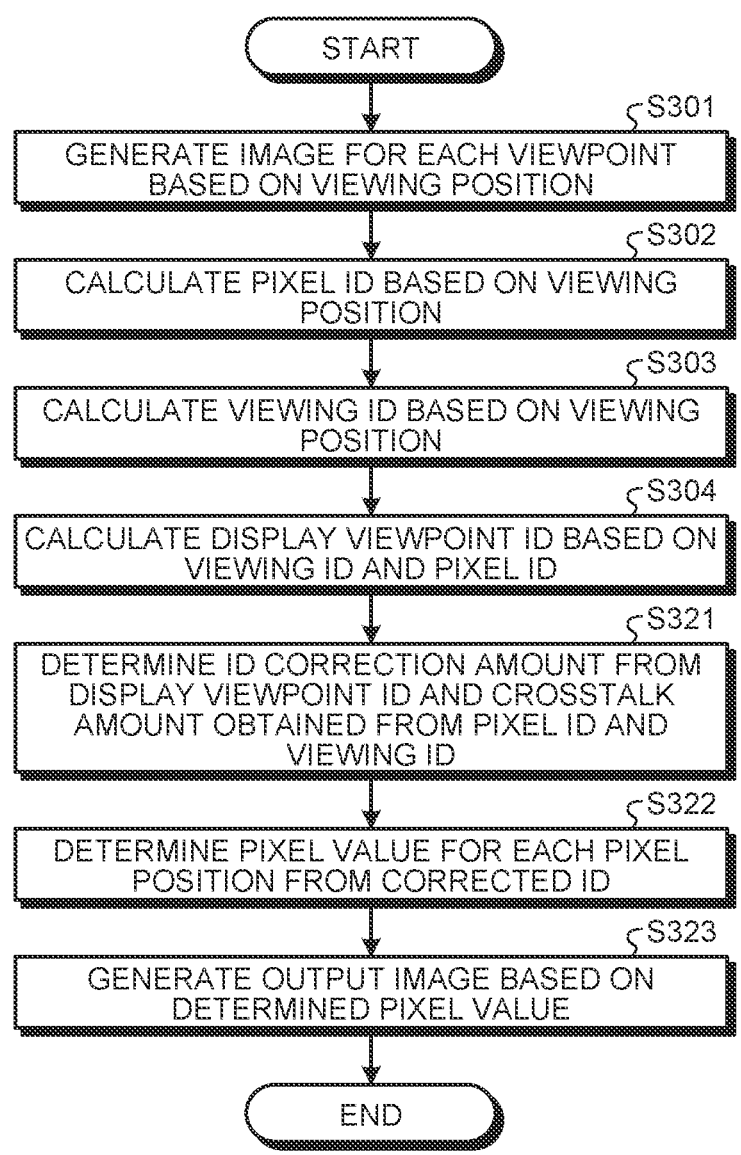
FIG. 22 is a flowchart illustrating a processing procedure according to Countermeasure (3) of the generation unit according to the embodiment.
Figure 23:
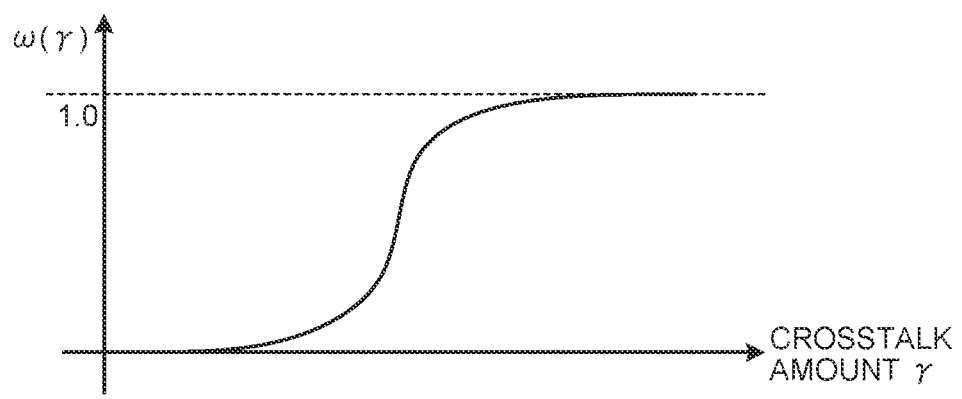
FIG. 23 is a diagram for describing a relationship between ω(γ) and a crosstalk amount γ according to Countermeasure (3) against crosstalk.
Figure 24:
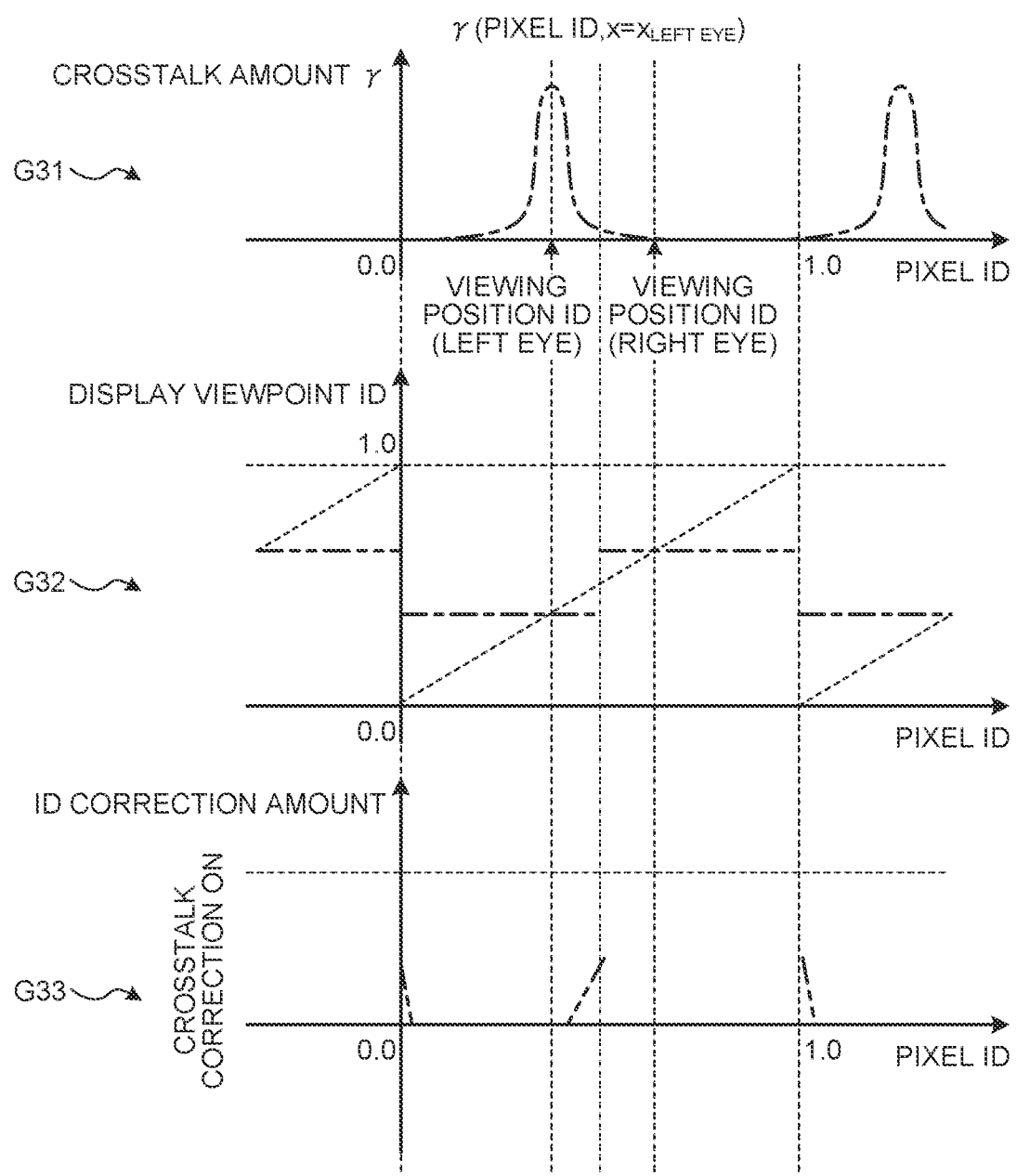
FIG. 24 is a diagram for describing a relationship between the crosstalk amount, the display viewpoint ID, and an ID correction amount according to Countermeasure (3) against crosstalk.
Figure 25:
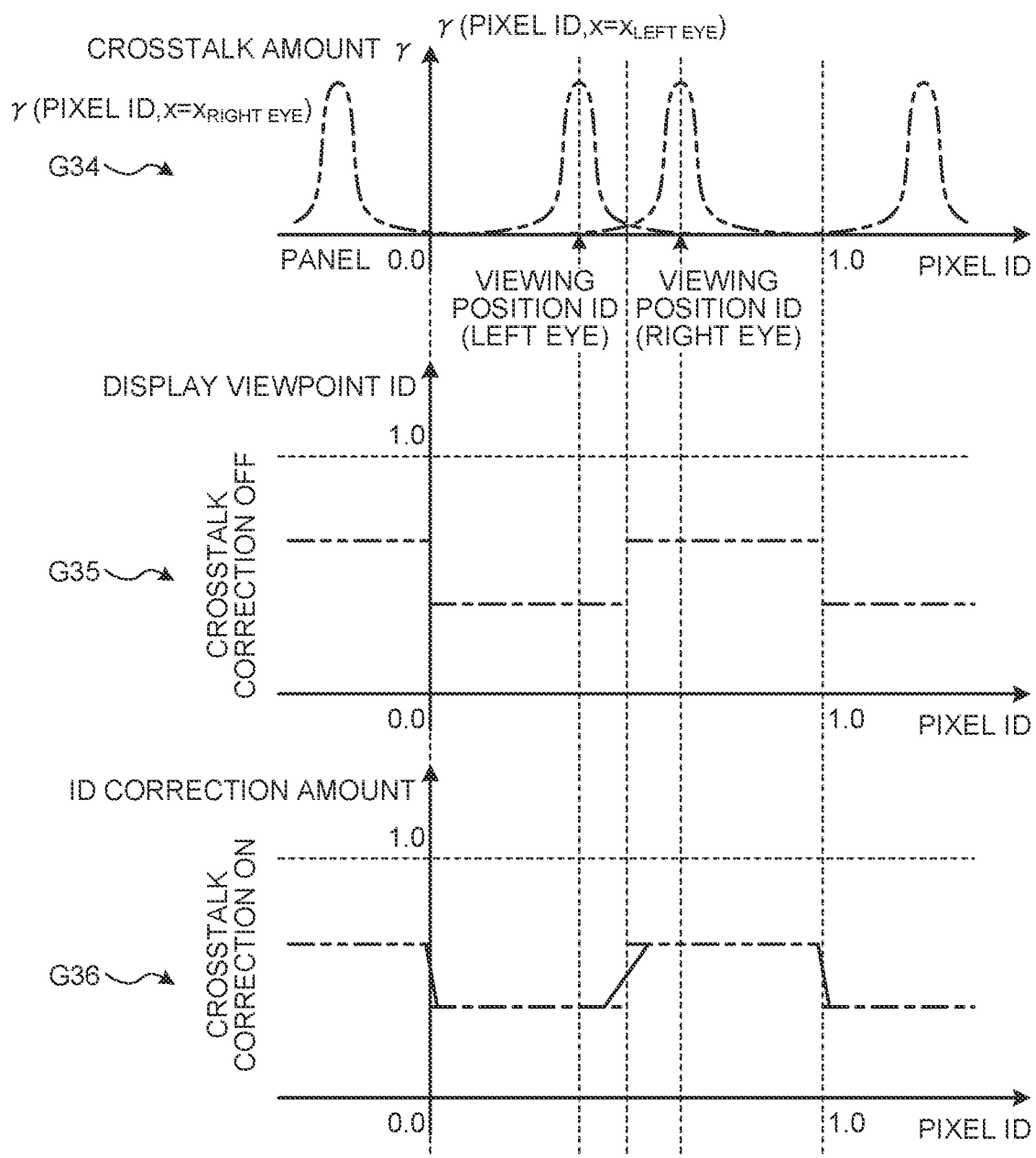
FIG. 25 is a diagram for describing a relationship between the crosstalk amount, the display viewpoint ID, the ID correction amount, and the pixel ID according to Countermeasure (3) against crosstalk.
Figure 26:
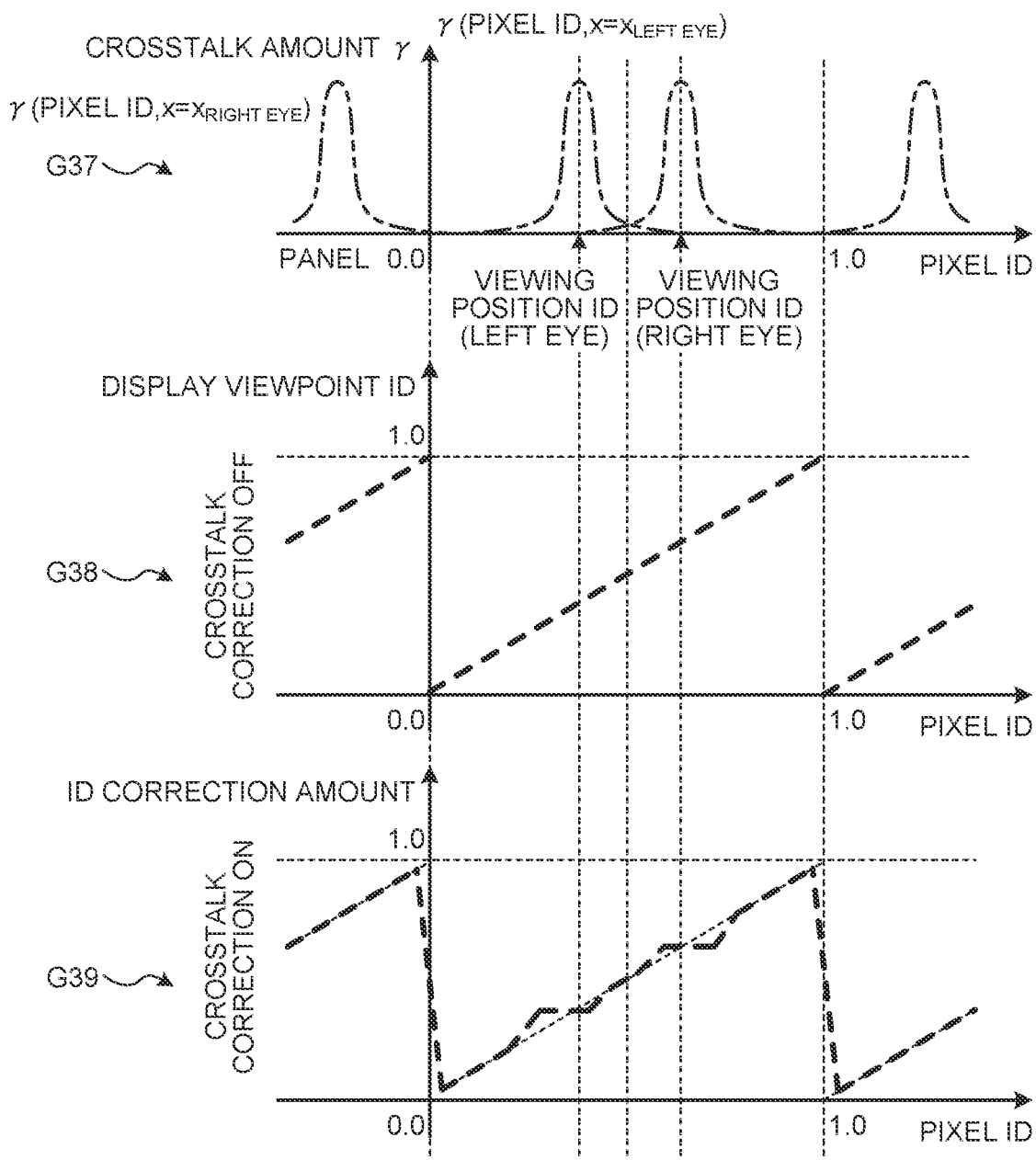
FIG. 26 is a diagram for describing a relationship between the multiple viewpoint crosstalk amount, the display viewpoint ID, the ID correction amount, and the pixel ID according to Countermeasure (3) against crosstalk.

The information processing apparatus 30 according to the embodiment provides Countermeasure (3) that generates an image in which an intermediate ID and parallax are suppressed in cases where ID assignment is rough and a quantization error occurs, or there is a large change in the parallax of the image to be displayed, and the like. FIG. 22 is a flowchart illustrating a processing procedure according to Countermeasure (3) of the generation unit 33C according to the embodiment. FIG. 23 is a diagram for describing the relationship between ω(γ) and the crosstalk amount γ according to Countermeasure (3) against crosstalk. FIG. 24 is a diagram for describing a relationship between the crosstalk amount γ, the display viewpoint ID, and the ID correction amount according to Countermeasure (3) against crosstalk. FIG. 25 is a diagram for describing the relationship between the crosstalk amount γ, the display viewpoint ID, the ID correction amount, and the pixel ID according to Countermeasure (3) against crosstalk. FIG. 26 is a diagram for describing a relationship between the crosstalk amount γ for multiple viewpoints, the display viewpoint ID, the ID correction amount, and the pixel ID, according to Countermeasure (3) against crosstalk.

The configuration of Countermeasure (3) of the estimation unit 33B and the generation unit 33C is similar to the functional configuration illustrated in FIG. 3. In the information processing apparatus 30, when Countermeasure (3) is executed, the control unit 33 functions as the acquisition unit 33A, the estimation unit 33B, the generation unit 33C, and the display control unit 33D. The information processing apparatus 30 executes the processing procedure illustrated in FIG. 14.

As illustrated in FIG. 14, the control unit 33 of the information processing apparatus 30 acquires the viewpoint position (step S100). The control unit 33 executes crosstalk amount estimation processing (step S200). In Countermeasure (3), for example, the estimation processing of Countermeasure (2) illustrated in FIG. 18 can be used as the estimation processing. After completion of the processing of step S200, the control unit 33 proceeds to the processing of step S300.

The control unit 33 executes image generation processing (step S300). In Countermeasure (3), the generation processing includes, for example, a processing procedure illustrated in FIG. 22. As illustrated in FIG. 22, the control unit 33 generates an image for each viewpoint based on the viewing position (step S301). The control unit 33 calculates a pixel ID based on the viewpoint position (step S302). The control unit 33 calculates the viewing ID based on the viewing position (step S303). The control unit 33 calculates the display viewpoint ID based on the viewing ID and the pixel ID (step S304). After completion of the processing of step S304, the control unit 33 proceeds to the processing of step S321.

The control unit 33 determines the ID correction amount based on each display viewpoint ID and the crosstalk amount γ obtained from the pixel ID and the viewing ID (step S321). For example, the control unit 33 determines the ID correction amount so as to bring the display viewpoint ID of the pixel that causes the crosstalk close to the display viewpoint ID of the viewing position in accordance with the magnitude of the crosstalk amount γ. Regarding an image having the same ID as the image observed with the left and right eyes 201, there is no need to take crosstalk in consideration. Therefore, as an example of the correction amount, the correction amount can be expressed by the following Formula (11) based on the display viewpoint ID. Formula (11) expresses the correction amount of the left eye. $ID_{OP\_L}$ indicates the viewing ID of the left eye, and ID(x) indicates the display viewpoint ID of the distance x. As illustrated in FIG. 23, $\omega(\gamma_L)$ is a function that defines a value in a range of 0.0 to 1.0 according to the crosstalk amount γ of the left eye. Note that the correction amount of the right eye can be similarly expressed, and thus, will be omitted.

$$\text{Correction amount}(x) \text{ of left eye} = (ID_{OP\_L} - ID(x)) \cdot \omega(\gamma_L) \quad \text{Formula (11)}$$

Furthermore, in a case where the correction amount (x) for both eyes of the viewer 200 is to be obtained, a luminance gain is determined by adding the correction amount (x) for the left eye and the correction amount (x) for the right eye.

In addition, the control unit 33 can determine the ID correction amount using parameters as illustrated graphs G31, G32, and G33 of FIG. 24. Graphs G31, G32, and G33 in FIG. 24 are used to determine the correction amount of the display viewpoint ID at the time of two-viewpoint output in consideration of the crosstalk to the right eye. Graphs G31, G32, and G33 illustrate states of parameters in consideration of the viewing position of the right eye. Graph G31 illustrates a relationship between the crosstalk amount γ and the pixel ID. Graph G32 indicates a relationship between the display viewpoint ID and the pixel ID. Graph G33 indicates a relationship between the ID correction amount and the pixel ID.

In addition, the control unit 33 can determine the ID correction amount using parameters as illustrated in graphs G34, G35, and G36 of FIG. 25. Graphs G34, G35, and G36 in FIG. 25 are used to determine the correction amount of the display viewpoint ID at the time of two-viewpoint output in consideration of the crosstalk to both eyes. Graphs G34, G35, and G36 illustrate the state of each parameter with respect to the viewing position of both eyes. Graph G34 illustrates a relationship between the crosstalk amount γ and the pixel ID. Graph G35 illustrates a relationship between the display viewpoint ID and the pixel ID in a case where the crosstalk correction is OFF. Graph G36 illustrates a relationship between the ID correction amount and the pixel ID in a case where the crosstalk correction is ON.

In addition, in the case of Countermeasure (3) for multiple viewpoints, the crosstalk amount γ for each ID is the same as that in the case of two viewpoints. However, since the display viewpoint ID before correction is different, the correction value changes for each ID. In this case, by the control unit 33, graphs G37, G38, and G39 in FIG. 26 are used to determine the correction amount of the display viewpoint ID at the time of multiple viewpoint output in consideration of the crosstalk to both eyes. Graphs G37, G38, and G39 illustrate the state of each parameter with respect to the viewing position of both eyes. Graph G37 illustrates a relationship between the crosstalk amount γ and the pixel ID. Graph G38 illustrates a relationship between the display viewpoint ID and the pixel ID in a case where the crosstalk correction is OFF. Graph G39 illustrates a relationship between the ID correction amount and the pixel ID in a case where the crosstalk correction is ON.

Returning to FIG. 22, when having completed the processing of step S321, the control unit 33 proceeds to the processing of step S322. The control unit 33 determines a pixel value for each pixel position based on the corrected ID (step S322). The control unit 33 generates an output image based on the determined pixel value (step S323). That is, the control unit 33 generates an image in which the viewpoint ID having the crosstalk amount γ larger than the surroundings is darkened. After supplying the generated image to the display control unit 33D, the control unit 33 returns the processing to step S300 illustrated in FIG. 14. By executing the processing of step S300, the control unit 33 functions as the generation unit 33C. Returning to FIG. 14, when having completed the processing of step S300, the control unit 33 proceeds to the processing of step S400.

The control unit 33 executes display control processing of the generated image (step S400). For example, the control unit 33 controls the display device 10 to display the image generated by the generation unit 33C via the communication unit 31. As a result, the display device 10 displays an image in which the display viewpoint ID having the large crosstalk amount γ is darkened according to the viewing position of the viewer 200. By executing the processing of step S400, the control unit 33 functions as the display control unit 33D. After completion of the processing of step S400, the control unit 33 finishes the processing procedure illustrated in FIG. 14.

The information processing apparatus 30 according to Countermeasure (3) estimates the crosstalk amount γ based on a difference between the viewing position and the pixel position indicating the position where the light beam of the pixel 12 spreads. The information processing apparatus 30 calculates a correction amount based on the crosstalk amount γ so as to bring the display viewpoint position of the pixel 12 closer to the display viewpoint position of the viewing position, and then generates the image based on a two-dimensional image so as to obtain a pixel value for each pixel position determined based on the correction amount. This makes it possible for the information processing apparatus 30 to darken the display viewpoint position where the crosstalk amount γ is larger than a predetermined threshold. As a result, the information processing apparatus 30 can display an image in which the parallax is suppressed even with a large change in the parallax, making it possible to suppress the crosstalk while suppressing the degradation of the image quality of the display device 10.

In the above embodiment, Countermeasure (3) may be changed from Countermeasure (1), applied to other countermeasures, or used in combination.

Figure 27:
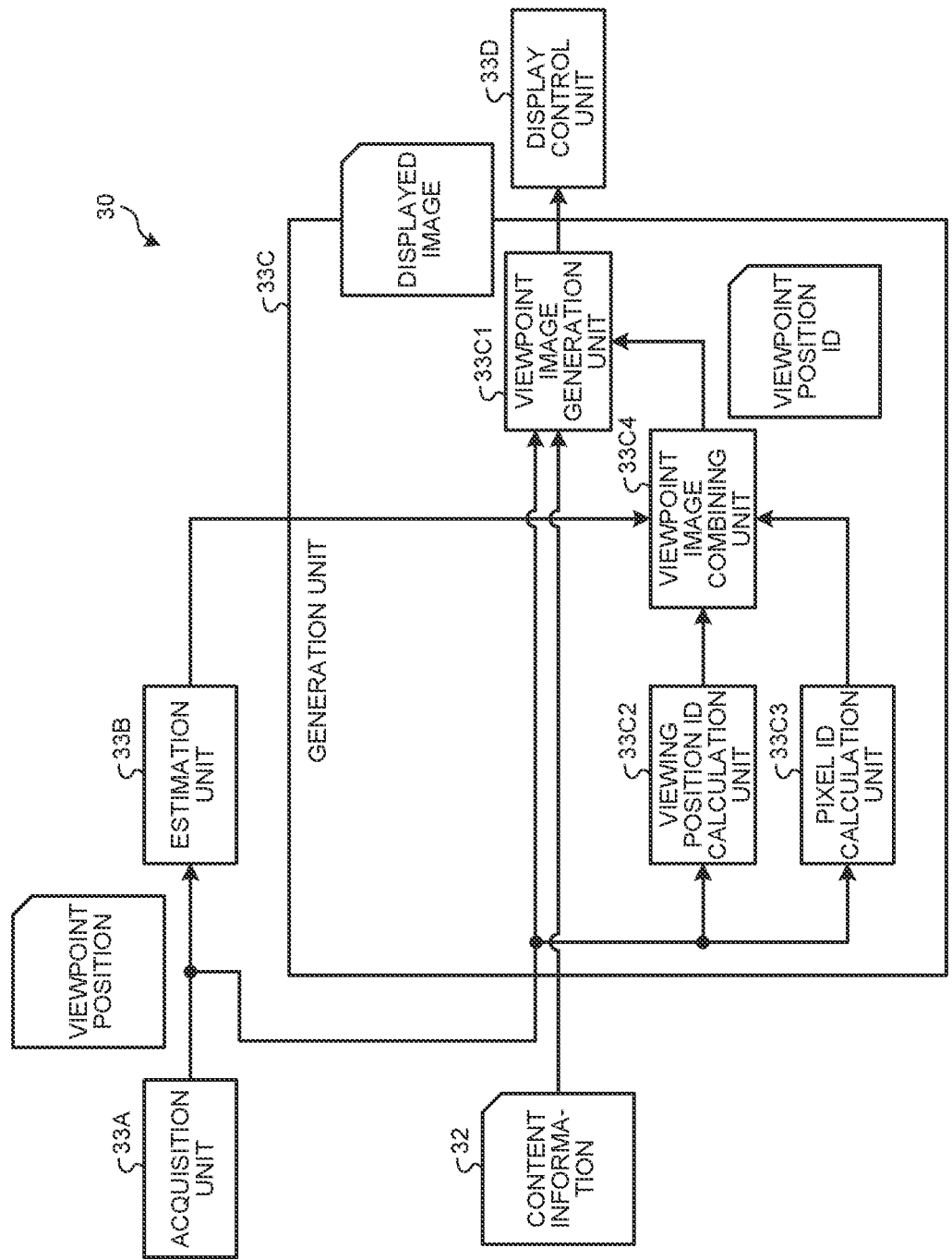
FIG. 27 is a diagram illustrating another example of the functional configuration of Countermeasure (2) of the generation unit according to the embodiment.

FIG. 27 is a diagram illustrating another example of the functional configuration of Countermeasure (2) of the generation unit 33C according to the embodiment. As illustrated in FIG. 27, the generation unit 33C can change the order of processing of the viewpoint image generation unit 33C1. For example, the generation unit 33C may be configured such that the viewpoint image generation unit 33C1 combines viewpoint images based on the viewing ID of the viewing position ID calculation unit 33C2, the pixel ID of the pixel ID calculation unit 33C3, and the crosstalk amount γ estimated by the estimation unit 33B, and thereafter the viewpoint image generation unit 33C1 generates an image. That is, the information processing apparatus 30 may generate the viewpoint image for each pixel 12 after determining the ID. With this procedure of first determining the display viewpoint ID of each pixel 12 and then generating the viewpoint image, the information processing apparatus 30 can reduce the processing steps. Furthermore, by using a viewpoint image to be provided for each pixel 12, the information processing apparatus 30 can reduce the amount of data to handle.

Although the above is a case where the information processing apparatus 30 uses a normal distribution of the model as a crosstalk estimation technique and calculates the standard deviation σ from the perspective angle θ, the operation is not limited thereto. For example, the information processing apparatus 30 may use a two-dimensional lookup table so as to directly estimate the crosstalk amount γ from the perspective angle θ and the ΔID.

The information processing apparatus 30 may combine existing suppression methods as long as the processing can be performed based on the viewing position and the relative position of each pixel.

Although the above is a case where the information processing apparatus 30 uses the barrier 13 of the display device 10, the optical system is not limited thereto. The information processing apparatus 30 can also use a lens of the display device 10 to achieve the countermeasure similarly. In addition, although the above is a case where the information processing apparatus 30 uses the countermeasures against the horizontal parallax in the parallax barrier, the application target is not limited thereto. The information processing apparatus 30 can expand the countermeasure also to vertical parallax (integral method) by a pinhole array or a microlens array, for example.

Although the above is a case where the information processing apparatus 30 uses the display device 10 in which the barrier 13 is arranged on the front side of the plurality of pixels 12, arrangement is not limited thereto. For example, the information processing apparatus 30 may use a display device in which the barrier 13 is arranged behind the plurality of pixels 12. That is, the information processing apparatus 30 can use display devices of various optical systems. In the optical system, for example, the openings 13a of the barrier 13 may be at equal intervals or at non-equal intervals. The optical system may use a lenticular lens. For other optical systems different from the parallax barrier at equal intervals, the information processing apparatus 30 may define the viewing position and the proximity of the light emitted from each pixel similarly to the optical system of the parallax barrier. For example, in the case of the lenticular lens, it is possible to achieve the processing with normalization while calculating the PITCH on the screen 11 by refraction.

When using the parallax barrier display device 10, the information processing apparatus 30 can express only horizontal parallax. However, the technique can also be applied to vertical parallax (integral type) by a pinhole array or a microlens array.

Furthermore, although the present embodiment is a case where the information processing apparatus 30 is provided outside the display device 10, the arrangement is not limited thereto. For example, the information processing apparatus 30 may be incorporated in the display device 10 or the measurement device 20. For example, the information processing apparatus 30 may be implemented by an information processing server or the like capable of communicating with the display device 10. The information processing apparatus 30 can be used for, for example, a head mounted display (HMD), a tablet PC, or the like.

Modification (1) of Embodiment

Crosstalk can be classified into, for example, inter-pixel crosstalk and inter-viewpoint crosstalk. For example, since the pixels allocated to the left and right eyes and to which the same display viewpoint ID is allocated also have different pixel IDs, variation occurs in the distances (difference between the viewing position ID and the pixel ID) from the left and right viewing position IDs. Therefore, in the above description, a method of calculating and correcting the crosstalk amount from the neighboring image for the target pixel mainly based on the distance for each pixel has been considered to be applied to crosstalk. Hereinafter, this concept of the crosstalk amount will be referred to as inter-pixel crosstalk. Here, the neighboring pixels are defined as several pixels around a target pixel, having a sufficient leakage amount.

In contrast to inter-pixel crosstalk, inter-viewpoint crosstalk is defined as a method represented by one crosstalk phenomenon for each viewpoint. In inter-viewpoint crosstalk, crosstalk is assumed in units of peripheral pixel groups with equal viewpoint allocation. Specifically, the crosstalk amount may be calculated based on a display viewpoint ID or the like instead of the pixel ID.

In the case of the inter-viewpoint crosstalk, the crosstalk amount is constant within an identical display viewpoint ID, leading to an assumption as a comparison in which an additive average of pixels weighted according to a physical distance is used as a representative value. This causes loss of high-frequency information in units of pixels. On the other hand, calculation of the viewpoint number in the inter-viewpoint crosstalk only requires the representative value, leading to highly probable achievement of reduction of the amount of arithmetic operation. Since the actual crosstalk amount is about several %, a minute change is not noticeable. In view of this, making a realistic decision to selectively perform processing on dominant low-frequency signals and performing correction based on inter-viewpoint crosstalk will be expected to produce a very high effect. In Modification (1) of the following embodiment, an information processing apparatus 30 using inter-viewpoint crosstalk will be described.

[Functional Configuration Example of Information Processing Apparatus According to Modification (1) of Embodiment]

As illustrated in FIG. 2, the information processing apparatus 30 according to Modification (1) of the embodiment includes a display device 10, a measurement device 20, and an information processing apparatus 30. The information processing apparatus 30 includes a communication unit 31, a storage unit 32, and a control unit 33. By executing a program, the control unit 33 of the information processing apparatus 30 functions as a functional unit such as the acquisition unit 33A, an estimation unit 33B, a generation unit 33C, and a display control unit 33D. The control unit 33 executes the program, whereby the information processing apparatus 30 executes the processing procedure from step S100 to step S400 illustrated in FIG. 14.

Figure 28:
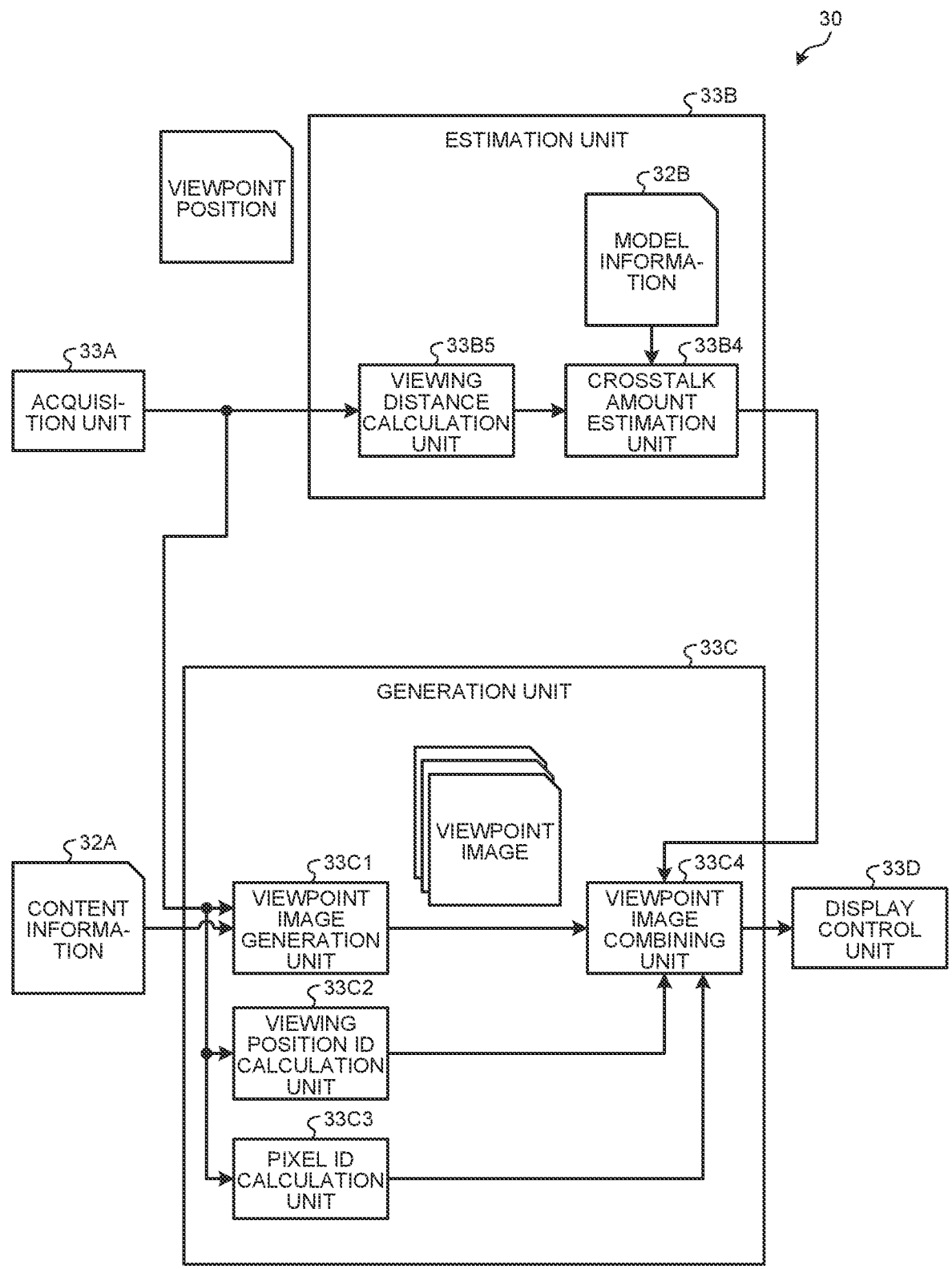
FIG. 28 is a diagram illustrating a functional configuration example of an estimation unit and a generation unit according to Modification (1) of the embodiment.
Figure 29:
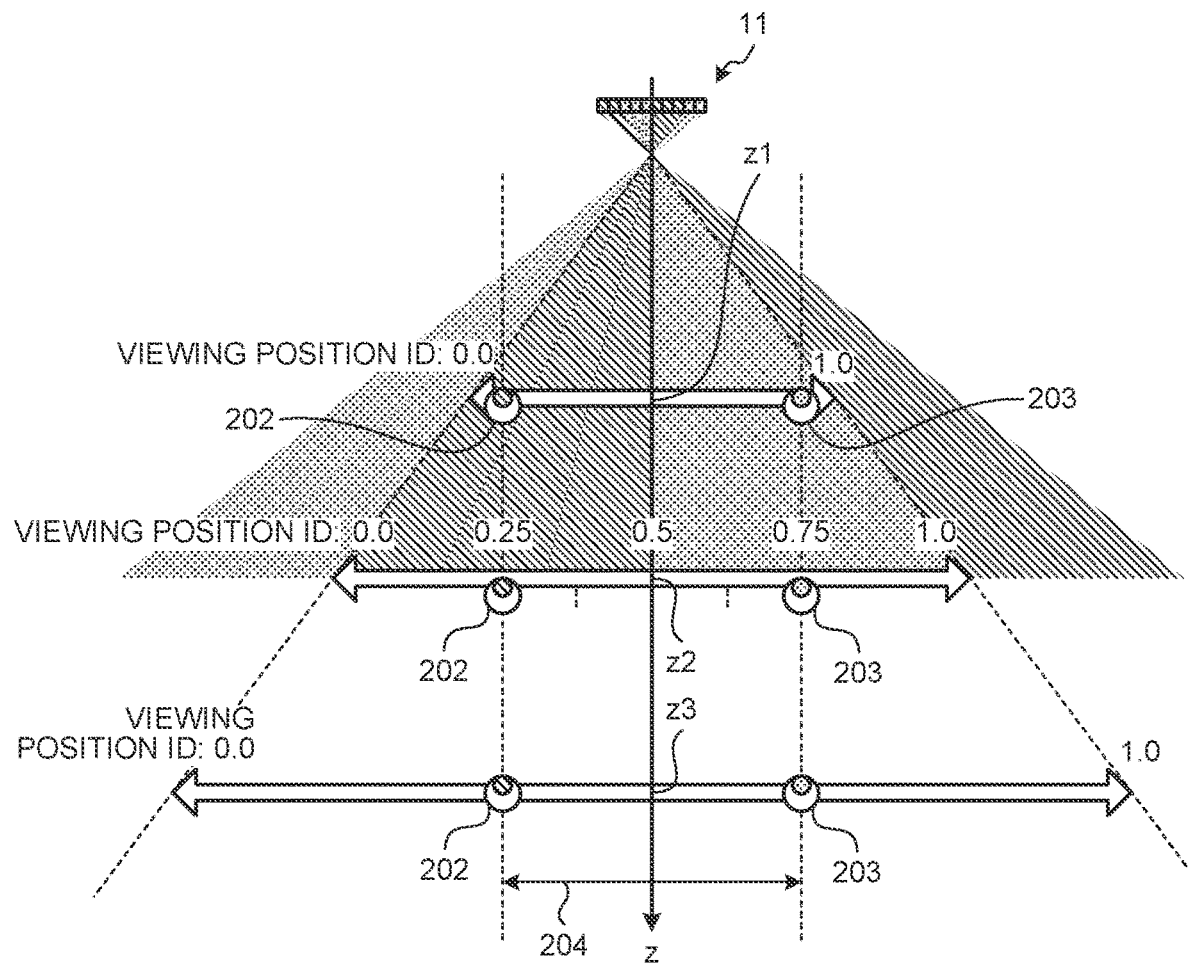
FIG. 29 is a diagram for describing an example of a positional relationship between pixels of the display device and a viewing distance.
Figure 30:
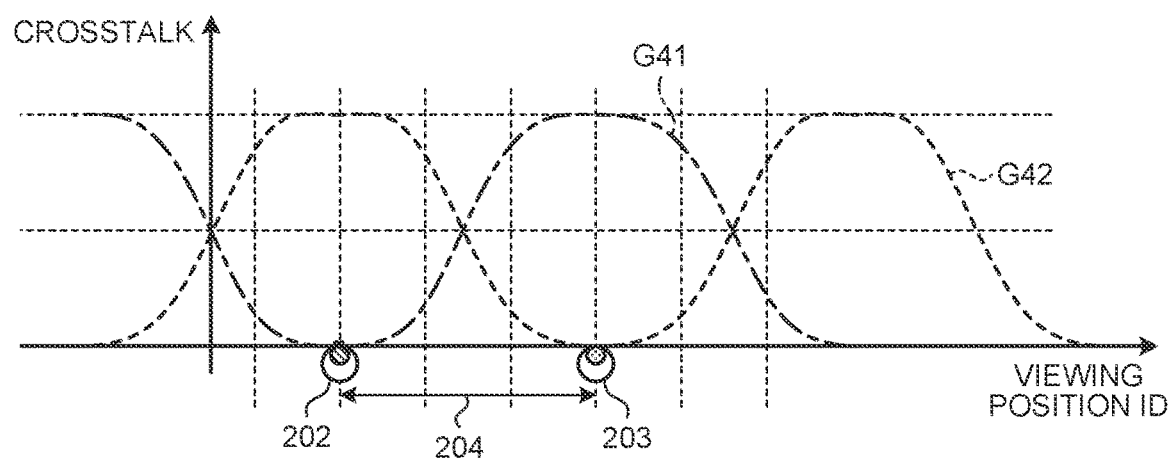
FIG. 30 is a diagram for describing a relationship between a crosstalk amount and a viewing position ID with respect to a viewing distance z2 illustrated in FIG. 29.
Figure 31:
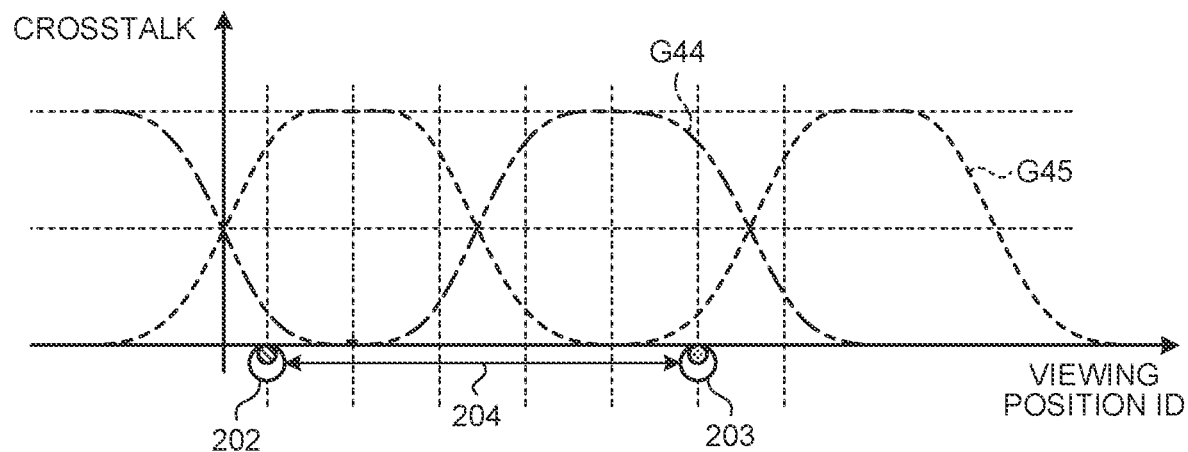
FIG. 31 is a diagram for describing a relationship between a crosstalk amount and a viewing position ID with respect to a viewing distance z1 illustrated in FIG. 29.
Figure 32:
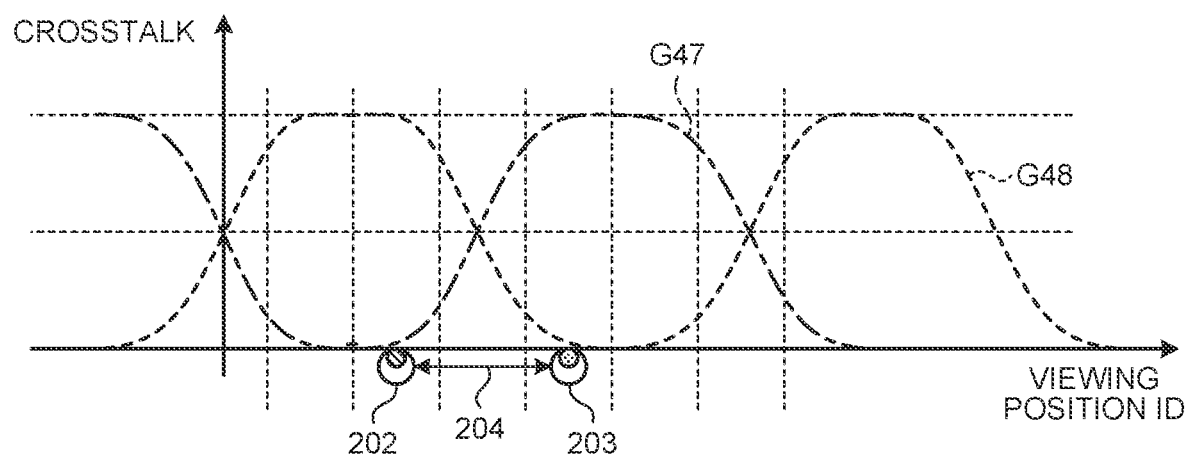
FIG. 32 is a diagram for describing a relationship between a crosstalk amount and a viewing position ID with respect to a viewing distance z3 illustrated in FIG. 29.
Figure 33:
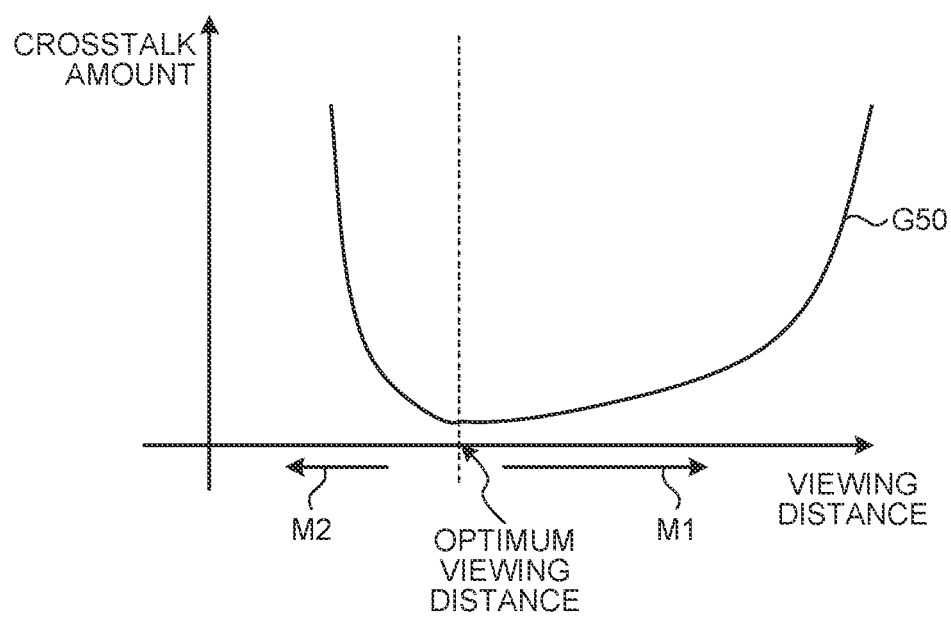
FIG. 33 is a diagram for describing an example of model information according to Modification (1) of the embodiment.

FIG. 28 is a diagram illustrating a functional configuration example of the estimation unit 33B and the generation unit 33C according to Modification (1) of the embodiment. FIG. 29 is a diagram for describing an example of a positional relationship between pixels of a display device and a viewing distance. FIG. 30 is a diagram for describing a relationship between a crosstalk amount and a viewing position ID with respect to a viewing distance z2 illustrated in FIG. 29. FIG. 31 is a diagram for describing a relationship between a crosstalk amount and a viewing position ID with respect to a viewing distance z1 illustrated in FIG. 29. FIG. 32 is a diagram for describing a relationship between a crosstalk amount and a viewing position ID with respect to a viewing distance z3 illustrated in FIG. 29. FIG. 33 is a diagram for describing an example of the model information 32B according to Modification (1) of the embodiment.

As illustrated in FIG. 28, in the information processing apparatus 30 according to Modification (1) of the embodiment, the functional configuration of the estimation unit 33B is different from the functional configuration according to the above embodiment. That is, the estimation unit 33B estimates the crosstalk amount $\gamma$ by the functions of a viewing distance calculation unit 33B5 and a crosstalk amount estimation unit 33B4, thereby implementing the inter-viewpoint crosstalk method.

The information processing apparatus 30 according to Modification (1) of the embodiment is very effective when a perspective angle of display device 10 with respect to screen 11 (panel) is sufficiently small and can be approximated to 0 degrees. In Modification (1) of the embodiment, for example, it is assumed that the viewer 200 stands at the center of the display device 10 and views at a sufficient distance, with the perspective angle being sufficiently small with respect to the pixel at the screen end of the display device 10.

In the two-viewpoint output operation, the information processing apparatus 30 allocates all the pixels of the display device 10 to one or the other of two viewpoints, namely, left and right viewpoints. At this time, the viewpoint can be allocated by the following procedure. First, a difference between the pixel ID and the viewing position IDs of the left and right eyes is obtained for each pixel to calculate a distance $\Delta$ID between the IDs. Thereafter, the viewpoint of the eye having the smaller distance, that is, the eye having the smaller difference in ID is allocated. With allocation of a viewpoint having the minimum $\Delta$ID to each pixel in this manner, the *glabella* position of the viewer 200 comes at a boundary of the viewpoint allocation of a left eye 202 and a right eye 203 as illustrated in FIG. 29. Additionally, the distance between both eyes (here, $\Delta$ID as a difference between the viewing position IDs) can be uniquely obtained from an interocular distance 204 and the viewing distance z of the viewer 200. In FIG. 29, the interocular distance 204 is a fixed value.

In the example illustrated in FIG. 29, the viewing distance z2 is a distance at which $\Delta$ID of the left eye 202 to the right eye 203 is 0.5. At this time, the distance from the left eye 202 to the right eye 203 is 0.5 in either the rightward direction or the leftward direction. That is, the $\Delta$ID between both eyes is 0.5 being the maximum value, and the crosstalk amount is minimized. Hereinafter, such a viewing distance is referred to as an optimum viewing distance. The viewing distance z1 corresponds to a viewing position closer to the screen 11 of the display device 10, compared with the viewing distance z2. The viewing distance z3 corresponds to a viewing position farther from the screen 11, compared with the viewing distance z2. In each of the viewing distances z1, z2, and z3, the left eye 202 and the right eye 203 have a value in a viewing position ID range 0.0 to 1.0.

In FIG. 30, graph G41 illustrates a relationship (phase) between the left-eye crosstalk regarding the left eye 202 and the viewing position ID. Graph G41 indicates that the left eye 202 is at a position where the $\Delta$ID from the right eye is 0.5 where the left-eye crosstalk is the smallest. Graph G42 illustrates a relationship (phase) between right-eye crosstalk of the right eye 203 and the viewing position ID. Graph G42 indicates that the right eye 203 is at a position where the $\Delta$ID from the left eye is 0.5 where the right-eye crosstalk is the smallest. Note that the shapes of the graphs G41 and G42 can change for each device depending on the optical characteristics of the panel and the lens disposed on the panel surface. Therefore, for example, the shapes can be estimated by simulation or the like based on the optical design value of the display device 10.

Returning to FIG. 29, at the viewing distance z1 closer to the screen 11 than at the optimum viewing distance, the difference between the viewpoint IDs of the left eye 202 and the right eye 203 is larger than 0.5 which is the optimum viewing distance. Therefore, the $\Delta$ID decreases according to Formula (6)'. This is because, while the interocular distance of the viewer is constant, the distance in which the light spreads from the lens on the panel decreases as the viewing position approaches, and the physical distance corresponding to $\Delta$ID of 0.5 decreases. In FIG. 31, graph G44 illustrates a relationship (phase) between the left-eye crosstalk regarding the left eye 202 and the viewing position ID. The graph G44 indicates that the left-eye crosstalk is the smallest at the position of the viewing position ID closer to the *glabella* position with respect to the left eye 202. This indicates that the left-eye crosstalk increases as the $\Delta$ID of the left eye 202 and the right eye 203 decreases from 0.5. A graph G45 illustrates a relationship (phase) between right-eye crosstalk regarding the right eye 203 and the viewing position ID. In the graph G45, the right-eye crosstalk is the smallest at the position of the viewing position ID closer to the *glabella* position with respect to the right eye 203. This indicates that the right-eye crosstalk also increases as the $\Delta$IDs of the left eye 202 and the right eye 203 decrease from 0.5. Note that the graphs G44 and G45 can be estimated by, for example, simulation based on an optical design value of the display device 10.

Returning to FIG. 29, at the viewing distance z3 farther from the screen 11 than at the optimum viewing distance, the distance of the viewing position ID from the left eye 202 to the right eye 203 is smaller than 0.5 which is the optimum viewing distance. In FIG. 32, graph G47 illustrates a relationship (phase) between the left-eye crosstalk regarding the left eye 202 and the viewing position ID. Graph G47 indicates that the left-eye crosstalk is the smallest at the position of the viewing position ID farther from the *glabella* position with respect to the left eye 202. This indicates that the left-eye crosstalk increases as the $\Delta$ID of the left eye 202 and the right eye 203 decreases from 0.5. Graph G48 illustrates a relationship (phase) between right-eye crosstalk of the right eye 203 and the viewing position ID. In graph G48, the right-eye crosstalk is the smallest at the position of the viewing position ID farther from the *glabella* position than the right eye 203. This indicates that the right-eye crosstalk increases as the ΔID of the left eye 202 and the right eye 203 decreases from 0.5. Note that the graphs G47 and G48 can be estimated by, for example, simulation based on an optical design value of the display device 10.

Now, since it is assumed that the viewing is performed in a range where the perspective angle can be approximated to 0 degrees, the graphs G41, G44, and G47 of the left-eye crosstalk can be approximated to an identical graph regardless of the viewing distances Z1, Z2, or Z3. Similarly, the right-eye crosstalk graphs G42, G45, and G48 can be similarly approximated to an identical graph regardless of the viewing distances Z1, Z2, or Z3. On the other hand, ΔID between the left eye 202 and the right eye 203 changes according to the viewing distances Z1, Z2, and Z3. Therefore, as illustrated in FIGS. 29 to 32, when the viewing position of the viewer 200 deviates from the optimum viewing distance, the crosstalk amount increases. In addition, as the deviation from the optimum viewing distance increases, the ΔID monotonically decreases, and the resultant crosstalk amount monotonically increases. Because of this, the information processing apparatus 30 can estimate the crosstalk amount as needed in a range in which the perspective angle can be approximated by 0 degrees, using the graph of the crosstalk amount estimated from the optical design value or the like, and the ΔID between the left eye 202 and the right eye 203 estimated from the interocular distance 204 of the viewer and the viewing distance z. This is equivalent to the case where the perspective angle is set to 0 degrees in the above embodiment, making it possible to estimate the crosstalk amount similarly. Note that since the ΔID can be calculated from the design information of the display device 10 and the interocular distance, the following description assumes the interocular distance as a fixed value of 65 mm, for example, which is an average for adults.

Graph G50 illustrated in FIG. 33 illustrates, for example, a relationship between the crosstalk amount γ and the viewing distance z obtained by a measurement value in an experiment using an actual display, a simulation, or the like. In graph G50, the crosstalk amount γ has the minimum value at the optimum viewing distance. The crosstalk amount is minimized at a distance at which the difference between the IDs (distances) of the left and right eyes is 0.5, and this distance is the optimum viewing distance. Graph G50 indicates that the crosstalk amount increases in a direction M1 away from the screen 11 with respect to the optimum viewing distance, and the crosstalk amount steeply increases in a direction M2 approaching the screen 11 from the optimum viewing distance. In order to express a curve having a steep and asymmetric increase around the optimum viewing distance illustrated in the graph G50, it is necessary to use a high-order calculation, for example, a function of the 6-order or more when using polynomial approximation, leading to an increase in the amount of calculation. The increase in the amount of arithmetic operation causes a delay in real-time image generation based on the crosstalk amount estimation, and would significantly decrease the correction accuracy of the crosstalk amount γ when the viewer 200 greatly moves his/her head or the like. Therefore, in order to reduce the real-time amount of calculation, it is effective that the information processing apparatus 30 has a configuration in which the shape information of the graph G50 illustrated in FIG. 33 is included, in the model information 32B, in the form of a lookup table (LUT) instead of the calculation based on the model equation using polynomial or the like. The model information 32B makes it possible to perform polygonal approximation of the crosstalk amount γ by using, for example, the viewing distance z as an input and the crosstalk amount γ at the viewing distance z and its change amount (inclination) as an output. Furthermore, for example, the model information 32B may be calculated using a high-order approximation such as a spline curve by using several points around the viewing distance z with the viewing distance z as the input and the crosstalk amount γ at the viewing distance z as the output.

Returning to FIG. 28, the viewing distance calculation unit 33B5 of the estimation unit 33B calculates the viewing distance z of the viewer 200 based on the viewing position from the acquisition unit 33A. The viewing distance z includes, for example, information such as a distance from the screen 11 and coordinates. The viewing distance calculation unit 33B5 supplies the calculated viewing distance z to the crosstalk amount estimation unit 33B4.

The crosstalk amount estimation unit 33B4 estimates the crosstalk amount γ based on the viewing distance z and the model information 32B. For example, the crosstalk amount estimation unit 33B4 inputs the viewing distance z to the LUT of the model information 32B, and estimates a value output by the LUT as the crosstalk amount γ. An estimation unit 22B stores the estimated crosstalk amount γ in the storage unit 32 while supplying the estimated crosstalk amount γ to the generation unit 33C.

The generation unit 33C generates an image corresponding to the viewing position of the viewer 200 based on the content information 32A. For example, the generation unit 33C generates an image corresponding to each of the viewing positions such as the front, right, and left of the viewer 200 with respect to the display device 10. The generation unit 33C generates an image that has undergone a countermeasure based on the crosstalk amount estimated by the estimation unit 33B. The generation unit 33C stores the generated image in the storage unit 32 and supplies the generated image to the display control unit 33D.

The display control unit 33D controls the display device 10 so as to display the image generated by the generation unit 33C. For example, the display control unit 33D controls the display device 10 to display the image generated by the generation unit 33C via the communication unit 31.

The configuration example of the information processing apparatus 30 according to Modification (1) of the embodiment has been described above. The above configuration described with reference to FIG. 28 is merely an example, and the configuration of the information processing apparatus 30 according to the present embodiment is not limited to such an example. The functional configuration of the information processing apparatus 30 according to the present embodiment can be flexibly modified in accordance with specifications and applications.

[Example of Estimation of Crosstalk Amount of Information Processing Apparatus According to Modification (1) of Embodiment]

Figure 34:
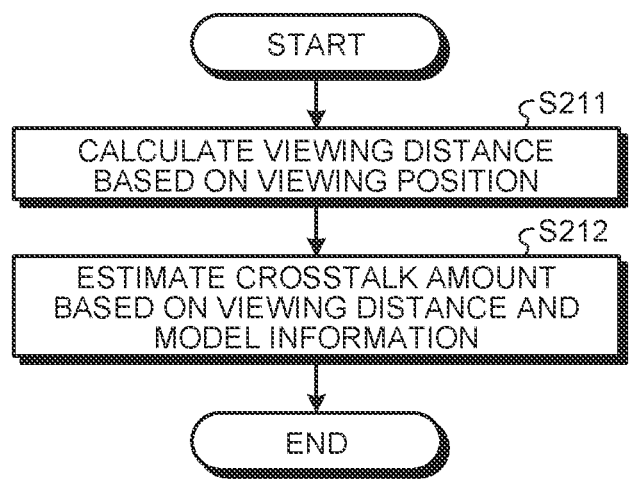
FIG. 34 is a flowchart illustrating an example of a processing procedure of the estimation unit according to Modification (1) of the embodiment.

FIG. 34 is a flowchart illustrating an example of a processing procedure of the estimation unit 33B according to Modification (1) of the embodiment. The processing procedure illustrated in FIG. 34 is implemented by execution of a program by the control unit 33. The processing procedure illustrated in FIG. 34 is executed in step S200 illustrated in FIG. 14 described above, for example.

As illustrated in FIG. 34, the control unit 33 of the information processing apparatus 30 calculates the viewing distance z based on the viewing position (step S211). For example, the control unit 33 functions as the viewing distance calculation unit 33B5 to calculate the viewing distance z of the viewer 200 with respect to the display device 10. After completion of the processing of step S211, the control unit 33 proceeds to the processing of step S212.

The control unit 33 estimates the crosstalk amount γ based on the viewing distance z and the model information 32B (step S212). For example, with the viewing distance z as an input, the control unit 33 estimates the crosstalk amount γ corresponding to the viewing distance z using the LUT of the model information 32B. After storing the estimated crosstalk amount γ in the storage unit 32, the control unit 33 returns the processing to step S200 illustrated in FIG. 14. The control unit 33 executes the processing from step S300 and onward in FIG. 14 described above.

The information processing apparatus 30 according to Modification (1) of the embodiment performs the calculation of the crosstalk amount γ between viewpoints by using the inter-viewpoint crosstalk method, that is, collectively performs the calculation of pixels having the same display viewpoint ID, making it possible to reduce the amount of arithmetic operation as compared with the case of adjusting the crosstalk amount γ for each pixel. This enables the information processing apparatus 30 to suppress an increase in the amount of arithmetic operation, making it possible to reduce the influence of the delay due to the crosstalk amount calculation even when the viewer 200 moves his/her head greatly, for example. This leads to suppression of a decrease in correction accuracy of the crosstalk amount γ in the entire system. As a result, the information processing apparatus 30 can achieve efficient crosstalk reduction at low cost.

Note that Modification (1) of the above embodiment may be applied to Countermeasures (1) to (3) of the embodiment, applied to other countermeasures, or combined.

Modification (2) of Embodiment

Modification (1) of the above embodiment can be modified, for example, as in Modification (2). Modification (2) of the embodiment has a configuration in which the above-described perspective angle calculation unit 33B1 is added to Modification (1) of the embodiment. The purpose of introducing the perspective angle calculation to Modification (1) is to cope with the aberration of the lens in the display device 10.

Figure 35:
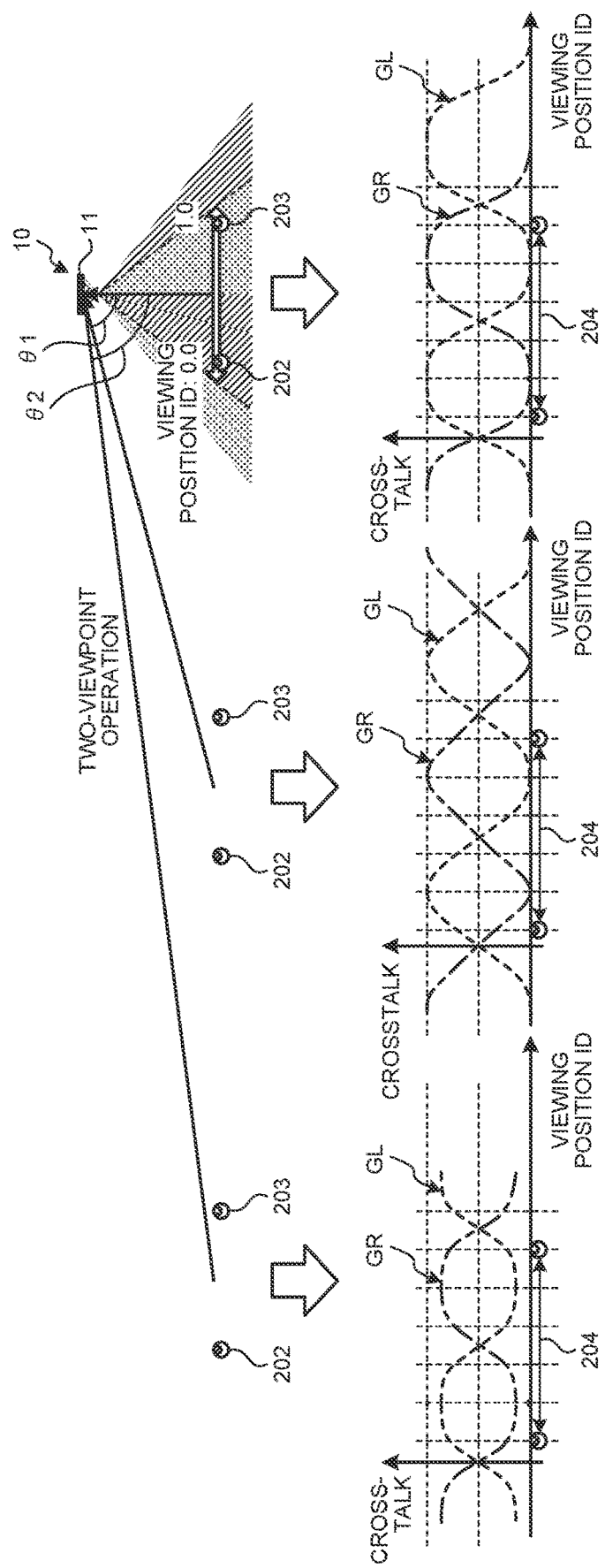
FIG. 35 is a diagram for describing an example of a relationship between a crosstalk amount and a perspective angle.

FIG. 35 is a diagram for describing an example of a relationship between a crosstalk amount and a perspective angle. In FIG. 35, the graph GL indicates the crosstalk amount of the left eye 202, and the graph GR indicates the crosstalk amount of the right eye 203. As illustrated in FIG. 35, when the viewer 200 views the screen 11 with the viewing distance z to the display device 10 kept constant and while moving left and right in a direction away from the center of the screen 11, the crosstalk also increases as the perspective angle θ increases from θ1 to θ2, together with changes in the shapes of the graphs GL and GR. This is considered to be caused by an increased influence of aberration due to the increased perspective angle θ and a resultant phenomenon of blurring and spread of the light emitted from each pixel. In order to cope with this problem, the information processing apparatus 30 according to Modification (2) of the embodiment considers the influence of the perspective angle θ in addition to the viewing distance z.

[Functional Configuration Example of Information Processing Apparatus According to Modification (2) of Embodiment]

As illustrated in FIG. 2, the information processing apparatus 30 according to Modification (2) of the embodiment includes a display device 10, a measurement device 20, and an information processing apparatus 30. The information processing apparatus 30 includes a communication unit 31, a storage unit 32, and a control unit 33. By executing a program, the control unit 33 of the information processing apparatus 30 functions as a functional unit such as the acquisition unit 33A, an estimation unit 33B, a generation unit 33C, and a display control unit 33D. The control unit 33 executes the program, whereby the information processing apparatus 30 executes the processing procedure from step S100 to step S400 illustrated in FIG. 14.

Figure 36:
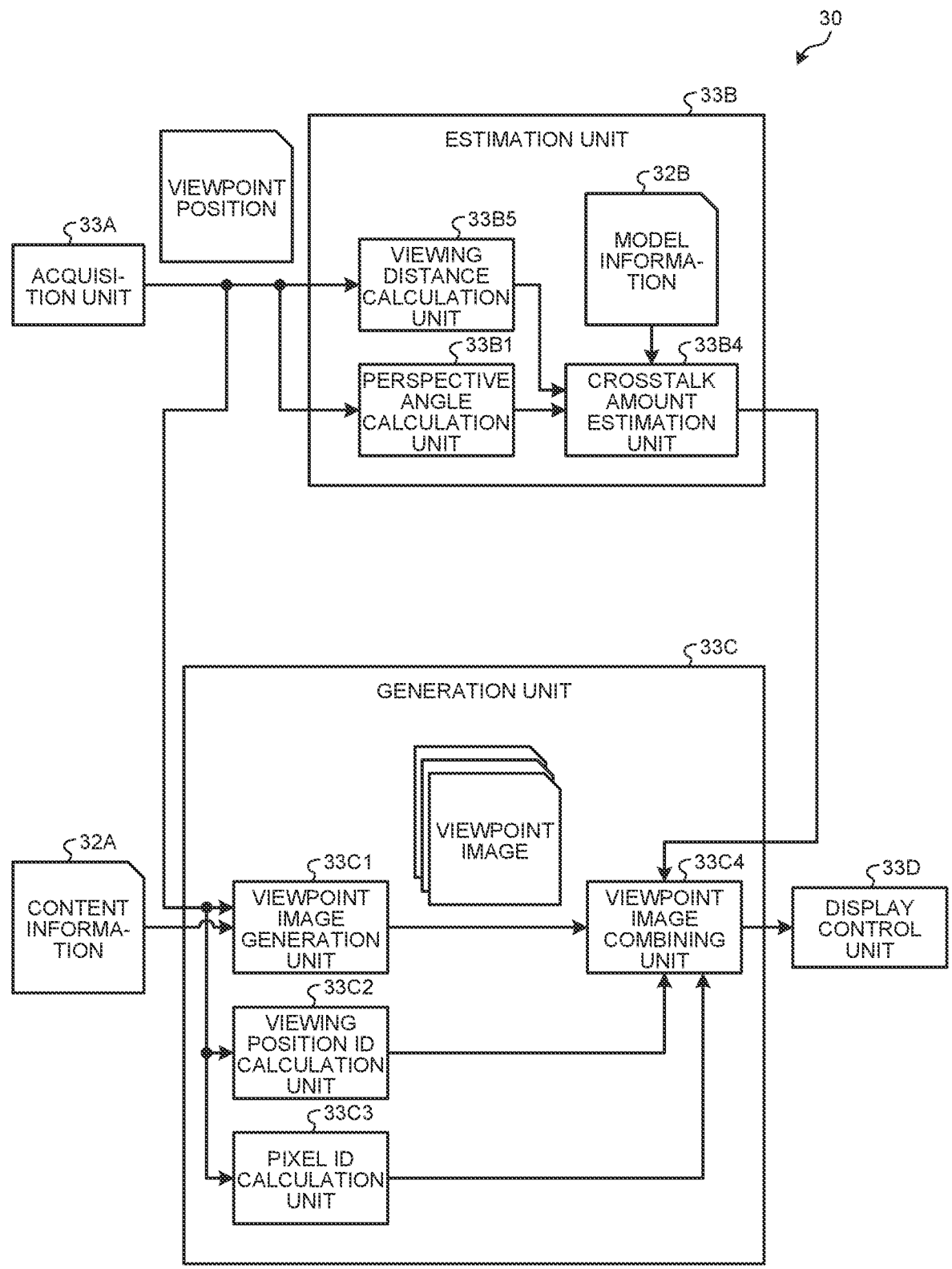
FIG. 36 is a diagram illustrating a functional configuration example of an estimation unit and a generation unit according to Modification (2) of the embodiment.
Figure 37:
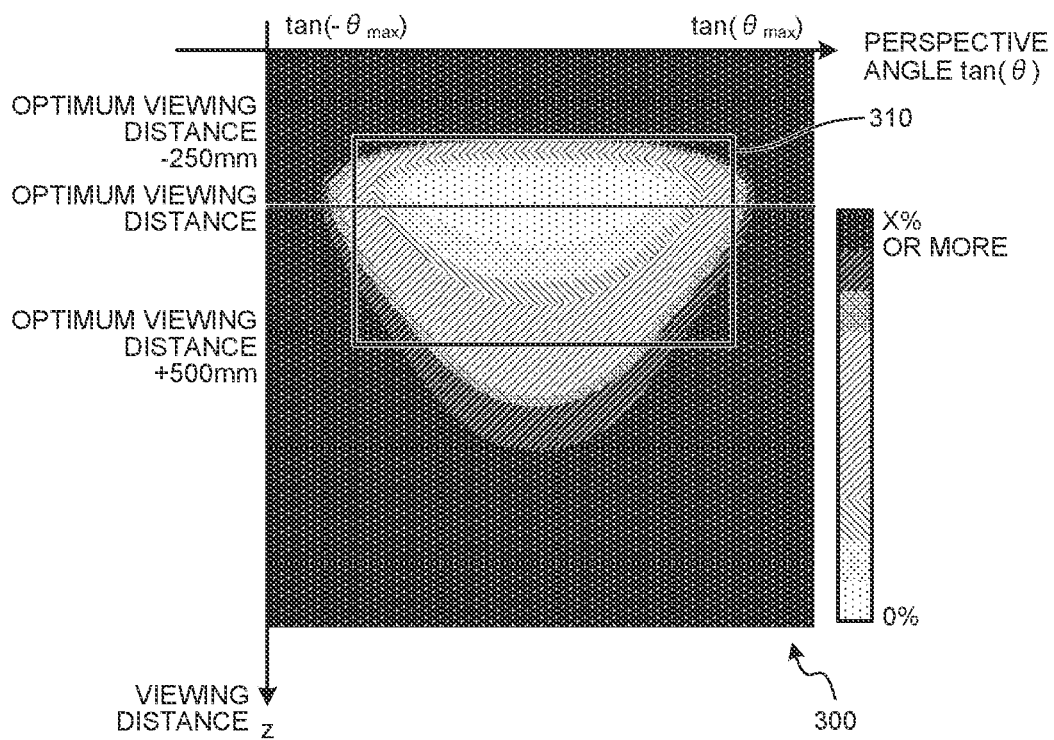
FIG. 37 is a diagram for describing an example of model information according to Modification (2) of the embodiment.

FIG. 36 is a diagram illustrating a functional configuration example of the estimation unit 33B and the generation unit 33C according to Modification (2) of the embodiment. FIG. 37 is a diagram for describing an example of the model information 32B according to Modification (2) of the embodiment.

As illustrated in FIG. 36 in the information processing apparatus 30 according to Modification (2) of the embodiment, the functional configuration of the estimation unit 33B is different from the functional configuration according to the above embodiment or Modification (1). That is, the estimation unit 33B estimates the crosstalk amount γ by the functions of the perspective angle calculation unit 33B1, the viewing distance calculation unit 33B5, and the crosstalk amount estimation unit 33B4, thereby suppressing the influence of the inter-viewpoint crosstalk.

A map 300 illustrated in FIG. 37 illustrates a map of the crosstalk amount γ obtained in advance, in which the horizontal axis represents the perspective angle θ and the vertical axis represents the viewing distance z. Although the perspective angle θ on the horizontal axis may be expressed by an angle itself, here, the perspective angle θ is expressed by tan θ, which is a tangent expression of the perspective angle θ. In the map 300, the interocular distance 204 is fixed, and the crosstalk amount is calculated based on the perspective angle θ and the viewing distance z. In the map 300, an assumed viewing range 310 can be set. The assumed viewing range 310 is, for example, a range in which the crosstalk amount γ is smaller than a threshold and the viewing position of the viewer 200 is assumed. By defining the assumed viewing range in this manner, it is possible to reduce the usage of memory of the lookup table (LUT). Although the example illustrated in FIG. 37 indicates a case where the assumed viewing range 310 is a range having the perspective angle θ of $\tan(-\theta_{max})$ to $\tan(\theta_{max})$, and the viewing distance z ranging from the optimum viewing distance −250 mm to the optimum viewing distance +500 mm, the range is not limited to this example.

In order to reduce the amount of calculation required in real time at the time of viewing, the information processing apparatus 30 has a configuration in which information indicating the two-dimensional lookup table (LUT) illustrated in FIG. 37 is included in the model information 32B. For example, the model information 32B makes it possible to reduce the amount of calculation of the crosstalk amount γ by using the perspective angle θ and the viewing distance z as input, and the crosstalk amount γ at the perspective angle θ and the viewing distance z as output.

Returning to FIG. 36, in the estimation unit 33B, the viewing distance calculation unit 33B5 calculates the viewing distance z of the viewer 200 based on the viewing position from the acquisition unit 33A. The viewing distance calculation unit 33B5 supplies the specified viewing distance z to the crosstalk amount estimation unit 33B4. The perspective angle calculation unit 33B1 calculates the perspective angle θ of each pixel on the screen 11 (panel) based on the position information from the acquisition unit 33A.

The perspective angle calculation unit 33B1 supplies the calculated perspective angle θ to the crosstalk amount estimation unit 33B4.

The crosstalk amount estimation unit 33B4 estimates the crosstalk amount γ based on the perspective angle θ, the viewing distance z, and the model information 32B. For example, the crosstalk amount estimation unit 33B4 inputs the perspective angle θ and the viewing distance z to the LUT of the model information 32B, and estimates the value output by the LUT as the crosstalk amount γ. The estimation unit 22B stores the estimated crosstalk amount γ in the storage unit 32 while supplying the estimated crosstalk amount γ to the generation unit 33C.

The generation unit 33C generates an image corresponding to the viewing position of the viewer 200 based on the content information 32A. For example, the generation unit 33C generates a two-viewpoint image for the right and left eyes when the viewer 200 performs two-viewpoint output to the display device 10, and generates an image corresponding to viewing positions such as the front, the right, and the left when the viewer performs multiple viewpoint output. The generation unit 33C generates an image that has undergone a countermeasure based on the crosstalk amount estimated by the estimation unit 33B. The generation unit 33C stores the generated image in the storage unit 32 and supplies the generated image to the display control unit 33D.

The display control unit 33D controls the display device 10 so as to display the image generated by the generation unit 33C. For example, the display control unit 33D controls the display device 10 to display the image generated by the generation unit 33C via the communication unit 31.

The configuration example of the information processing apparatus 30 according to Modification (2) of the embodiment has been described above. The above configuration described with reference to FIG. 36 is merely an example, and the configuration of the information processing apparatus 30 according to the present embodiment is not limited to such an example. For example, the crosstalk amount estimation unit 33B4 may use a method of interpolating information from results of LUTs of several surrounding points based on the perspective angle θ and the viewing distance z or may calculate the crosstalk amount based on a polynomial model of a multivariable. The functional configuration of the information processing apparatus 30 according to the present embodiment can be flexibly modified in accordance with specifications and applications.

[Example of Estimation of Crosstalk Amount of Information Processing Apparatus According to Modification (2) of Embodiment]

Figure 38:
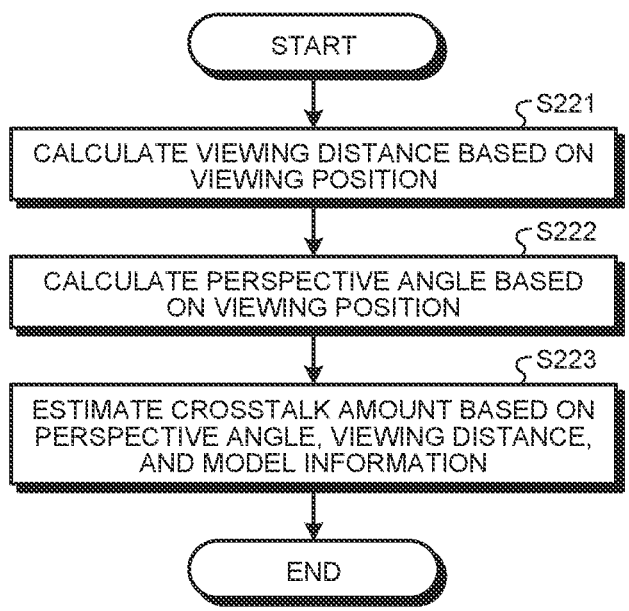
FIG. 38 is a flowchart illustrating an example of a processing procedure of the estimation unit according to Modification (2) of the embodiment.

FIG. 38 is a flowchart illustrating an example of a processing procedure of the estimation unit 33B according to Modification (2) of the embodiment. The processing procedure illustrated in FIG. 38 is implemented by execution of a program by the control unit 33. The processing procedure illustrated in FIG. 38 is executed in step S200 illustrated in FIG. 14 described above, for example.

As illustrated in FIG. 38, the control unit 33 of the information processing apparatus 30 calculates the viewing distance z based on the viewing position (step S221). For example, the control unit 33 functions as the viewing distance calculation unit 33B5 to calculate the viewing distance z of the viewer 200 with respect to the display device 10. After completion of the processing of step S221, the control unit 33 proceeds to the processing of step S222.

The control unit 33 calculates the perspective angle θ based on the viewing position (step S222). For example, the control unit 33 functions as the perspective angle calculation unit 33B1 to calculate the perspective angle θ of each pixel on the screen 11 based on the position information from the acquisition unit 33A. After completion of the processing of step S222, the control unit 33 proceeds to the processing of step S223.

The control unit 33 estimates the crosstalk amount γ based on the perspective angle θ, the viewing distance z, and the model information 32B (step S223). For example, the control unit 33 uses the perspective angle θ and the viewing distance z as inputs, and estimates the crosstalk amount γ corresponding to the perspective angle θ and the viewing distance z using the LUT of the model information 32B. After storing the estimated crosstalk amount γ in the storage unit 32, the control unit 33 returns the processing to step S200 illustrated in FIG. 14. The control unit 33 executes the processing from step S300 and onward in FIG. 14 described above.

The information processing apparatus 30 according to Modification (2) of the embodiment uses the inter-viewpoint crosstalk method in consideration of the perspective angle θ and the viewing distance z of the viewer 200, thereby suppressing an increase in the amount of calculation and achieving crosstalk reduction even at the viewing position where the viewer 200 has greatly moved to at least one of the left and right with respect to the display device 10. As a result, the information processing apparatus 30 can suppress an increase in the amount of arithmetic operation related to the crosstalk correction regardless of the viewing position, leading to stable improvement of the crosstalk correction accuracy according to the change in the relative position between the viewer 200 and the display device 10.

Note that Modification (2) of the above embodiment may be applied to Countermeasures (1) to (3) and Modification (1) of the embodiment, or may be applied to or be used in combination with other countermeasures.

Modification (3) of Embodiment

Hereinabove, the crosstalk has been mainly described based on the perspective angle θ (horizontal perspective angle) of the horizontal viewing position based on Formula (1). In an actual device, however, the crosstalk changes not only with the horizontal perspective angle but also with the perspective angle θ of the vertical viewing position (vertical perspective angle). The horizontal viewing position is, for example, a viewing position in a case where the viewer 200 moves in the left-right direction (horizontal direction) of the screen 11 of the display device 10. The vertical viewing position is, for example, a viewing position in a case where the viewer 200 moves in the vertical direction (gravity direction) of the screen 11 of the display device 10. Modification (3) of the embodiment has additional configuration corresponding to the change in the vertical viewing position in addition to the correspondence to the change in the viewing position in the horizontal direction in Modification (2) of the embodiment.

Figure 39:
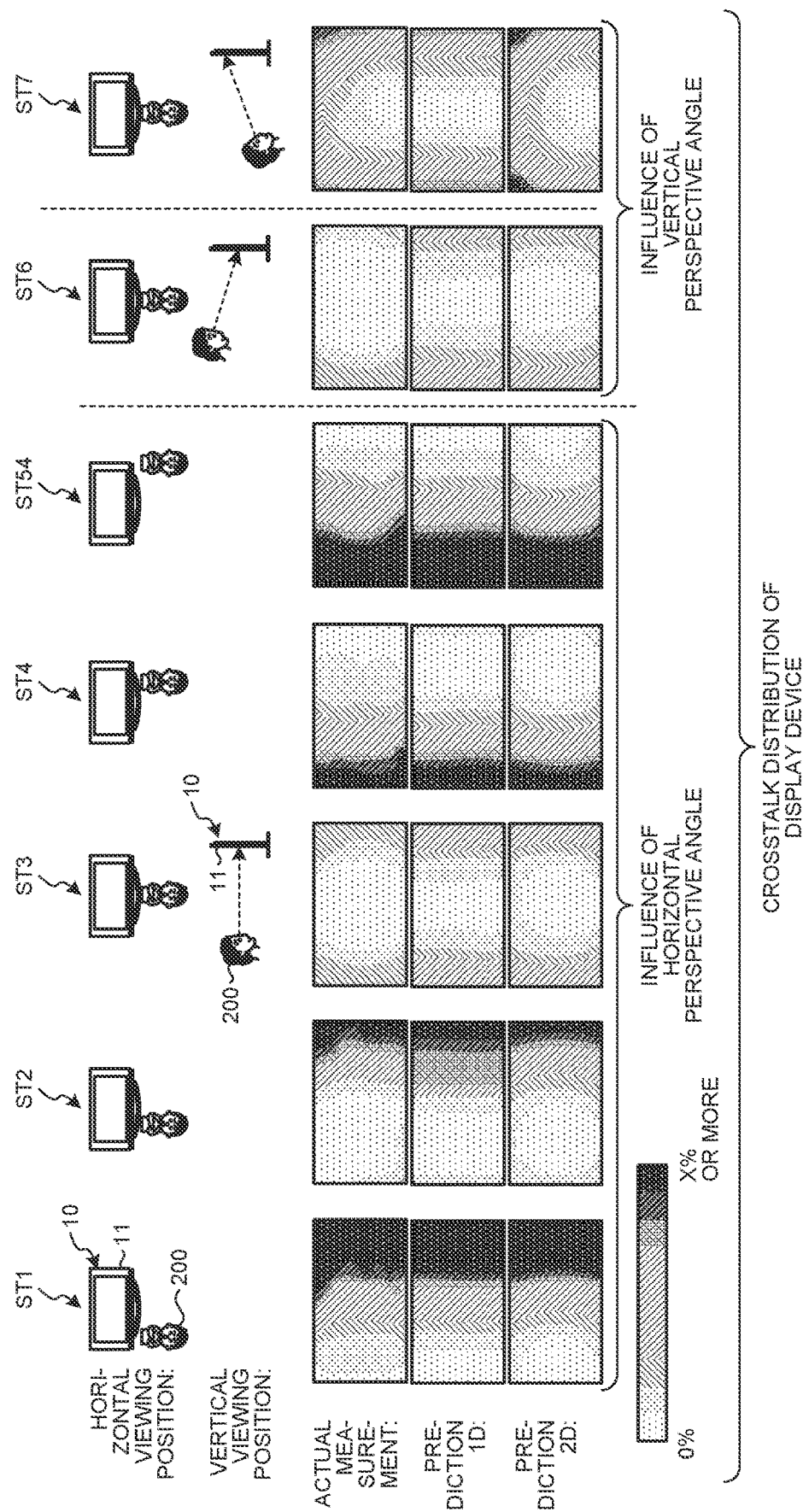
FIG. 39 is a diagram for describing an example of a distribution of a crosstalk amount according to a horizontal viewing position and a vertical viewing position.

FIG. 39 is a diagram for describing an example of a distribution of a crosstalk amount according to a horizontal viewing position and a vertical viewing position. As illustrated in FIG. 39, a state ST1 is a state in which the front of a left end of the screen 11 of the display device 10 corresponds to the horizontal viewing position of the viewer 200 and is a state corresponding to the vertical viewing position at which the vertical perspective angle of the viewer 200 with respect to the screen 11 is 0 degrees. A state ST2 is a state in which the front of the intermediate position between the center and the left end of the screen 11 corresponds to the horizontal viewing position of the viewer 200, and is a state corresponding to the vertical viewing position at which the vertical perspective angle of the viewer 200 with respect to the screen 11 is 0 degrees. A state ST3 is a state in which the front of the center position of the screen 11 corresponds to the horizontal viewing position of the viewer 200, and is a state corresponding to the vertical viewing position at which the vertical perspective angle of the viewer 200 with respect to the screen 11 is 0 degrees. A state ST4 is a state in which the front of the intermediate position between the center and the right end of the screen 11 corresponds to the horizontal viewing position of the viewer 200, and is a state corresponding to the vertical viewing position at which the vertical perspective angle of the viewer 200 with respect to the screen 11 is 0 degrees. A state ST5 is a state in which the front of the right end of the screen 11 corresponds to the horizontal viewing position of the viewer 200, and is a state corresponding to the vertical viewing position at which the vertical perspective angle of the viewer 200 with respect to the screen 11 is 0 degrees. In addition, a state ST6 is a state in which the front of the center position of the screen 11 corresponds to the horizontal viewing position of the viewer 200, and is a state corresponding to the vertical viewing position at which the vertical perspective angle of the viewer 200 with respect to the screen 11 is a downward view angle. In addition, a state ST7 is a state in which the front of the center position of the screen 11 corresponds to the horizontal viewing position of the viewer 200, and is a state corresponding to the vertical viewing position at which the vertical perspective angle of the viewer 200 with respect to the screen 11 is an upward view angle.

The crosstalk distribution of the display device 10 corresponds to each of the states ST1 to ST7, and indicates three distributions of actual measurement, prediction 1D, and prediction 2D. The actual measurement is an example of the distribution of the crosstalk estimated from the actually measured value. The prediction 1D and the prediction 2D are distributions of crosstalk estimated from simulation values. The example illustrated in FIG. 39 indicates that the crosstalk distribution of the states ST1 to ST5 is influenced by the horizontal perspective angle, and the crosstalk distribution of the states ST6 to ST7 is influenced by the vertical perspective angle. In this manner, the crosstalk distribution has a tendency that, when the viewer 200 moves left and right with respect to the center of the screen 11, the crosstalk increases at the screen end according to the movement amount. Furthermore, the crosstalk distribution has a tendency that, when the viewer 200 is located at the center of the screen and the viewing position is changed vertically, the crosstalk amount changes at vertical positions of the screen 11. In order to cope with this problem, for example, a three-dimensional lookup table may be used. That is, the problem can be solved by implementing a lookup table indicating a three-dimensional map obtained by adding an axis of the vertical perspective angle to the map 300 of FIG. 37 described above.

Figure 40:
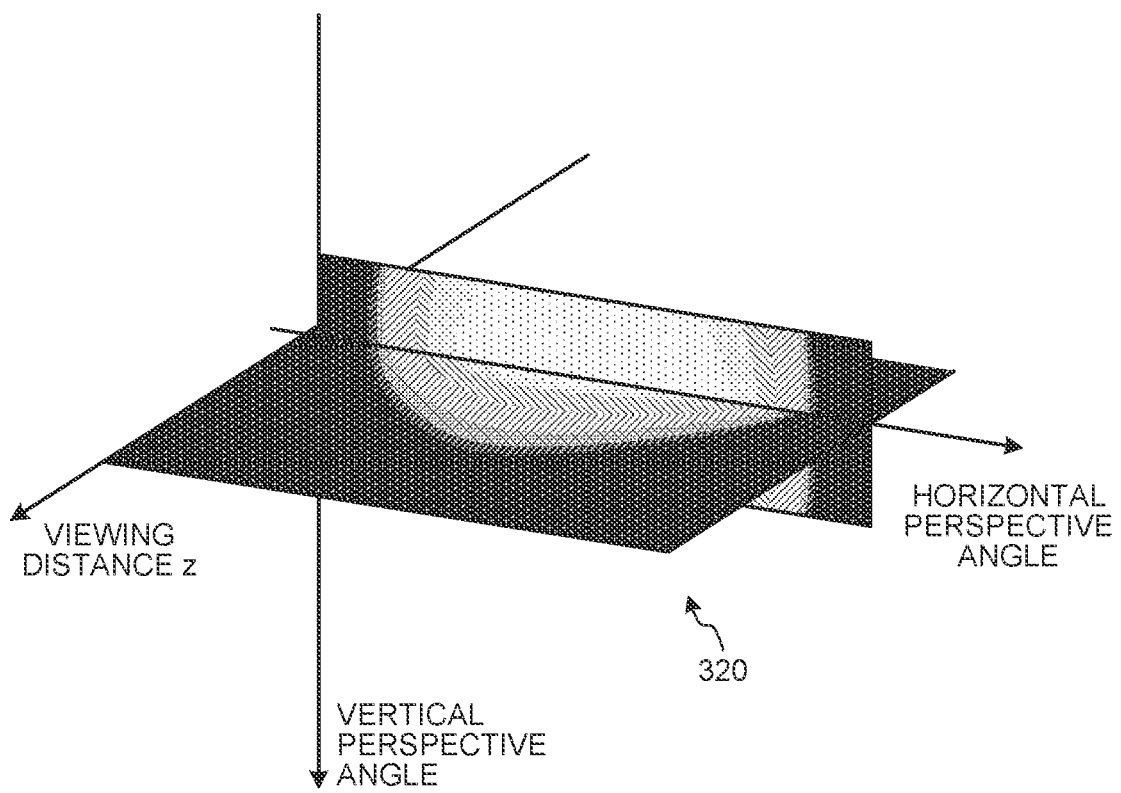
FIG. 40 is a diagram for describing an example of model information according to Modification (3) of the embodiment.

FIG. 40 is a diagram for describing an example of the model information 32B according to Modification (3) of the embodiment. FIG. 40 illustrates a map 320 which is a map of the crosstalk amount γ according to the horizontal perspective angle, the vertical perspective angle, and the viewing distance z. Note that FIG. 40 illustrates only portions along the horizontal perspective angle, the vertical perspective angle, and the viewing distance z, and omits portions other than these. That is, the map 320 represents a stereoscopic map of the crosstalk amount γ. The map 320 is obtained by calculating the crosstalk amount based on the perspective angle θ and the viewing distance z with the interocular distance 204 as a fixed value.

The functional configuration of the information processing apparatus 30 according to Modification (3) of the embodiment is the same as the configuration of Modification (2) illustrated in FIG. 36. That is, the estimation unit 33B estimates the crosstalk amount γ by the functions of the perspective angle calculation unit 33B1, the viewing distance calculation unit 33B5, and the crosstalk amount estimation unit 33B4, thereby implementing the inter-viewpoint crosstalk method.

In the estimation unit 33B, the viewing distance calculation unit 33B5 calculates the viewing distance z of the viewer 200 based on the viewing position from the acquisition unit 33A. The viewing distance calculation unit 33B5 supplies the calculated viewing distance z to the crosstalk amount estimation unit 33B4. The perspective angle calculation unit 33B1 calculates the perspective angle θ of each pixel on the panel based on the position information from the acquisition unit. For example, the perspective angle calculation unit 33B1 calculates the perspective angle θ including the horizontal perspective angle θH and the vertical perspective angle θV. The perspective angle calculation unit 33B1 supplies the calculated perspective angle θ to the crosstalk amount estimation unit 33B4.

The crosstalk amount estimation unit 33B4 estimates the crosstalk amount γ based on the perspective angle θ, the viewing distance z, and the model information 32B. For example, the crosstalk amount estimation unit 33B4 inputs the horizontal perspective angle θH, the vertical perspective angle θV, and the viewing distance z to the LUT of the model information 32B, and estimates the value output from the LUT as the crosstalk amount γ. The estimation unit 22B stores the estimated crosstalk amount γ in the storage unit 32 while supplying the estimated crosstalk amount γ to the generation unit 33C.

The generation unit 33C generates an image corresponding to the viewing position of the viewer 200 based on the content information 32A. For example, the generation unit 33C generates a two-viewpoint image for the right and left eyes when the viewer 200 performs two-viewpoint output to the display device 10, and generates an image corresponding to viewing positions such as the front, the right, and the left when the viewer performs multiple viewpoint output. The generation unit 33C generates an image that has undergone a countermeasure based on the crosstalk amount estimated by the estimation unit 33B. The generation unit 33C stores the generated image in the storage unit 32 and supplies the generated image to the display control unit 33D.

The display control unit 33D controls the display device 10 so as to display the image generated by the generation unit 33C. For example, the display control unit 33D controls the display device 10 to display the image generated by the generation unit 33C via the communication unit 31.

The configuration example of the information processing apparatus 30 according to Modification (3) of the embodiment has been described above. The above configuration described with reference to FIG. 36 is merely an example, and the configuration of the information processing apparatus 30 according to the present embodiment is not limited to such an example. The functional configuration of the information processing apparatus 30 according to the present embodiment can be flexibly modified in accordance with specifications and applications.

Since the processing procedure of the estimation unit 33B of the information processing apparatus 30 according to Modification (3) of the embodiment can be implemented by replacing the perspective angle θ of the processing procedure illustrated in FIG. 38 with the horizontal perspective angle θH and the vertical perspective angle θV, the description thereof will be omitted.

The information processing apparatus 30 according to Modification (3) of the embodiment uses the inter-viewpoint crosstalk method in consideration of the horizontal perspective angle θH, the vertical perspective angle θV, and the viewing distance z of the viewer 200, making it possible to suppress an increase in the amount of calculation and achieve crosstalk reduction even when the perspective angle θ changes vertically and horizontally. As a result, the information processing apparatus 30 can suppress an increase in the amount of arithmetic operation related to the crosstalk correction, and can further improve the crosstalk correction accuracy according to the change in the posture of the viewer 200.

Note that Modification (3) of the above embodiment may be applied to Countermeasures (1) to (3) and Modifications (1) and (2) of the embodiment, or may be applied to or be used in combination with other countermeasures.

Modification (4) of Embodiment

The manner of spreading light emitted from each pixel of the display device 10 is determined by optical characteristics of the display device 10 and the like. On the other hand, the interocular distance 204 of the viewer 200 has individual differences. Therefore, the optimum viewing distance and the crosstalk amount γ may change depending on the viewer 200. In view of this, Modification (4) of the embodiment has an additional configuration corresponding to the individual difference of the interocular distance 204.

[Functional Configuration Example of Information Processing Apparatus According to Modification (4) of Embodiment]

As illustrated in FIG. 2, the information processing apparatus 30 according to Modification (4) of the embodiment includes a display device 10, a measurement device 20, and an information processing apparatus 30. The information processing apparatus 30 includes a communication unit 31, a storage unit 32, and a control unit 33. By executing a program, the control unit 33 of the information processing apparatus 30 functions as a functional unit such as the acquisition unit 33A, an estimation unit 33B, a generation unit 33C, and a display control unit 33D. The control unit 33 executes the program, whereby the information processing apparatus 30 executes the processing procedure from step S100 to step S400 illustrated in FIG. 14.

Figure 41:
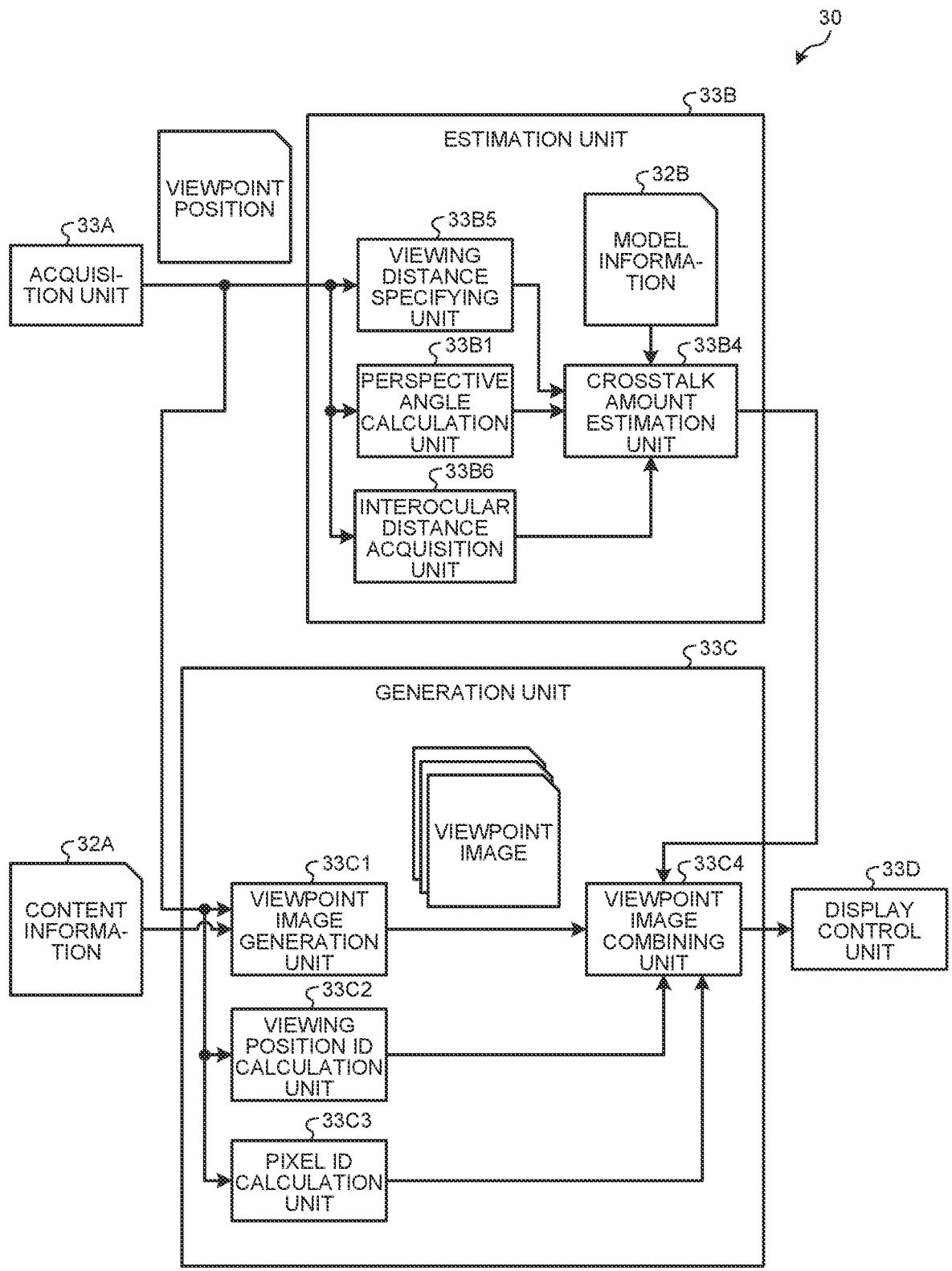
FIG. 41 is a diagram illustrating a functional configuration example of an estimation unit and a generation unit according to Modification (4) of the embodiment.
Figure 42:
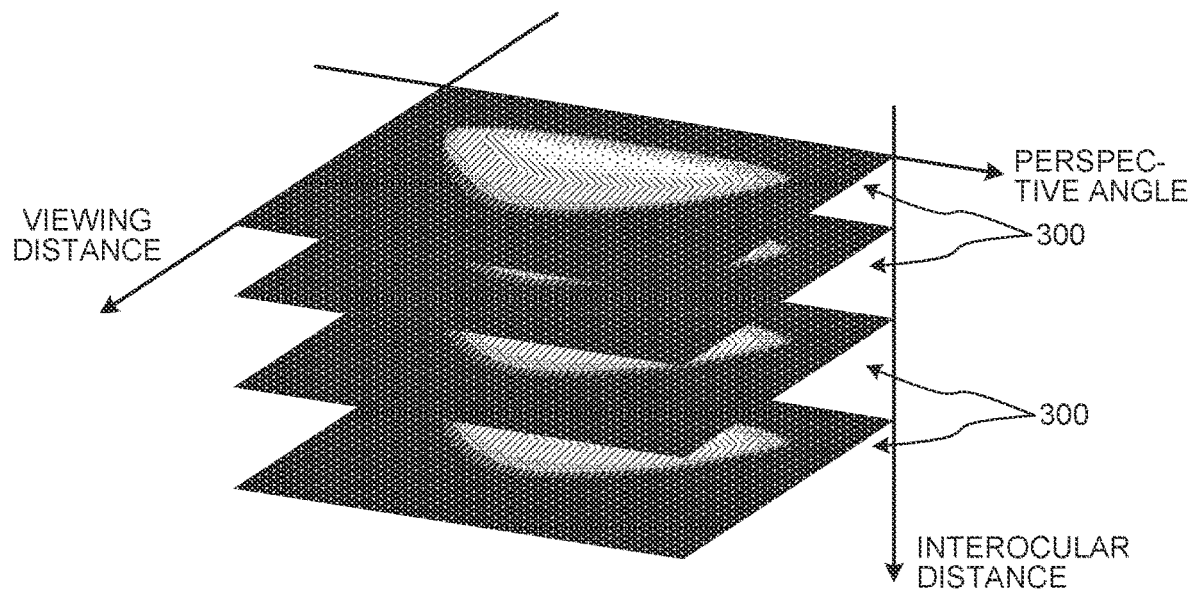
FIG. 42 is a diagram for describing an example of model information according to Modification (4) of the embodiment.

FIG. 41 is a diagram illustrating a functional configuration example of the estimation unit 33B and the generation unit 33C according to Modification (4) of the embodiment. FIG. 42 is a diagram for describing an example of the model information 32B according to Modification (4) of the embodiment.

As illustrated in FIG. 41, in the information processing apparatus 30 according to Modification (4) of the embodiment, the functional configuration of the estimation unit 33B is different from the functional configuration according to the above embodiment. That is, the estimation unit 33B estimates the crosstalk amount γ by the functions of the perspective angle calculation unit 33B1, the viewing distance calculation unit 33B5, an interocular distance acquisition unit 33B6, and the crosstalk amount estimation unit 33B4, thereby implementing the inter-viewpoint crosstalk method.

A map 300 illustrated in FIG. 42 illustrates a map of the crosstalk amount γ calculated in advance, in which the horizontal axis represents the perspective angle θ and the vertical axis represents the viewing distance z. The map 300, provided in plurality, is a map each corresponding to a plurality of mutually different interocular distances 204. In order to reduce the real-time amount of calculation, the information processing apparatus 30 has a configuration in which information indicating a plurality of three-dimensional lookup tables (LUT) illustrated in FIG. 42 is included in the model information 32B. For example, the model information 32B makes it possible to reduce the amount of calculation of the crosstalk amount γ using the perspective angle θ, the viewing distance z, and the interocular distance 204 as input, and the crosstalk amount γ at the perspective angle θ, the viewing distance z, and the interocular distance 204 as output.

Returning to FIG. 41, in the estimation unit 33B, the viewing distance calculation unit 33B5 calculates the viewing distance z of the viewer 200 based on the viewing position from the acquisition unit 33A. The viewing distance calculation unit 33B5 supplies the calculated viewing distance z to the crosstalk amount estimation unit 33B4. The perspective angle calculation unit 33B1 calculates the perspective angle θ of each pixel on the panel based on the position information from the acquisition unit 33A. The perspective angle calculation unit 33B1 supplies the calculated perspective angle θ to the crosstalk amount estimation unit 33B4.

The interocular distance acquisition unit 33B6 acquires the interocular distance 204 of the viewer 200. For example, the interocular distance acquisition unit 33B6 acquires, as the interocular distance 204, a distance, that is, a length of a straight line connecting the viewing positions of the right eye and the left eye acquired by the acquisition unit 33A. For example, the interocular distance acquisition unit 33B6 may acquire the interocular distance 204 from an image obtained by capturing the face of the viewer 200, or may acquire the interocular distance 204 of the viewer 200 by separately inputting the interocular distance at the time of viewing. The interocular distance acquisition unit 33B6 supplies the acquired interocular distance 204 to the crosstalk amount estimation unit 33B4.

The crosstalk amount estimation unit 33B4 estimates the crosstalk amount γ based on the perspective angle θ, the viewing distance z, the interocular distance 204, and the model information 32B. For example, the crosstalk amount estimation unit 33B4 selects an LUT corresponding to the interocular distance 204 from the model information 32B, inputs the perspective angle θ and the viewing distance z to the LUT, and estimates a value output from the LUT as the crosstalk amount γ. The estimation unit 22B stores the estimated crosstalk amount γ in the storage unit 32 while supplying the estimated crosstalk amount γ to the generation unit 33C.

The generation unit 33C generates an image corresponding to the viewing position of the viewer 200 based on the content information 32A. For example, the generation unit 33C generates a two-viewpoint image for the right and left eyes when the viewer 200 performs two-viewpoint output to the display device 10, and generates an image corresponding to viewing positions such as the front, the right, and the left when the viewer performs multiple viewpoint output. The generation unit 33C generates an image that has undergone a countermeasure based on the crosstalk amount estimated by the estimation unit 33B. The generation unit 33C stores the generated image in the storage unit 32 and supplies the generated image to the display control unit 33D.

The display control unit 33D controls the display device 10 so as to display the image generated by the generation unit 33C. For example, the display control unit 33D controls the display device 10 to display the image generated by the generation unit 33C via the communication unit 31.

The configuration example of the information processing apparatus 30 according to Modification (4) of the embodiment has been described above. The above configuration described with reference to FIG. 41 is merely an example, and the configuration of the information processing apparatus 30 according to the present embodiment is not limited to such an example. The functional configuration of the information processing apparatus 30 according to the present embodiment can be flexibly modified in accordance with specifications and applications. For example, the information processing apparatus 30 according to Modification (4) of the embodiment may add a new configuration for acquiring the interocular distance 204.

[Example of Estimation of Crosstalk Amount of Information Processing Apparatus According to Modification (4) of Embodiment]

Figure 43:
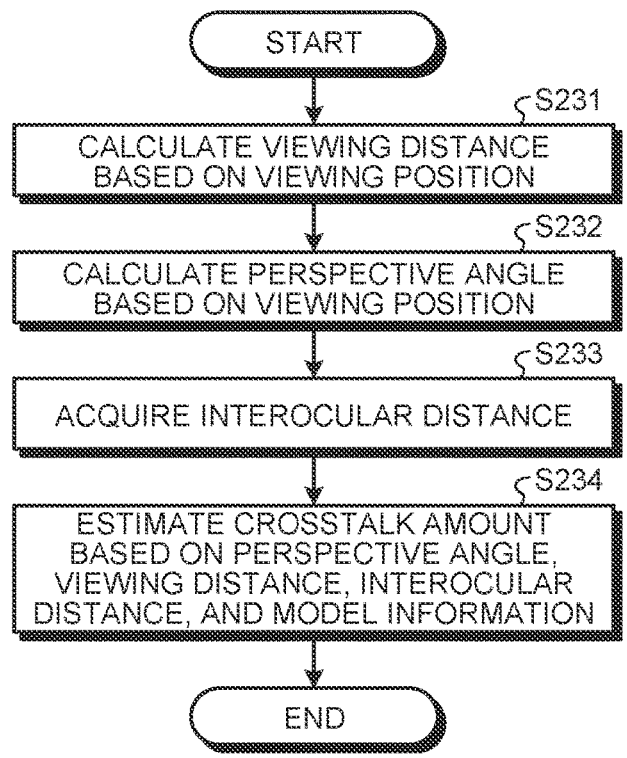
FIG. 43 is a flowchart illustrating an example of a processing procedure of the estimation unit according to Modification (4) of the embodiment.

FIG. 43 is a flowchart illustrating an example of a processing procedure of the estimation unit 33B according to Modification (4) of the embodiment. The processing procedure illustrated in FIG. 43 is implemented by execution of a program by the control unit 33. The processing procedure illustrated in FIG. 43 is executed in step S200 illustrated in FIG. 14 described above, for example.

As illustrated in FIG. 43, the control unit 33 of the information processing apparatus 30 calculates the viewing distance z based on the viewing position (step S231). For example, the control unit 33 functions as the viewing distance calculation unit 33B5 to calculate the viewing position of the viewer 200 with respect to the display device 10. After completion of the processing of step S231, the control unit 33 proceeds to the processing of step S232.

The control unit 33 calculates the perspective angle θ based on the viewing position (step S232). For example, the control unit 33 functions as the perspective angle calculation unit 33B1 to calculate the perspective angle θ of each pixel on the panel based on the position information from the acquisition unit 33A. After completion of the processing of step S232, the control unit 33 proceeds to the processing of step S233.

The control unit 33 acquires the interocular distance 204 (step S233). For example, the control unit 33 acquires a distance between viewpoints based on the viewing position acquired by the acquisition unit 33A as the interocular distance 204 of the viewer 200. After completion of the processing of step S233, the control unit 33 proceeds to the processing of step S234.

The control unit 33 estimates the crosstalk amount γ based on the perspective angle θ, the viewing distance z, the interocular distance 204, and the model information 32B (step S234). For example, the control unit 33 uses the perspective angle θ and the viewing distance z as inputs, and estimates the crosstalk amount γ corresponding to the perspective angle θ and the viewing distance z by using the LUT corresponding to the interocular distance 204 of the model information 32B. After storing the estimated crosstalk amount γ in the storage unit 32, the control unit 33 returns the processing to step S200 illustrated in FIG. 14. The control unit 33 executes the processing from step S300 and onward in FIG. 14 described above.

The information processing apparatus 30 according to Modification (4) of the embodiment uses the inter-viewpoint crosstalk method in consideration of the interocular distance 204, the perspective angle θ, and the viewing distance z of the viewer 200, so that even different viewers 200 can reduce crosstalk by suppressing an increase in the amount of calculation. As a result, the information processing apparatus 30 can suppress an increase in the amount of arithmetic operation with respect to various interocular distances 204, and can improve the correction accuracy of the crosstalk according to the interocular distance 204.

Note that Modification (4) of the above embodiment may be applied to Countermeasures (1) to (3) and Modifications (1) to (3) of the embodiment, or may be applied to or be used in combination with other countermeasures.

Modification (5) of Embodiment

In the information processing apparatus 30 according to the above-described embodiment and Modifications (1) to (4), the viewpoint image combining unit 33C4 of the generation unit 33C can add processing using the weighted additive averaging on a plurality of viewpoint images. Examples of assumable methods of weight calculation include deconvolution processing. The deconvolution itself is a known technique in the field of 3D display, and can use any means. The crosstalk correction using deconvolution estimates each display target value and a difference (crosstalk amount) in each of the left eye and the right eye and then adds a correction amount to the output image, thereby canceling (reducing) the crosstalk. In Modification (5), the information processing apparatus 30 adds a configuration using processing of the weighted additive averaging on a plurality of viewpoint images.

As illustrated in FIG. 2, the information processing apparatus 30 according to Modification (5) of the embodiment includes a display device 10, a measurement device 20, and an information processing apparatus 30. The information processing apparatus 30 includes a communication unit 31, a storage unit 32, and a control unit 33. By executing a program, the control unit 33 of the information processing apparatus 30 functions as a functional unit such as the acquisition unit 33A, an estimation unit 33B, a generation unit 33C, and a display control unit 33D. The control unit 33 executes the program, whereby the information processing apparatus 30 executes the processing procedure from step S100 to step S400 illustrated in FIG. 14.

As illustrated in FIG. 3, the estimation unit 33B includes the perspective angle calculation unit 33B1, the viewing position ID calculation unit 33B2, the pixel ID calculation unit 33B3, and the crosstalk amount estimation unit 33B4. In Modification (5), the crosstalk amount estimation unit 33B4 performs the crosstalk estimation for each combination of display viewpoint IDs. For example, the crosstalk amount estimation unit 33B4 assumes all viewpoint positions as the viewing position, and obtains the crosstalk amount of each pixel by the number of combinations of all the viewpoints including itself.

The generation unit 33C includes the viewpoint image generation unit 33C1, the viewing position ID calculation unit 33C2, the pixel ID calculation unit 33C3, and the viewpoint image combining unit 33C4. In Modification (5), the viewpoint image combining unit 33C4 combines the viewpoint images using the weighted additive averaging.

[Weighted Additive Averaging of Inter-Viewpoint Crosstalk Between Two Viewpoints]

An example of a case of obtaining the weighted additive averaging on inter-viewpoint crosstalk of two viewpoints in the information processing apparatus 30 according to Modification (5) will be described below.

In a case where the display device 10 is a multiple viewpoint display, the crosstalk amount estimation unit 33B4 sets the number of viewpoints to two viewpoints of LR. The crosstalk amount estimation unit 33B4 determines the viewing position of the number of viewpoints, and estimates the crosstalk amount from each pixel to each viewing position. A crosstalk amount $\gamma_{ml}$ is defined as a crosstalk amount from the pixel with the pixel ID: m to the pixel with the pixel ID: l.

Based on the crosstalk amount $\gamma_{ml}$, the viewpoint image combining unit 33C4 performs processing D of weighted additive averaging on the viewpoint images, thereby suppressing the crosstalk. An output $J_l$ obtained by the weighted additive averaging on the viewpoint images can be expressed as the following Formula (12) by using J=D·I. The output I is a matrix corresponding to two viewpoints of LR. The weight $\alpha_{ml}$ is a weight to each viewpoint image in the weighted additive averaging from the pixel with pixel ID: m to the pixel with pixel ID: l. That is, $\alpha_{ml}$ is a function of $\gamma_{ml}$. Xtalk is a matrix representing the crosstalk amount.

$$J_l = \begin{bmatrix} \alpha_{0l} \\ \alpha_{1l} \end{bmatrix}^T \cdot \begin{bmatrix} I_0 \\ I_1 \end{bmatrix} = \sum_{m=0}^{1} \alpha_{ml} \cdot I_m \qquad \text{Formula (12)}$$

Hereinafter, as an example of a method of determining the weight $\alpha_{ml}$ in the inter-viewpoint crosstalk, deconvolution will be described. By using the crosstalk amount $\gamma_{ml}$, an ideal output I without crosstalk and an observation value O influenced by crosstalk can be expressed by the following Formula (13).

$$\begin{bmatrix} O_0 \\ O_1 \end{bmatrix} = XTalk \cdot \begin{bmatrix} I_0 \\ I_1 \end{bmatrix} = \begin{bmatrix} \gamma_{00} & \gamma_{10} \\ \gamma_{01} & \gamma_{11} \end{bmatrix} \cdot \begin{bmatrix} I_0 \\ I_1 \end{bmatrix} \qquad \text{Formula (13)}$$

Here is an operation to be considered to make the observation value O close to the output I by adding the processing D to the output I illustrated in Formula (13) in advance. At this time, the processing D can be obtained as an inverse matrix of the matrix Xtalk based on I=Xtalk·D·J as expressed in the following Formula (14).

$$\begin{bmatrix} J_0 \\ J_1 \end{bmatrix} = XTalk^{-1} \cdot \begin{bmatrix} I_0 \\ I_1 \end{bmatrix} \qquad \text{Formula (14)}$$

Finally, the weight $\alpha$ may be determined based on the display viewpoint ID of the pixel as a processing target. For example, the weight $\alpha$ can be determined using the relationship of the following Formula (15).

$$J_l = \Sigma_{m=0}^{1} \alpha_{ml} \cdot I_m = \Sigma_{m=0}^{1} ATalk_{ml}^{-1} \cdot I_m \qquad \text{Formula (15)}$$

[Weighted Additive Averaging of Multiple Viewpoint Inter-Pixel Crosstalk]

An example of a case of performing the weighted additive averaging in multiple viewpoint inter-pixel crosstalk in the information processing apparatus 30 according to Modification (5) will be described below.

In a case where the display device 10 is a multiple viewpoint display in the operation of the crosstalk amount estimation unit 33B4, the number of viewpoints $N_{total}$ is assumed to be set in advance. The crosstalk amount estimation unit 33B4 determines the viewing positions of the number of viewpoints $N_{total}$, and estimates the crosstalk amount from each pixel to each viewing position. The crosstalk amount $\gamma_{ml}$ is defined as the crosstalk amount from the pixel ID: m to the pixel ID: l.

Based on the crosstalk amount $\gamma_{ml}$, the viewpoint image combining unit 33C4 performs the processing D of the weighted additive averaging on the viewpoint images. The output $J_1$ obtained by the weighted additive averaging on the viewpoint images can be expressed as the following Formula (16).

$$J_l = \begin{bmatrix} \alpha_{0l} \\ \alpha_{1l} \\ \alpha_{2l} \\ \vdots \\ \alpha_{N_{total}-1\,l} \end{bmatrix}^T \cdot \begin{bmatrix} I_0 \\ I_1 \\ I_2 \\ \vdots \\ I_{N_{total}-1} \end{bmatrix} = \sum_{m=0}^{N_{total}-1} \alpha_{ml} \cdot I_m \qquad \text{Formula (16)}$$

Hereinafter, as an example of a method of determining the weight $\alpha$ in the inter-pixel crosstalk, deconvolution will be described. By using the crosstalk amount $\gamma_{ml}$, an ideal output I without crosstalk and an observation value O influenced by crosstalk can be expressed by the following Formula (17).

$$\begin{bmatrix} O_0 \\ O_1 \\ O_2 \\ \vdots \\ O_{N_{total}-1} \end{bmatrix} =$$

$$\begin{bmatrix} \gamma_{00} & \gamma_{10} & \cdots & \gamma_{N_{total}-1\,0} \\ \gamma_{01} & \gamma_{11} & \cdots & \gamma_{N_{total}-1\,1} \\ \vdots & \vdots & \ddots & \vdots \\ \gamma_{0\,N_{total}-1} & \gamma_{1\,N_{total}-1} & \cdots & \gamma_{N_{total}-1\,N_{total}-1} \end{bmatrix} \cdot \begin{bmatrix} I_0 \\ I_1 \\ I_2 \\ \vdots \\ I_{N_{total}-1} \end{bmatrix} \qquad \text{Formula (17)}$$

Here is an operation to be considered to make the observation value O closer to the output I by adding the processing D to the output I illustrated in Formula (17) in advance. At this time, the processing D can be obtained as an inverse matrix of the matrix Xtalk based on I=Xtalk·D·J as expressed in the following Formula (18).

$$\begin{bmatrix} J_0 \\ J_1 \\ J_2 \\ \vdots \\ J_{N_{total}-1} \end{bmatrix} = XTalk^{-1} \cdot \begin{bmatrix} I_0 \\ I_1 \\ I_2 \\ \vdots \\ I_{N_{total}-1} \end{bmatrix} \qquad \text{Formula (18)}$$

Finally, the weight $\alpha$ may be determined based on the display viewpoint ID of the pixel as a processing target. For example, the weight $\alpha$ can be determined using the relationship of the following Formula (19).

$$J_l \Sigma_{m=0}^{N_{total}-1} \alpha_{ml} \cdot I_m = \Sigma_{m=0}^{N_{total}-1} XTalk_{ml}^{-1} \cdot I_m \qquad \text{Formula (19)}$$

The method of determining the weight $\alpha$ described above is optional, and is not limited to the above-described determination method. The pixel ID may be obtained by discretizing values of 0.0 to 1.0. For example, by using a discretized value for the number of viewpoints, the type of the crosstalk amount $\gamma_{ml}$ can be reduced, leading to the reduction of the amount of calculation. For example, in a case where the pixel ID includes eight viewpoints, the number of viewpoints may be 0.0, 0.125, 0.250, . . . . The display viewpoint IDs of the viewing positions of the number of viewpoints $N_{total}$ of the multiple viewpoint display may be all different from each other, or may be duplicated so as to be set to the same ID at a plurality of viewpoints. This duplication expands the width of the viewing position at which the image according to the specific viewpoint is visible, leading to an effect of reducing the crosstalk with respect to the viewpoint. The viewing positions of the number of viewpoints $N_{total}$ may be set at equal intervals or may be set at unequal intervals.

[Processing Procedure Example of Modification (5) of Embodiment]

Figure 44:
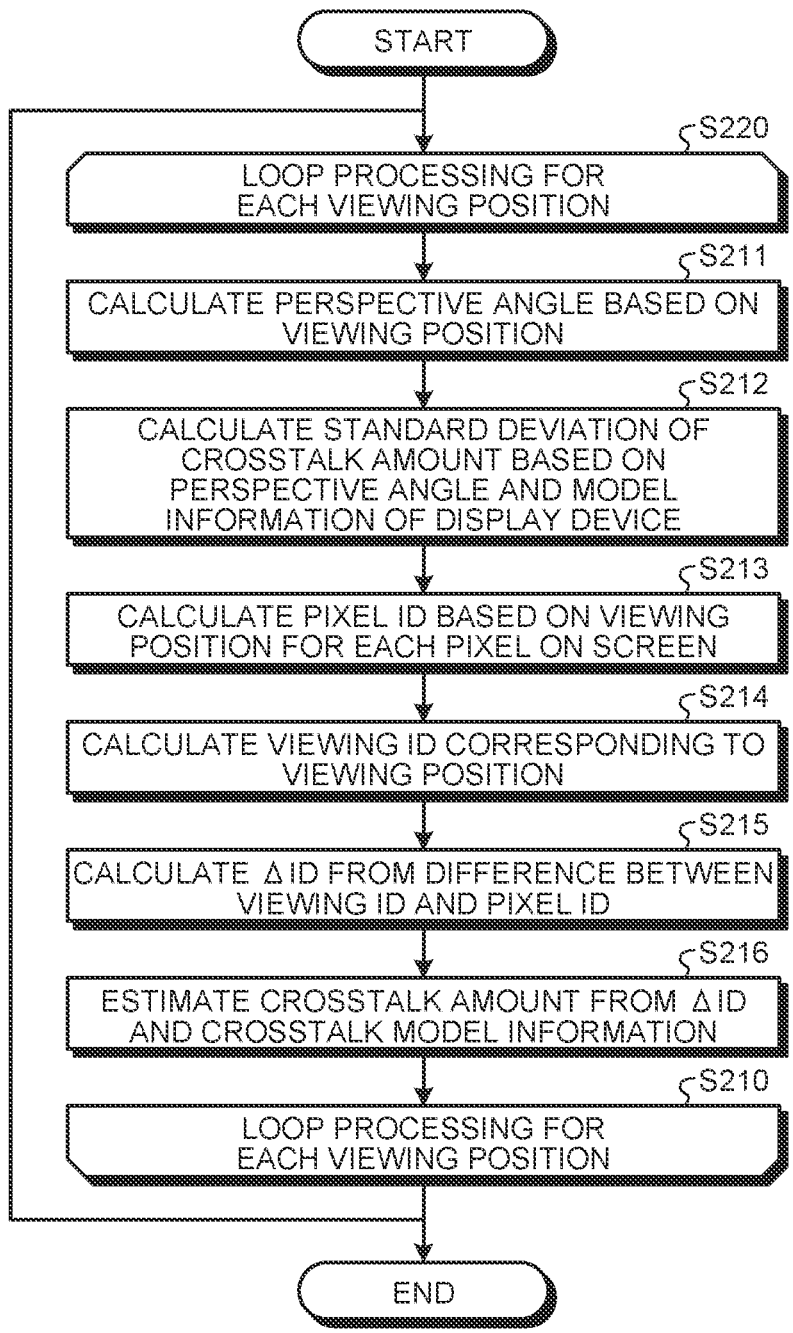
FIG. 44 is a flowchart illustrating a processing procedure of an estimation unit according to Modification (5) of the embodiment.
Figure 45:
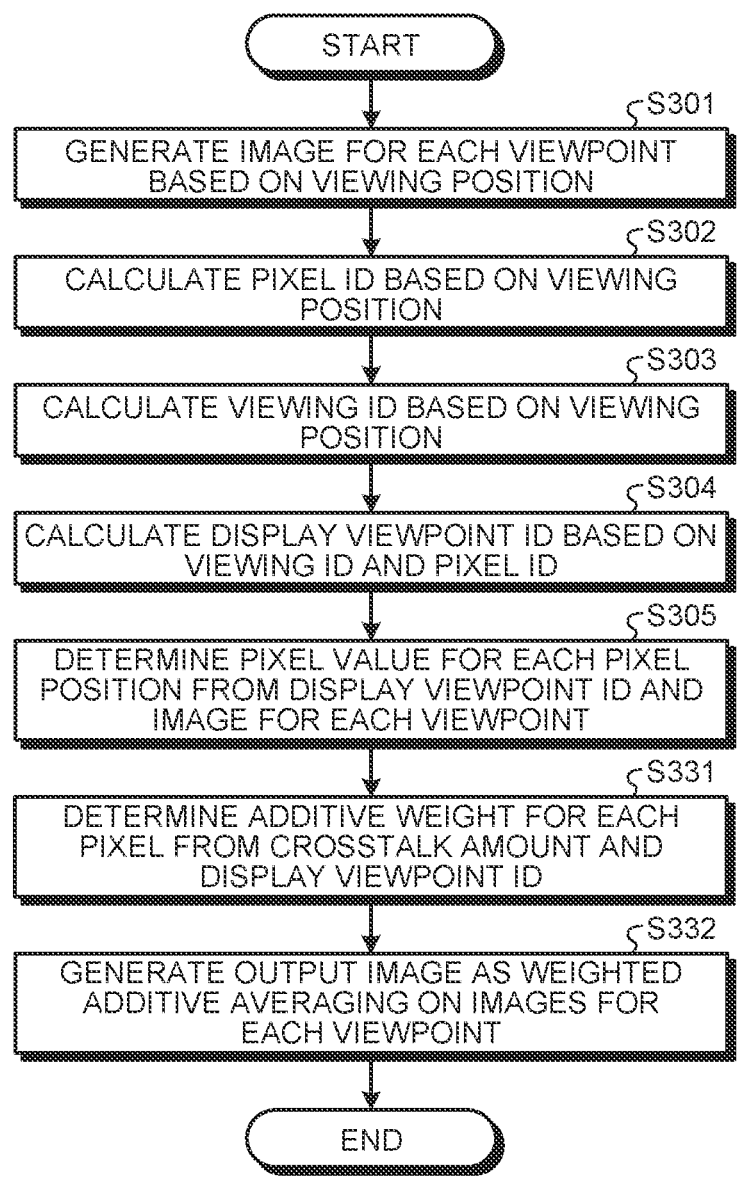
FIG. 45 is a flowchart illustrating a processing procedure of a generation unit according to Modification (5) of the embodiment.

Next, an example of processing procedures of the estimation unit 33B and the generation unit 33C of the information processing apparatus 30 according to Modification (5) of the embodiment will be described. FIG. 44 is a flowchart illustrating a processing procedure of the estimation unit 33B according to Modification (5) of the embodiment. FIG. 45 is a flowchart illustrating a processing procedure of the generation unit 33C according to Modification (5) of the embodiment.

The processing procedure of the estimation unit 33B illustrated in FIG. 44 is executed by the control unit 33 in the processing of step S200 described above. The control unit 33 executes loop processing for each viewing position (step S220). The end condition of step S220 is completion of the processing for all viewpoint positions.

The control unit 33 calculates the perspective angle θ based on the viewing position (step S211). For example, the control unit 33 functions as the perspective angle calculation unit 33B1 to calculate the acquired viewing position and the perspective angle θ of each of the plurality of pixels. The control unit 33 calculates the standard deviation σ of the crosstalk amount γ based on the perspective angle θ and the model information 32B of the display device 10 (step S212). The control unit 33 calculates a pixel ID based on the viewing position for each pixel 12 on the screen 11 (step S213). For example, the control unit 33 calculates the pixel ID using the above Formula (3).

The control unit 33 calculates a viewing ID for the viewing position (step S214). For example, the control unit 33 calculates the viewing ID of the eyes 201 to be calculated at the viewing position P. The control unit 33 calculates ΔID from the difference between the viewing ID and the pixel ID (step S215). For example, the control unit 33 calculates a difference between the viewing position P and each pixel ID as ΔID by using the above Formula (6). The control unit 33 estimates the crosstalk amount γ from the ΔID and the model information 32B of crosstalk (step S216).

In a case where the loop processing for all the viewing positions is not ended, the control unit 33 changes the processing target and repeats the loop processing. Furthermore, in a case where the loop processing for all the viewing positions has been completed, the control unit 33 returns the processing to step S200 illustrated in FIG. 14 described above. By executing the processing of step S220, the control unit 33 functions as the estimation unit 33B. Returning to FIG. 14, when having completed the processing of step S200, the control unit 33 proceeds to the processing of step S300.

The processing procedure of the generation unit 33C illustrated in FIG. 45 is executed by the control unit 33 in the processing of step S300 described above. The control unit 33 generates an image for each viewpoint based on the viewing position (step S301). The control unit 33 calculates a pixel ID based on the viewpoint position (step S302). The control unit 33 calculates the viewing ID based on the viewing position (step S303). The control unit 33 calculates the display viewpoint ID based on the viewing ID and the pixel ID (step S304). The control unit 33 determines a pixel value for each pixel position from the display viewpoint ID and the image for each viewpoint (step S305). After completion of the processing of step S305, the control unit 33 proceeds to the processing of step S331.

The control unit 33 determines an additive weight for each of the pixels 12 from the crosstalk amount γ and the display viewpoint ID (step S331). For example, the control unit 33 determines the weight for each of the pixels 12 using the deconvolution processing as described above. After completion of the processing of step S331, the control unit 33 proceeds to the processing of step S332.

The control unit 33 generates an output image as a weighted additive averaging on images for each viewpoint (step S332). For example, the control unit 33 generates an output image obtained by the weighted additive averaging on the viewpoint images using the above-described Formulas (12), (16), and the like.

After supplying the generated output image to the display control unit 33D, the control unit 33 returns the processing to step S300 illustrated in FIG. 14. By executing the processing of step S300, the control unit 33 functions as the generation unit 33C. Thereafter, when having completed the processing of step S300, the control unit 33 proceeds to the processing of step S400.

The information processing apparatus 30 according to Modification (5) of the embodiment can create a leakage amount model by assigning the number of viewpoints to LR instead of the viewpoint ID. By controlling to display the output image corrected based on the model on the display device 10, the information processing apparatus 30 can reduce crosstalk not only at the end but also at the center of the screen 11.

Note that Modification (5) of the above embodiment may be applied to Countermeasures (1) to (3) and Modifications (1) to (4) of the embodiment, or may be applied to or be used in combination with other countermeasures.

[Hardware Configuration]

Figure 46:
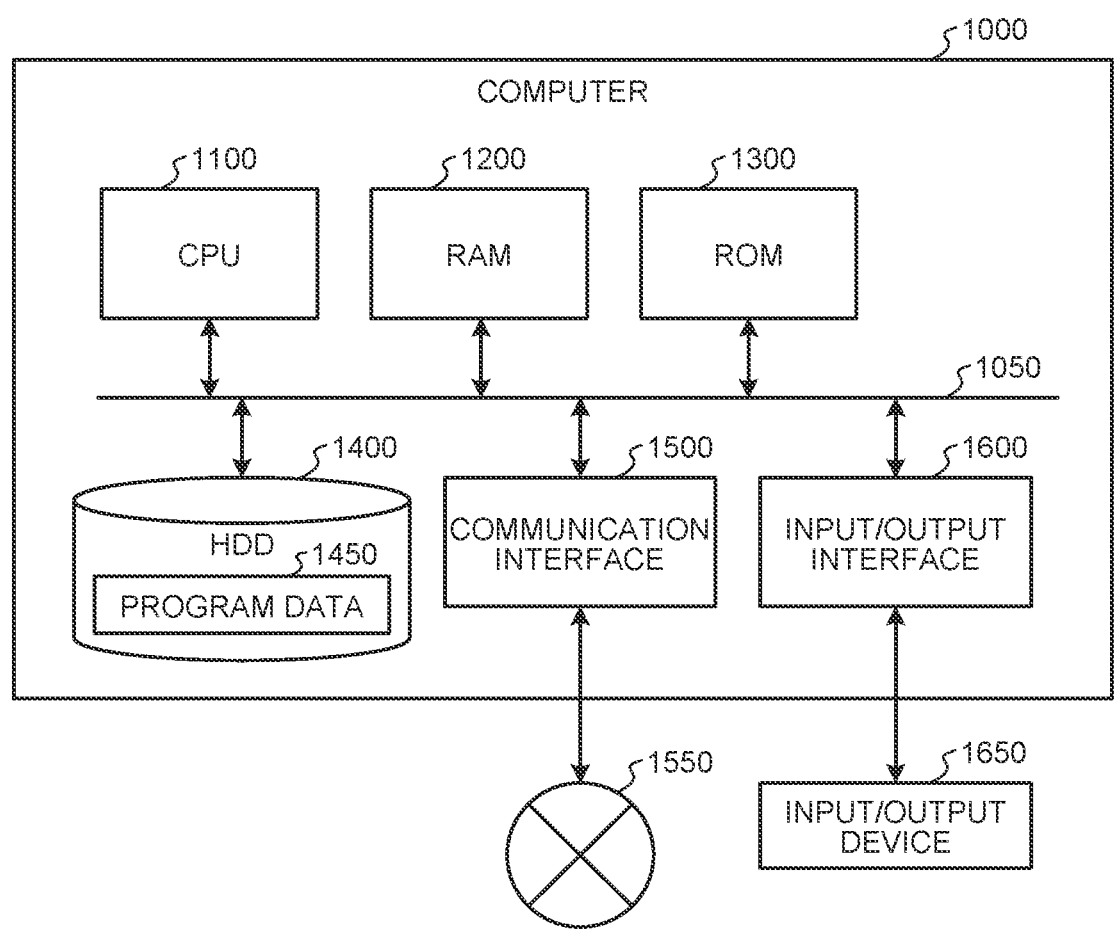
FIG. 46 is a hardware configuration diagram illustrating an example of a computer that implements functions of the information processing apparatus.

The information processing apparatus 30 according to the embodiment described above may be implemented by a computer 1000 having a configuration as illustrated in FIG. 46, for example. Hereinafter, the information processing apparatus 30 according to the embodiment will be described as an example. FIG. 46 is a hardware configuration diagram illustrating an example of the computer 1000 that implements functions of the information processing apparatus 30. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting an input/output device 1650 with the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on a predetermined recording medium. Examples of the media include optical recording media such as a digital versatile disc (DVD), a magneto-optical recording medium such as a magneto-optical disk (MO), a tape medium, a magnetic recording medium, and semiconductor memory.

For example, in a case where the computer 1000 functions as the information processing apparatus 30 according to the embodiment, the CPU 1100 of the computer 1000 executes a program loaded on the RAM 1200 to implement the functions of the acquisition unit 33A, the estimation unit 33B, the generation unit 33C, the display control unit 33D, and the like. In addition, the HDD 1400 stores a program according to the present disclosure and data in the storage unit 32. While the CPU 1100 executes program data 1450 read from the HDD 1400, the CPU 1100 may acquire these programs from another device via the external network 1550, as another example.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

It is also possible to create a program for the hardware such as CPU, ROM, and RAM built in a computer to exert the functions equivalent to the configuration of the information processing apparatus 30, and a computer-readable recording medium that has recorded the program can also be provided.

Furthermore, individual steps related to the processing of the information processing apparatus 30 in the present specification do not necessarily have to be processed in chronological order in the order described in the flowchart. For example, individual steps related to the processing of the information processing apparatus 30 may be processed in an order different from the order described in the flowchart, or may be processed in parallel.

(Effects)

The information processing apparatus 30 includes: the estimation unit 33B that estimates the crosstalk amount $\gamma$ based on a relative positional relationship between the viewing position of the viewer 200 of the display device 10 and the pixel 12 in the screen 11 of the display device 10; and the generation unit 33C that generates an image to be displayed on the display device 10 by correcting the value of each of the plurality of pixels 12 of the screen 11 based on the crosstalk amount $\gamma$.

This makes it possible for the information processing apparatus 30 to adjust the intensity of the crosstalk correction for each pixel 12 based on the relative positional relationship between the viewing position of the viewer 200 with respect to the display device 10 and the pixel 12. As a result, the information processing apparatus 30 can generate an image corrected for each pixel 12 suitable for the viewing position, making it possible to suppress crosstalk while suppressing degradation in image quality of the display device 10 that displays the image.

The information processing apparatus 30 further includes the acquisition unit 33A that acquires the viewing position measured by the measurement device 20, and the estimation unit 33B estimates the crosstalk amount $\gamma$ indicating the attenuation rate of the intensity of the light beam with respect to the viewing position for each pixel 12 based on the acquired relative positional relationship between the viewing position and the pixel 12.

This makes it possible for the information processing apparatus 30 to estimate the crosstalk amount $\gamma$ with respect to the viewing position of each of the plurality of pixels 12 based on the viewing position of the viewer 200 of the display device 10 measured by the measurement device 20. As a result, by performing correction for each pixel 12 suitable for the actual viewing position of the viewer 200 viewing the display device 10, the information processing apparatus 30 can suppress crosstalk while suppressing degradation in image quality of the display device 10.

In the information processing apparatus 30, the estimation unit 33B estimates the crosstalk amount $\gamma$ based on the normal distribution according to the perspective angle $\theta$ from the viewing position with respect to the pixel 12 and according to the standard deviation $\sigma$.

This makes it possible for the information processing apparatus 30 to estimate the crosstalk amount $\gamma$ based on the normal distribution in which the standard deviation $\sigma$ of the distribution is a function of the perspective angle $\theta$. As a result, since the information processing apparatus 30 can perform correction for each pixel 12 suitable for the viewing position of the viewer 200 viewing the display device 10, it is possible to suppress crosstalk while suppressing degradation in image quality of the display device 10.

In the information processing apparatus 30, the generation unit 33C generates a two-dimensional image for each viewpoint based on the viewing position, and determines the pixel value of the pixel 12 according to the crosstalk amount $\gamma$ from the two-dimensional image to generate an image.

This makes it possible for the information processing apparatus 30 to adjust the intensity of the crosstalk correction for each pixel 12 based on the two-dimensional image based on the relative positional relationship between the viewing position of the viewer 200 with respect to the display device 10 and the pixel 12. As a result, the information processing apparatus 30 can generate an image corrected for each pixel 12 suitable for the viewing position, making it possible to suppress crosstalk while suppressing degradation in image quality of the display device 10.

In the information processing apparatus 30, the generation unit 33C calculates the light reduction rate for each pixel based on the crosstalk amount γ, and convolutes the two-dimensional image and the light reduction rate to generate the image with reduced light.

This makes it possible for the information processing apparatus 30 to generate an image in which a region in which the perspective angle θ of each pixel 12 from the viewing position is larger than a threshold is darkened. As a result, the information processing apparatus 30 can darken the region of the screen 11 where the crosstalk is large, making it possible to suppress the crosstalk while suppressing the degradation of the image quality of the display device 10.

In the information processing apparatus 30, the estimation unit 33B estimates the crosstalk amount γ based on a difference between the viewing position and the pixel position indicating the position where the light beam of the pixel 12 spreads. The generation unit 33C calculates the display viewpoint position based on the relationship between the viewing position and the pixel position, calculates the light reduction rate for each pixel 12 based on the display viewpoint position and the crosstalk amount γ, and convolutes the two-dimensional image and the light reduction rate to generate an image with reduced light.

This makes it possible for the information processing apparatus 30 to darken a boundary portion between adjacent images in the continuous images in the region where the perspective angle θ is larger than a threshold. For example, in the case of two viewpoints, the information processing apparatus 30 can selectively darken the pixels 12 near the boundary between the left-eye image and the right-eye image. As a result, the information processing apparatus 30 can partially darken only the region with large crosstalk, making it possible to suppress the crosstalk while suppressing the degradation of the image quality of the display device 10.

In the information processing apparatus 30, the estimation unit 33B estimates the crosstalk amount based on the difference between the viewing position and the pixel position indicating the position where the light beam of the pixel 12 spreads, and the generation unit 33C calculates the correction amount of the display viewpoint ID of the pixel 12 so as to be close to the display viewpoint ID of the viewing position based on the crosstalk amount γ, and generates the image based on the two-dimensional image so as to have the pixel value for each pixel position determined based on the correction amount.

This makes it possible for the information processing apparatus 30 to bring the display viewpoint position where the crosstalk amount γ is larger than a predetermined threshold close to the viewpoint image of the viewing position. As a result, the information processing apparatus 30 can display an image in which the parallax is suppressed even with a large change in the parallax, making it possible to suppress the crosstalk while suppressing the degradation of the image quality of the display device 10.

The information processing apparatus 30 further includes the display control unit that controls the display device so as to display the generated image.

This makes it possible for the information processing apparatus 30 to stereoscopically display an image according to the viewpoint of the viewer on the display device 10. As a result, the information processing apparatus 30 can control to display, on the display device 10, an image corrected for each pixel 12 suitable for the viewing position, making it possible to suppress crosstalk while suppressing degradation in image quality of the display device 10.

In the information processing apparatus 30, the relative positional relationship is the relationship between the pixel 12 and the viewing distance z of the viewer 200, and the estimation unit 33B estimates the crosstalk amount γ based on the model information 32B indicating the relationship between the viewing distance z and the crosstalk amount γ and based on the viewing distance z.

This makes it possible for the information processing apparatus 30 to correct the crosstalk for each pixel 12 based on the relative positional relationship between the pixel 12 and the viewing distance z. As a result, the information processing apparatus 30 can generate an image corrected for each pixel 12 suitable for the viewing distance z, making it possible to suppress crosstalk while suppressing degradation in image quality of the display device 10 that displays the image.

In the information processing apparatus 30, the model information 32B indicates the relationship between the viewing distance z, the perspective angle θ from the viewing position with respect to the pixel 12, and the crosstalk amount γ, and the estimation unit 33B estimates the crosstalk amount γ based on the viewing distance z, the perspective angle θ, and the model information 32B.

This makes it possible for the information processing apparatus 30 to correct the crosstalk for each pixel 12 based on the relative positional relationship between the pixel 12 and the viewing distance z and the perspective angle θ with respect to the pixel 12. As a result, the information processing apparatus 30 can generate an image corrected for each of the pixels 12 suitable for the viewing distance z and the perspective angle θ, making it possible to suppress crosstalk while suppressing degradation in image quality of the display device 10 even at the viewing position where the viewer 200 has moved horizontally.

In the information processing apparatus 30, the model information 32B indicates the relationship between the viewing distance z, the interocular distance 204 of the viewer 200, and the crosstalk amount γ, and the estimation unit 33B estimates the crosstalk amount γ based on the viewing distance z, the interocular distance 204, and the model information 32B.

This makes it possible for the information processing apparatus 30 to correct the crosstalk for each pixel 12 based on the relative positional relationship between the pixel 12 and the viewing distance z and the interocular distance 204 with respect to the pixel 12. As a result, since the information processing apparatus 30 can generate an image corrected for each pixel 12 suitable for the viewing distance z and the interocular distance 204, it is possible to suppress crosstalk while suppressing degradation in image quality of the display device 10 even with an individual difference in the interocular distance 204 of the viewer 200 and with a deviation from an average value.

In the information processing apparatus 30, the generation unit 33C determines an additive weight for each of the pixels 12 based on the crosstalk amount γ, and generates an image obtained by performing weighted additive averaging on viewpoint images for each viewpoint.

This makes it possible for the information processing apparatus 30 to create a leakage amount model by calculating the additive weight for each viewpoint, achieving generation of an image corrected for each viewpoint based on the model. As a result, the information processing apparatus 30 can effectively reduce the crosstalk amount not only at the ends but also at the center of the image.

An information processing method of the information processing apparatus 30 performed by a computer, includes: estimating a crosstalk amount γ based on a relative positional relationship between a viewing position of a viewer 200 of the display device 10 and a pixel 12 in a screen 11 of the display device 10; and generating an image to be displayed on the display device 10 by correcting a value of each of a plurality of pixels 12 of the screen 11 based on the crosstalk amount γ.

This makes it possible for the information processing method to adjust the intensity of the crosstalk correction by the computer for each pixel 12 based on the relative positional relationship between the viewing position of the viewer 200 with respect to the display device 10 and the pixel 12. As a result, the information processing method can generate an image corrected for each pixel 12 suitable for the viewing position, making it possible to suppress crosstalk while suppressing degradation in image quality of the display device 10 that displays the image.

A program causes a computer to execute: estimating a crosstalk amount γ based on a relative positional relationship between a viewing position of a viewer 200 of the display device 10 and a pixel 12 in a screen 11 of the display device 10; and generating an image to be displayed on the display device 10 by correcting a value of each of a plurality of pixels 12 of the screen 11 based on the crosstalk amount γ.

This makes it possible for the program to adjust the intensity of the crosstalk correction by the computer for each pixel 12 based on the relative positional relationship between the viewing position of the viewer 200 with respect to the display device 10 and the pixel 12. As a result, the program causes the computer to generate an image that has been corrected for each pixel 12 suitable for the viewing position, making it possible to suppress crosstalk while suppressing degradation in image quality of the display device 10 that displays the image.

Note that the following configurations also belong to the technical scope of the present disclosure.

(1)

An information processing apparatus including:

an estimation unit that estimates a crosstalk amount based on a relative positional relationship between a viewing position of a viewer of a display device and a pixel on a screen of the display device; and a generation unit that generates an image to be displayed on the display device by correcting a value of each of a plurality of the pixels of the screen based on the crosstalk amount.

(2)

The information processing apparatus according to (1), further including an acquisition unit that acquires the viewing position measured by a measurement device, wherein the estimation unit estimates the crosstalk amount indicating an attenuation rate of light beam intensity with respect to the viewing position for each of the pixels based on a relative positional relationship between the acquired viewing position and the pixel.

(3)

The information processing apparatus according to (1) or (2), wherein the estimation unit estimates the crosstalk amount based on a normal distribution according to a perspective angle from the viewing position with respect to the pixel and according to a standard deviation.

(4)

The information processing apparatus according to any one of (1) to (3), wherein the generation unit generates a two-dimensional image for each viewpoint based on the viewing position, and determines a pixel value of the pixel according to the crosstalk amount from the two-dimensional image to generate the image.

(5)

The information processing apparatus according to any one of (1) to (4), wherein the generation unit calculates a light reduction rate for each of the pixels based on the crosstalk amount, and convolutes the two-dimensional image and the light reduction rate to generate the image with reduced light.

(6)

The information processing apparatus according to any one of (1) to (4), wherein the estimation unit estimates the crosstalk amount based on a difference between the viewing position and a pixel position indicating a position at which a light beam of the pixel spreads, and the generation unit calculates a display viewpoint position based on a relationship between the viewing position and the pixel position, calculates a light reduction rate for each of the pixels based on the display viewpoint position and the crosstalk amount, and convolutes the two-dimensional image and the light reduction rate to generate the image with reduced light.

(7)

The information processing apparatus according to any one of (1) to (4), wherein the estimation unit estimates the crosstalk amount based on a difference between the viewing position and a pixel position indicating a position at which a light beam of the pixel spreads, and the generation unit calculates a correction amount based on the crosstalk amount so as to bring a display viewpoint position of the pixel close to a display viewpoint position of the viewing position, and generates the image based on the two-dimensional image so as to have a pixel value for the each pixel position determined based on the correction amount.

(8)

The information processing apparatus according to any one of (1) to (7), further including a display control unit that controls the display device to display the generated image.

(9)

The information processing apparatus according to any one of (1) to (8), wherein the relative positional relationship is a relationship between the pixel and a viewing distance of the viewer, and the estimation unit estimates the crosstalk amount based on model information indicating a relationship between the viewing distance and the crosstalk amount and based on the viewing distance.

(10)

The information processing apparatus according to (9), wherein the model information indicates a relationship among the viewing distance, a perspective angle from the viewing position with respect to the pixel, and the crosstalk amount, and the estimation unit estimates the crosstalk amount based on the viewing distance, the perspective angle, and the model information.

(11)

The information processing apparatus according to (9) or (10), wherein the model information indicates a relationship among the viewing distance, an interocular distance of the viewer, and the crosstalk amount, and the estimation unit estimates the crosstalk amount based on the viewing distance, the interocular distance, and the model information.

(12)

The information processing apparatus according to any one of (1) to (11), wherein the generation unit determines an additive weight for each of the pixels based on the crosstalk amount, and generates the image obtained by performing weighted additive averaging on a viewpoint image for each viewpoint.

(13)

An information processing method performed by a computer, the method including:

estimating a crosstalk amount based on a relative positional relationship between a viewing position of a viewer of a display device and a pixel on a screen of the display device; and generating an image to be displayed on the display device by correcting a value of each of a plurality of the pixels of the screen based on the crosstalk amount.

(14)

An information processing program causing a computer to execute:

estimating a crosstalk amount based on a relative positional relationship between a viewing position of a viewer of a display device and a pixel on a screen of the display device; and generating an image to be displayed on the display device by correcting a value of each of a plurality of the pixels of the screen based on the crosstalk amount.

(15)

A display system including: a display device capable of stereoscopically displaying an image; and an information processing apparatus, wherein the information processing apparatus includes:

an estimation unit that estimates a crosstalk amount based on a relative positional relationship between a viewing position of a viewer of the display device and a pixel on a screen of the display device; and a generation unit that generates the image to be displayed on the display device by correcting a value of each of a plurality of the pixels of the screen based on the crosstalk amount.

REFERENCE SIGNS LIST

10 DISPLAY DEVICE
11 SCREEN
12 PIXEL
20 MEASUREMENT DEVICE
30 INFORMATION PROCESSING APPARATUS
31 COMMUNICATION UNIT
32 STORAGE UNIT
32A CONTENT INFORMATION
32B MODEL INFORMATION
33 CONTROL UNIT
33A ACQUISITION UNIT
33B ESTIMATION UNIT
33B1 PERSPECTIVE ANGLE CALCULATION UNIT
33B2 VIEWING POSITION ID CALCULATION UNIT
33B3 PIXEL ID CALCULATION UNIT
33B4 CROSSTALK AMOUNT ESTIMATION UNIT
33B5 VIEWING DISTANCE CALCULATION UNIT
33B6 INTEROCULAR DISTANCE ACQUISITION UNIT
33C GENERATION UNIT
33C1 VIEWPOINT IMAGE GENERATION UNIT
33C2 VIEWING POSITION ID CALCULATION UNIT
33C3 PIXEL ID CALCULATION UNIT
33C4 VIEWPOINT IMAGE COMBINING UNIT
33D DISPLAY CONTROL UNIT
100 DISPLAY SYSTEM
200 VIEWER
z, z1, z2, z3 VIEWING DISTANCE

The invention claimed is:

1. An information processing apparatus, comprising:
circuitry configured to:
acquire, from a measurement device, information of a viewing position of a viewer of a display device;
estimate a crosstalk amount based on a relative positional relationship between the viewing position and a pixel of a plurality of pixels on a screen of the display device, wherein the crosstalk amount indicates an attenuation rate of light beam intensity with respect to the viewing position for each of the plurality of pixels; and
generate an image to be displayed on the display device by correction of a value of each of the plurality of pixels of the screen, wherein the correction is based on the crosstalk amount.

2. The information processing apparatus according to claim 1, wherein the circuitry is further configured to estimate the crosstalk amount based on a normal distribution according to a perspective angle from the viewing position with respect to the pixel and according to a standard deviation.

3. The information processing apparatus according to claim 1, wherein in the generation of the image, the circuitry is further configured to:
generate two-dimensional images for respective viewpoints based on the viewing position; and
correct the value of the pixel according to the crosstalk amount from the two-dimensional images.

4. The information processing apparatus according to claim 3, wherein in the generation of the image, the circuitry is further configured to:
calculate a light reduction rate for each of the plurality of pixels based on the crosstalk amount; and
reduce light of the image by convolution of each the two-dimensional images and the light reduction rate.

5. The information processing apparatus according to claim 3, wherein the circuitry is further configured to:
estimate the crosstalk amount based on a difference between the viewing position and a pixel position indicating a position at which a light beam of the pixel spreads;
calculate, in the generation of the image, a display viewpoint position based on a relationship between the viewing position and the pixel position;
calculate, in the generation of the image, a light reduction rate for each of the plurality of pixels based on the display viewpoint position and the crosstalk amount; and
convolute, in the generation of the image, each of the two-dimensional images and the light reduction rate.

6. The information processing apparatus according to claim 3, wherein the circuitry is further configured to:

estimate the crosstalk amount based on a difference between the viewing position and a pixel position indicating a position at which a light beam of the pixel spreads;

correct, in the generation of the image, a pixel value for the pixel position based on the crosstalk amount so as to bring a display viewpoint position of the pixel close to a display viewpoint position of the viewing position; and generate the image based on the two-dimensional images so as to have the corrected pixel value.

7. The information processing apparatus according to claim 1, wherein the circuitry is further configured to control the display device to display the generated image.

8. An information processing apparatus, comprising:
circuitry configured to:
estimate a crosstalk amount based on:
a viewing distance between a viewing position of a viewer of a display device and a pixel of a plurality of pixels on a screen of the display device, and model information indicating a relationship between the viewing distance and the crosstalk amount; and generate, based on the estimated crosstalk amount, an image to be displayed on the display device by correction of a value of each of the plurality of pixels of the screen.

9. The information processing apparatus according to claim 8, wherein
the model information indicates a relationship between the viewing distance, a perspective angle from the viewing position with respect to the pixel, and the crosstalk amount, and the circuitry is further configured to estimate the crosstalk amount based on the viewing distance, the perspective angle, and the model information.

10. The information processing apparatus according to claim 8, wherein
the model information indicates a relationship between the viewing distance, an interocular distance of the viewer, and the crosstalk amount, and the circuitry is further configured to estimate the crosstalk amount based on the viewing distance, the interocular distance, and the model information.

11. An information processing apparatus, comprising:
circuitry configured to:
estimate a crosstalk amount based on a relative positional relationship between a viewing position of a viewer of a display device and a plurality of pixels on a screen of the display device;

determine an additive weight for each of the plurality of pixels based on the crosstalk amount; and generate an image by execution of weighted additive averaging on viewpoint images for respective viewpoints, wherein the execution of the weighted additive averaging is based on the viewing position and the determined additive weight.

12. An information processing method performed by a computer, the method comprising:
acquiring, from a measurement device, information of a viewing position of a viewer of a display device;

estimating a crosstalk amount based on a relative positional relationship between the viewing position and a pixel of a plurality of pixels on a screen of the display device, wherein the crosstalk amount indicates an attenuation rate of light beam intensity with respect to the viewing position for each of the plurality of pixels; and generating an image to be displayed on the display device by correction of a value of each of the plurality of pixels of the screen, wherein the correction is based on the crosstalk amount.

* * * * *